United States Patent [19]
Melcher et al.

[11] Patent Number: 5,799,061
[45] Date of Patent: Aug. 25, 1998

[54] COMPUTER INTEGRATED TELEPHONY SYSTEM FOR THE PROCESSING OF 9-1-1 CALLS FOR SERVICE

[75] Inventors: John R. Melcher, Houston, Tex.; Richard A. Maw, Bolton, Mass.; David L. Pickett, Houston, Tex.

[73] Assignee: Greater Harris County 9-1-1 Emergency Network, Houston, Tex.

[21] Appl. No.: 659,121

[22] Filed: Jun. 4, 1996

Related U.S. Application Data

[63] Continuation of Ser. No. 234,469, Apr. 26, 1994, abandoned.

[51] Int. Cl.$^6$ .................................................. H04M 11/00
[52] U.S. Cl. ................ 379/45; 379/93.19; 379/93.23; 455/404
[58] Field of Search ..................... 379/45, 49, 50, 379/51, 88, 89, 214, 96, 94, 93, 58, 59, 60, 93.17, 93.19, 93.23, 93.25; 455/404, 457, 456

[56] References Cited

U.S. PATENT DOCUMENTS

| | | | |
|---|---|---|---|
| 4,893,325 | 1/1990 | Pankonen et al. | 379/45 |
| 4,924,491 | 5/1990 | Compton et al. | 379/45 |
| 4,995,071 | 2/1991 | Weber et al. | 348/15 |
| 5,077,788 | 12/1991 | Cook et al. | 379/45 |
| 5,109,399 | 4/1992 | Thompson | 379/45 |
| 5,218,367 | 6/1993 | Sheffer et al. | 379/59 |
| 5,311,569 | 5/1994 | Brozovich et al. | 379/94 |
| 5,327,144 | 7/1994 | Stilp et al. | 379/58 |
| 5,388,147 | 2/1995 | Grimes | 379/59 |
| 5,515,419 | 5/1996 | Sheffer | 379/59 |
| 5,519,760 | 5/1996 | Borkowski et al. | 455/404 |

OTHER PUBLICATIONS

Japanese Patent Abstract Publication Number JP61286973, publication date Dec. 17, 1986.
Japanese Patent Abstract Publication Number JP612230233, publication date Oct. 8, 1987.
PCT Application No. PCT/US90/04512, International Publication No. WO 91/03118, Publication date Mar. 7, 1991.
PCT Application No. PCT/US91/07688, International Publication No. WO 92/07439, Publication date Apr. 30, 1992.

*Primary Examiner*—Stella Woo
*Attorney, Agent, or Firm*—Arnold, White & Durkee

[57] ABSTRACT

A machine executed method provides: (1) rapid, automatic, and virtually silent transfer of an incoming 9-1-1 call for service to the proper service provider or providers; (2) automatic transfer of caller identification and location information from a public safety answering point call-taker station to the appropriate service provider without further call-taker intervention; (3) elimination of the need for a call-taker to manually use detailed local maps such as a "KEY-MAP" to determine the location of a caller; and (4) digital recording of incoming calls. The digital voice and associated information is stored in a database to facilitate the rapid retrieval of the recorded call at a later time.

21 Claims, 6 Drawing Sheets

COMPUTER INTEGRATED TELEPHONY SYSTEM FOR THE PROCESSING OF 9-1-1 CALLS FOR SERVICE

This application is a continuation of application Ser. No. 08/234,469, filed Apr. 26, 1994, now abandoned.

BACKGROUND OF THE INVENTION

FIG. 1 shows a typical prior art system which embodies essential features of an existing 9-1-1 service. In prior embodiments of a 9-1-1 service, a caller 100 dials 9-1-1 and is connected to a public safety answering point 105, hereinafter referred to as PSAP, via a dedicated partition in the public switched telephone network (PSTN). The appropriate PSAP is determined according to the caller's location. Typically, local PSAP service areas are determined by geopolitical jurisdictions; arbitrarily defined geographical regions that are specified by public safety agencies.

At the PSAP 105 the automatic number identification (ANI) controller 110 decodes the incoming calling party identification or telephone number of the inbound 9-1-1 call. The ANI controller 110 passes the 9-1-1 telephone call to the telephone PBX switch 115 for presentation to one of a number of possible call-takers 120, where a call-taker is an individual who is assigned to accept incoming 9-1-1 calls. The identification of the specific call-taker, e.g., call-taker 1 125, receiving the call is passed back to the ANI controller 110. With this information the ANI controller 110 (1) displays the citizen's telephone number at the appropriate call-taker's position and (2) passes the caller's telephone number and the call-taker's identification to the automatic location identification (ALI) controller 130.

The ALI controller 130 queries a remote database service (RDBS) 135 to retrieve an address associated with calling party's telephone number. Remote database services are typically maintained by telephone exchange carriers such as, for example, Southwestern Bell. A response from the RDBS 135 is received by the ALI controller 130 and the location information is then displayed to the designated call-taker 125.

The call-taker 125 determines the nature of the emergency and conferences/transfers the incoming call to the appropriate service provider, i.e., police 140, Fire 145, Emergency Medical Services 150, or other service as required 155. In addition to transferring the call, it may be necessary for the call-taker 125 to transmit the caller's identification (e.g., telephone number) and location information.

If the incoming call has been made from a mobile telephone, the call-taker 125 is responsible for determining the caller's location (calling party identification and location information are not currently available for calls placed from mobile telephones). This is generally accomplished by manually referencing a detailed local map, such as a "KEY MAP" in combination with talking with the caller. Once the caller's location has been determined, the call-taker can transfer the call and, if necessary, the caller's identification and location information to the appropriate agency.

A 9-1-1 system such as that shown in FIG. 1 has several shortfalls, including:

1. Lengthy call transfer time (typically 4 to 6 seconds).
2. Associated with the call transfer process is often a series of audible clicking (analog circuit bridging) noises which the caller may interpret as having been disconnected and may lead the caller to hang up while a call transfer is in progress.
3. The reliability of the data transfer process, in those cases where it is necessary, is wholly dependent on the call-taker's performance.
4. The time required for a call-taker to manually determine the location of a cellular caller is often measured in minutes.
5. In many conventional 9-1-1 service sites incoming calls are (analog) recorded on magnetic tape. The process of later retrieving a specified call is often a time consuming, cumbersome ordeal that takes several hours or days.

The machine executed method of the claimed invention addresses these shortfalls by providing a faster, more reliable, and cost effective means of processing 9-1-1 calls for service.

2. SUMMARY OF THE INVENTION

The claimed invention is a machine executed method—embodied in a series of computer programs—that provides:

1. The rapid, automatic, and virtually silent transfer of an incoming call to the proper service provider or providers.
2. The automatic transfer of caller identification and location information from the call-taker station to the appropriate service provider without further call-taker intervention.
3. Elimination of the need for a call-taker to manually use detailed local maps, such as a "KEY-MAP," to determine the location of a caller who is using a mobile telephone.
4. The digital recording of incoming calls. The digital voice and associated information is stored in a database to facilitate the rapid retrieval of the recorded call at a later time.

3. BRIEF DESCRIPTION OF DRAWINGS

4. DETAILED DESCRIPTION OF A SPECIFIC EMBODIMENT

One illustrative embodiment of a the invention is described below as it might be implemented on a general purpose computer using a suitable high-level language such as COBOL, C, FORTRAN, Pascal, or Visual Basic. In the interest of clarity, not all features of an actual implementation are described in this specification. It will of course be appreciated that in the development of any such actual implementation (as in any software development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Appendix A (containing 165 pages) sets out selected Visual Basic source code extracts from a copyrighted software program, owned by the assignee of this patent document, which manifests the invention. Permission is granted to make copies of the appendix solely in connection with the making of facsimile copies of this patent document in accordance with applicable law; all other rights are reserved, and all other reproduction, distribution, creation of derivative works based on the contents, public display, and public performance of the appendix or any part thereof are prohibited by the copyright laws.

4.1 General Technical Overview

Figure 2:
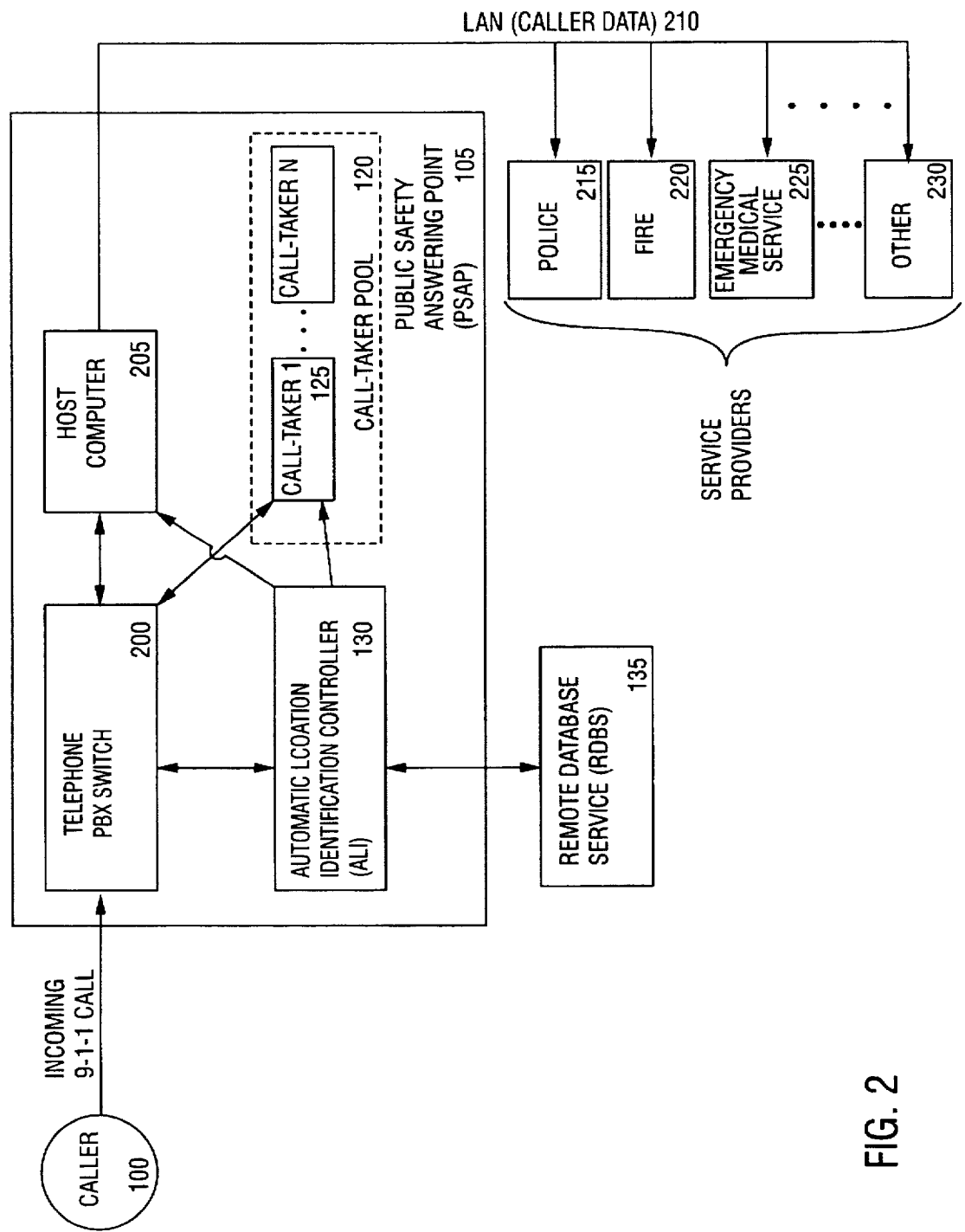
FIG. 2 is a block diagram of the invention as used to provide a 9-1-1 caller information service.

Functional aspects of one embodiment of a machine executed method implementing an integrated telephony system for processing 9-1-1 calls for service is shown in FIG. 2. The caller 100 makes a telephone call which is answered at a public safety answering point (PSAP) 105. The caller's telephone number is decoded by the telephone PBX switch 200 and passed to a computer 205. Computer 205 could be, for example, a Digital Equipment Corporation VAX 2100 or a personal computer.

In the current embodiment of the invention, the caller identification is decoded from an in-band multifrequency (MF) signal by MF decoder cards inside the telephone PBX switch 200. One of ordinary skill will realize that the calling party identification information could be encoded in a dual tone multifrequency (DTMF), frequency shift keying (FSK), digital format, or the like. Each of these different encoding schemes would, of course, require its own decoding capability in the telephone PBX switch 200.

Figure 1:
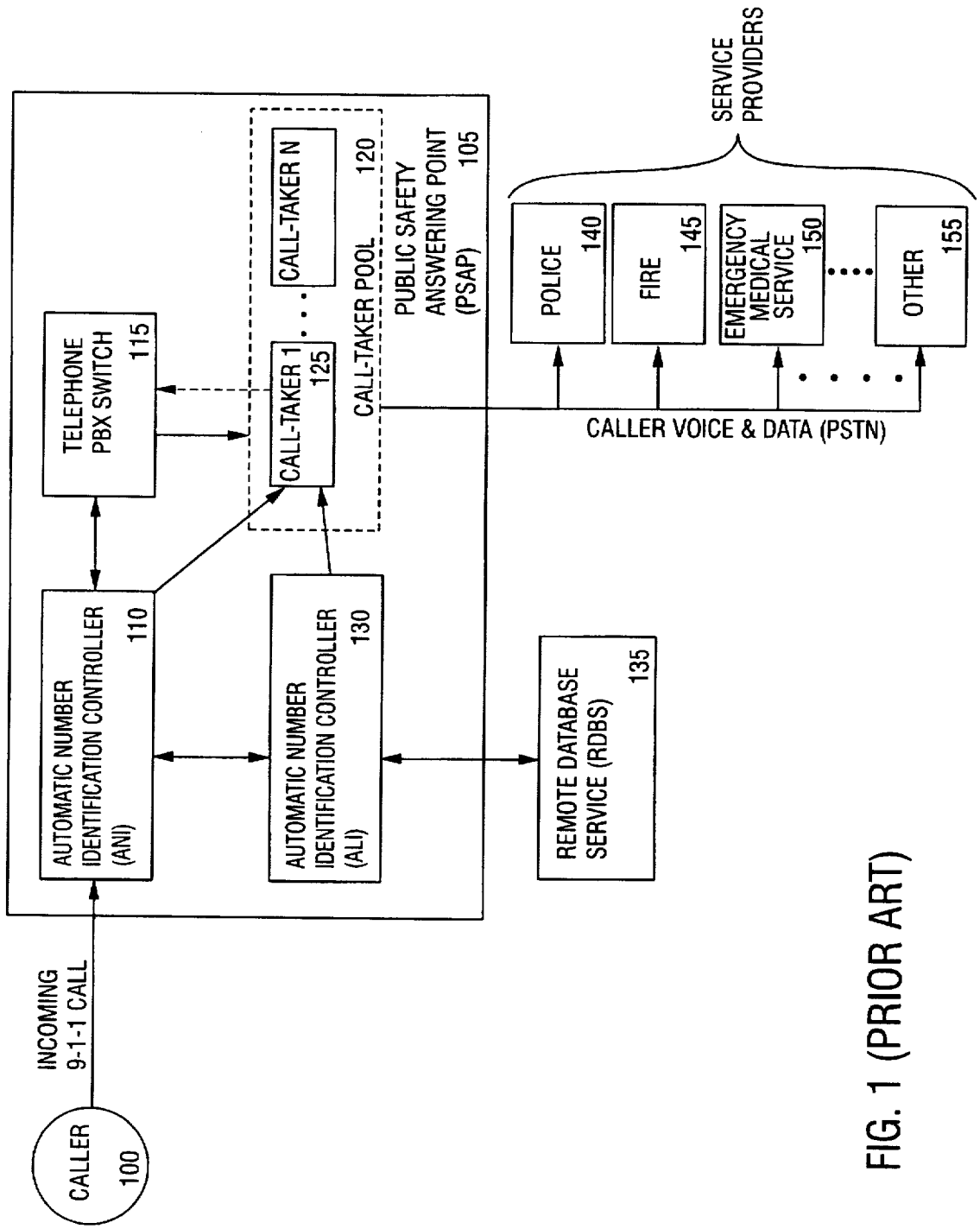
FIG. 1 is a block diagram representation of a prior art system for providing 9-1-1 caller information service.

Assignment of the incoming call to a specific call-taker and the retrieval of the caller's location information via the automatic location identification (ALI) controller 130 and remote database system (RDBS) 135 is done in a fashion similar to that described in the prior art system of FIG. 1.

In accordance with the invention, each service provider (e.g., Police, Fire, Emergency Medical Services, and other services) has installed one or more call processing units (215, 220, 225, and 230 respectively) which are implemented as clients (in a client/server computer environment) on a local area network (LAN) 210 and are dedicated to computer integrated telephony and supporting functions as described below. The host computer 205 functions as the network server, providing functional connectivity between the telephone PBX switch 205 and the call processing units. In general, the LAN 210 is used to transmit caller identification and location information to a service provider's call processing unit. It is noted that the computer 205 could, in an alternative embodiment, be implemented as a plurality of computers. Additionally, the PSAP and service provides could be connected via a plurality of LANs, rather than a single LAN as shown in FIG. 2.

When the PSAP call-taker wishes to transfer a 9-1-1 call to a service provider, the request is made via the appropriate call processing unit (e.g., 215, 220, or 225) via the LAN 210 to the host computer 205. The host computer 205 then issues appropriate instructions to the telephone PBX switch 200 to transfer the call. Call activity such as caller identification, caller location information, call routing information, and digital voice recording is captured and stored for later use.

4.2 Human Factors Design

Key features of a 9-1-1 calls for service system, in accordance with the claimed invention, are the ability to: (1) decrease the time required for an initial call-taker to transfer an incoming call to one or more service providers; (2) reduce line noise associated with analog circuit bridging; (3) decrease the time required for an initial call-taker to determine the location of a mobile caller; and (4) integrate support functions such as digitized voice capture and storage. All of these attributes are associated with human factors aspects of a 9-1-1 calls for service system. In one embodiment of the invention, the human factors attributes cited above are addressed through a graphical user interface and touch-screen video display.

Figure 3:
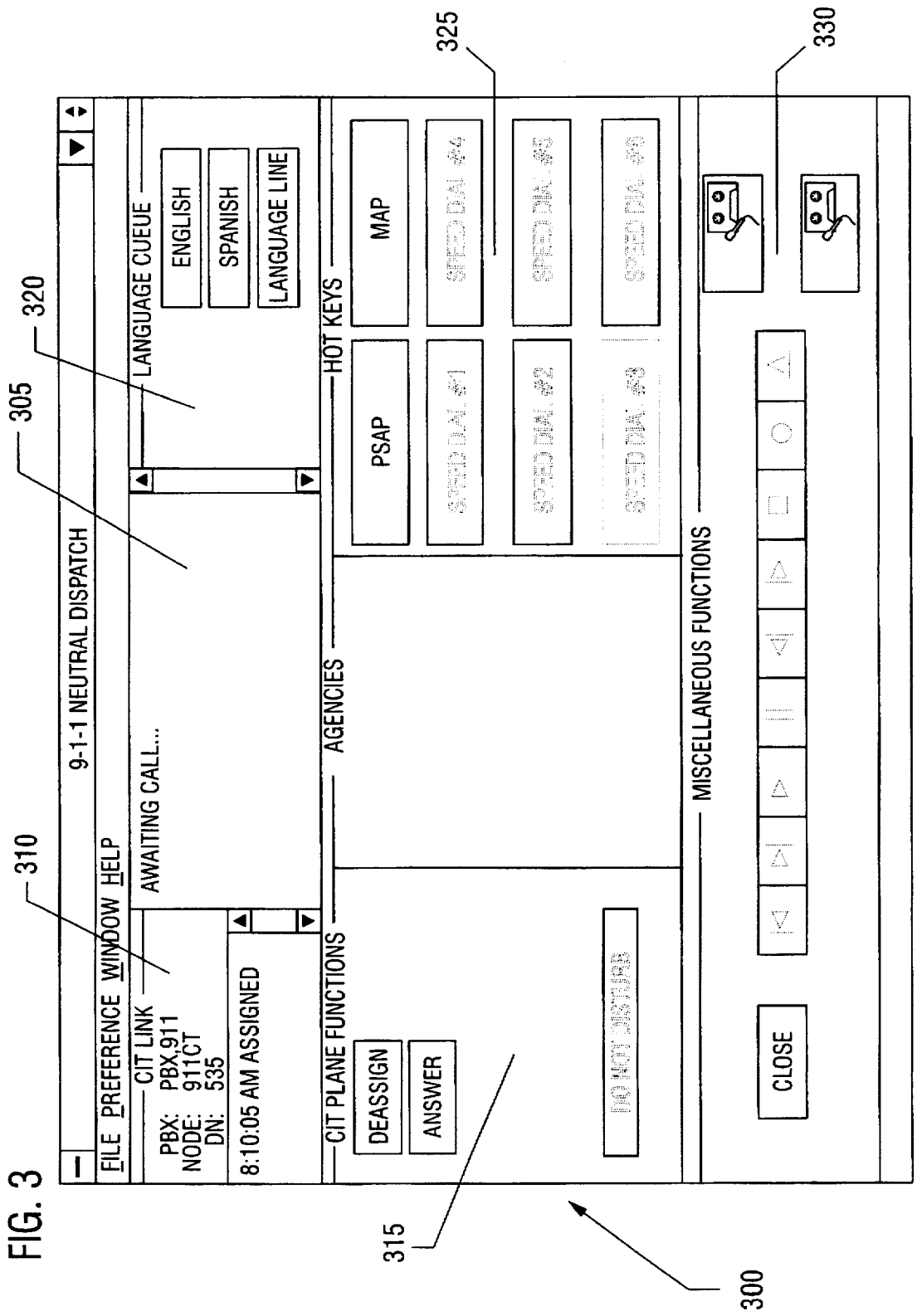
FIG. 3 is a display screen representation of a call-taker's "Waiting For Call" display in accordance with the invention.

FIG. 3 shows a display 300 that an initial PSAP call-taker would see prior to receiving a call. The screen display 300 is divided into a number of fields (discussed in more detail below), in which icons are used to represent buttons. To select/invoke the function associated with a button, the call-taker touches the screen at a location corresponding to that button's graphical image. It will of course be realized that, depending on the ergonomic requirements of the system, the aforementioned touch-screen could be replaced by a standard video display and a graphical pointing device such as a "mouse" or function keys.

The ANI/ALI field 305 is used to display information associated with the calling party and includes, but is not limited to, (1) identification or telephone number; (2) address; and (3) class of telephone service, e.g., residential, business, coin phone.

The call history field 310 may be used to display information about the current telephone number (when a call is incoming) such as the number of times the calling party number was used to access the 9-1-1 system during the past day, week, month, etc.

The call processing functions field 315 are touch-screen buttons that implement a number of call processing functions. In the current embodiment these functions include connect, disconnect, hold, conference, and the like, similar to those found on ordinary digital telephone sets. The precise number of processing functions available can be directly related to the status of the call-taker. For instance, if the call-taker is waiting for a call, the only call processing function buttons available are "answer" and "deassign" as shown in field 315.

The language conference field 320, in the upper-right hand corner of display 300, provides the call-taker with the ability to automatically route incoming calls to one or more foreign language agent groups. For instance, to transfer an incoming call to a Spanish speaking agent group, the call-taker simply touches the icon whose image represents the Mexican flag. Other foreign language agent groups are accessed via conferencing the AT&T "LANGUAGE-LINE" button.

The speed-call field 325 contains screen buttons that are equivalent to programmable speed-dialing buttons on a typical digital telephone set. These buttons do not change as a function of call status but can be programmed to reflect the needs of the answering PSAP site, e.g., social service agencies.

The digital voice capture field 330 contains screen button controls to facilitate the capture, storage, and retrieval of digitized incoming calls. Button icons such as those found on ordinary VCR units are employed. In the current embodiment there is no button representing a record function as this feature is invoked automatically at the time an incoming call is received. For data security, permanent storage of digitized incoming calls can use optical write-once-read-many (WORM) disk units.

4.2(a) Incoming Call

Figure 4:
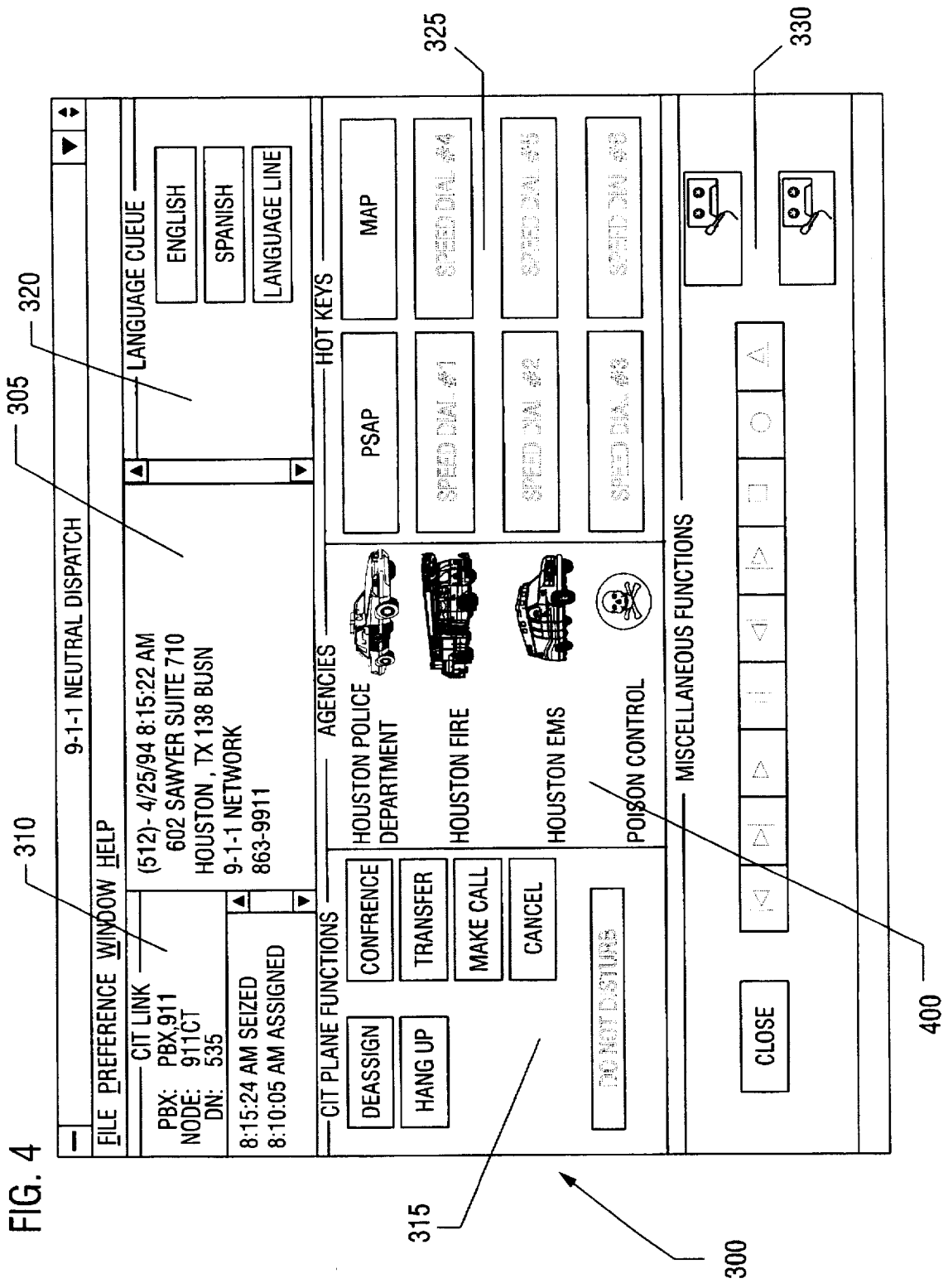
FIG. 4 is a display screen representation of a call-taker's "Processing" display in accordance with the invention.

When an incoming call arrives at a PSAP call-taker's station, that call-taker's display is updated as shown in FIG. 4. In addition to identification of the incoming calling number (see ANI/ALI field 305, call history field 310, and call processing functions field 315), a new selective routing field 400 is displayed.

The selective routing field 400 is comprised of four icons, one for each currently supported service provider: Police, Fire, Emergency Medical Services, and Other. In the current embodiment the 'Other' icon is assigned to a Poison Control service provider. To aid the call-taker, distinctive icons representing each of the aforementioned service provides are used.

To conference the call-taker, incoming caller and one or more service providers, the call-taker would touch the screen over the icon(s) representing the selected service provider (s). An important aspect of the invention is that the specific service provider contacted by the call-taker is a function of the calling party's location. This feature is known in the art as selective routing.

Figure 5:
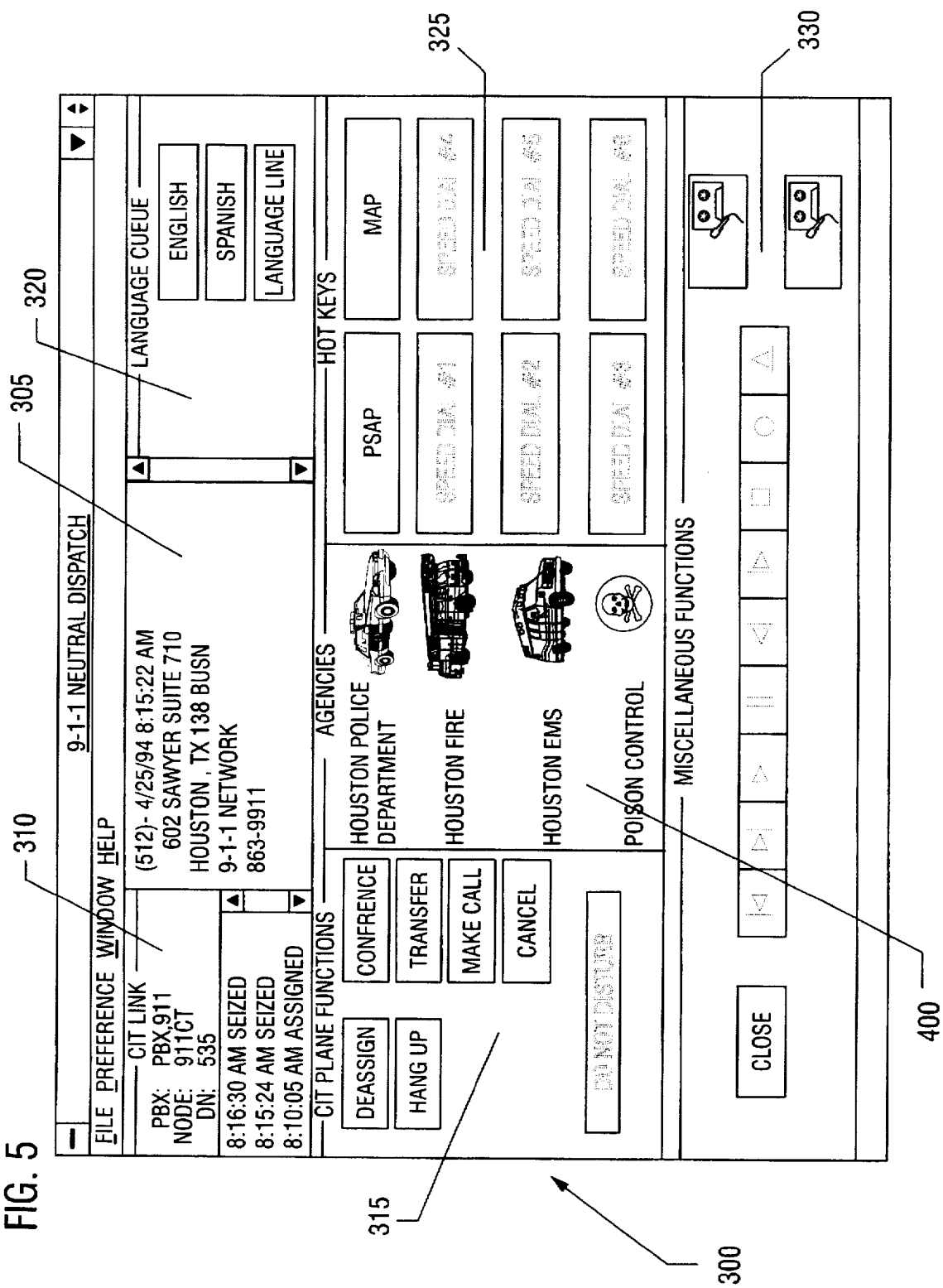
FIG. 5 is a display screen representation of a call-taker's "Call Conference to a Fire service provider" display (as indicated by a graphic image of an off-hook telephone instrument next to the Fire service provider's icon) in accordance with the invention.

If the incoming call is conferenced to a service provider on the LAN 210, information about each call-taker is available for retrieval and can be displayed on the initial and service provider's call-taker displays. Such information may include, but is not limited to, name, position number, and a digitized photographic image. See FIG. 5.

Conferencing of additional agencies (i.e., in addition to those represented by icons in the selective routing field 400) can be accomplished by selecting the appropriate button in the speed-call field 325.

After the initial call-taker has conferenced the incoming call to one or more service providers the call-taker can, at his or her discretion, drop out of the conversation by completing the transfer. Call transfer is completed when the call-taker selects the "RELEASE" button in the call processing functions field 315. After transferring the call, the call-taker station becomes ready to receive another incoming call.

4.2(b) Mobile Call Processing

In prior art embodiments of 9-1-1 calls for service, the location of a mobile telephone caller is difficult to determine in that the call is generated by a radio transceiver with no known fixed location.

In prior art 9-1-1 systems mobile relay stations, also known as cell sites, route 9-1-1 calls for service based on certain geographic factors impacting their radio coverage area and is typically accomplished by assigning a single telephone number (known as a trunk pilot number) from the PSTN. In these systems the 9-1-1 call is routed to a PSAP depending on the trunk pilot number. This means that a legitimate (i.e., a unique seven digit number representing the caller's mobile telephone number) calling number is not available at the PSAP call-taker's display. Thus, the call-taker must query the caller to determine their precise location and, with the aid of local street maps, determine which service providers should be notified. This need to use local maps is often a time consuming process and significantly impacts the quality and speed of 9-1-1 service that can be provided. Additionally, because the PSAP call-taker does not having a legitimate number with which to contact the caller, the call-taker cannot reestablish contact with the caller should the call become disconnected.

In the current embodiment of the invention, an incoming mobile call is routed directly from the call's mobile telephone switching facility to a telephone PBX switch 200. The mobile telephone switching service transmits the call in digital format and includes data elements associated with the caller. These data elements may include, but are not limited to, a unique seven digit number representing the caller's mobile telephone number, identification of the mobile telephone company, and the unique identification of the originating mobile relay or cell site.

Figure 6:
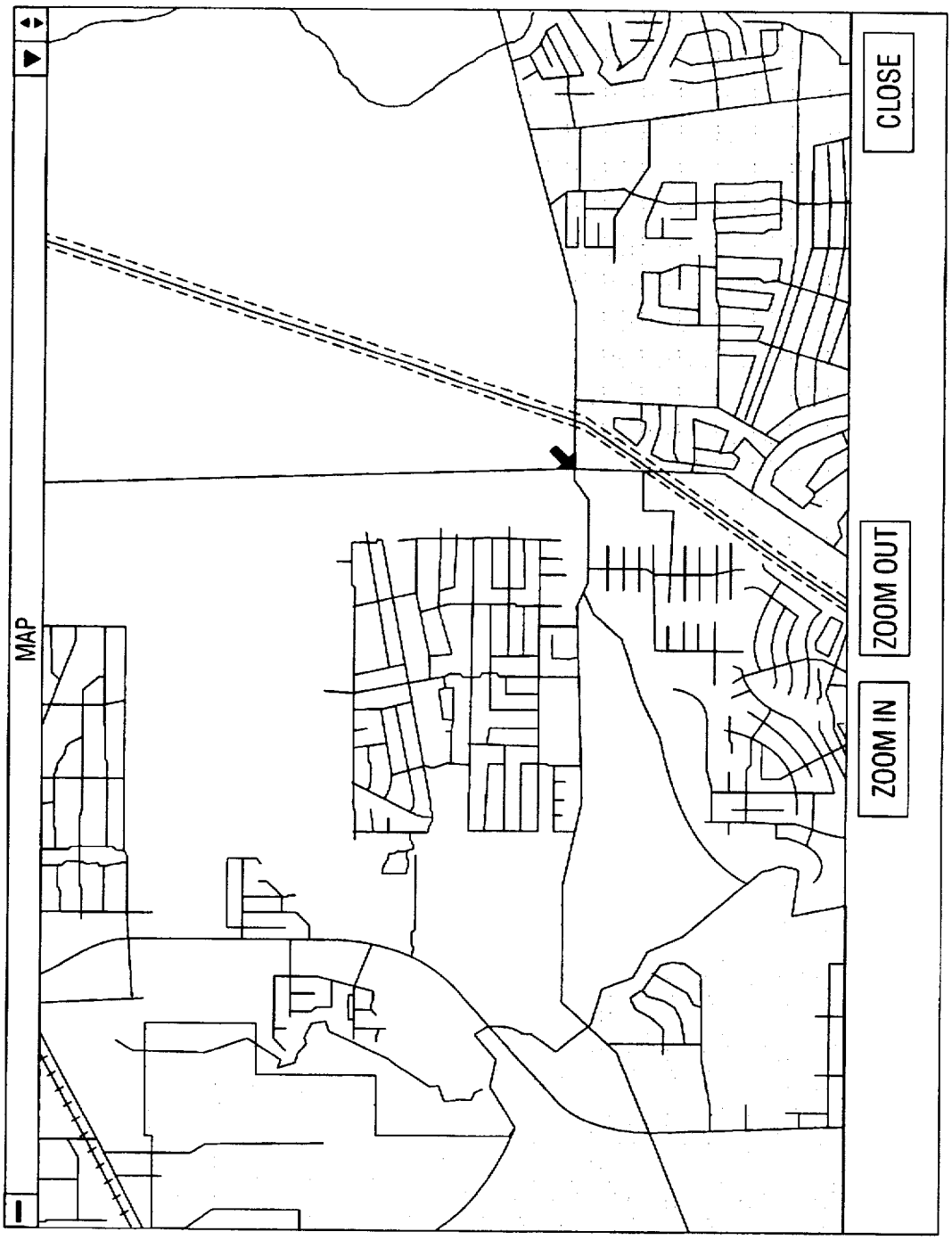
FIG. 6 is a display screen representation of a call-taker's "Digitized Map" display in accordance with the invention.

The unique caller identification number is displayed at the PSAP call-taker's video display unit. A digitized map associated with the originating cell site identifier is also displayed. As shown in FIG. 6, this allows the call-taker to identify the precise location of the caller by touching the screen corresponding to the location of the caller as it is communicated by the caller. Once the location of the caller is determined in this manner, the automatic selective routing fields 400 are automatically populated with the appropriate information based on the caller's location. Additionally, a database consisting of streets and block ranges for the caller's originating cell site coverage area is available for reference. Using this database the call-taker can also call up a digitized map.

4.3 Some Benefits of the Invention

Benefits of the claimed inventive method include:

1. Reduce the connectivity time required to conference the call-taker, incoming caller and one or more service providers by 4 to 6 seconds.

2. Reduce the time required for processing incoming mobile telephone calls by 30 seconds to 5 minutes.

3. Increases the level of accuracy in the processing of 9-1-1 calls for service by automating many of the tasks normally performed by a call-taker.

4. Elimination of analog bridging noises associated with conference calling. Thus, the caller will not think they have been disconnected during the call transfer process.

5. Digital capture of incoming voice and associated data of each call is automatic. The digitized data associated with each incoming call includes calling number, time and date of call, call duration, and call-taker identification.

6. With the information associated with the digitized voice data, a database is made available which allows for quick and easy recall of past incoming calls. It should be noted that prior art tape recordings of incoming voice are often subpoenaed. It may take from several hours to several days to locate and copy a specified/target phone conversation. This time has been reduced to a matter of minutes by the method of the invention.

7. The accumulation and processing of data associated with each received 9-1-1 call for service allows for statistical analysis and assists in personal and equipment management of the 9-1-1 calls for service system.

8. The rapid, convenient, and automated routing of an incoming call from a nonEnglish speaking caller to an appropriate call-taker, e.g., a call-taker who can effectively communicate with the non-English speaking caller.

9. The graphical user interface environment utilized by the inventive method and the supporting process (e.g., automated routing, digital voice capture, etc.) drastically reduces the complexity of the call-taker tasks. This, in turn, reduces the level of stress typically associated with the duties of a call-taker in a public safety emergency communication environment.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

Appendix A

```
911MDI.FRM - 1

VERSION 2.00
Begin MDIForm frmMDI
   Caption         =   "9-1-1 Neutral Dispatch"
   ClientHeight    =   6210
   ClientLeft      =   750
   ClientTop       =   1710
   ClientWidth     =   9015
   Height          =   6900
   Left            =   690
   LinkTopic       =   "MDIForm1"
   ScrollBars      =   0   'False
   Top             =   1080
   Width           =   9135
   Begin PictureBox Picture1
      Align           =   2  'Align Bottom
      BackColor       =   &H00C0C0C0&
      Height          =   240
      Left            =   0
      ScaleHeight     =   210
      ScaleWidth      =   8985
      TabIndex        =   0
      Top             =   5970
      Width           =   9012
      Begin CommonDialog CMD1
         Left            =   8085
         Top             =   0
      End
      Begin Label cMsg
         BackColor       =   &H00C0C0C0&
         Caption         =   "Ready"
         FontBold        =   -1  'True
         FontItalic      =   0   'False
         FontName        =   "Arial"
         FontSize        =   7.5
         FontStrikethru  =   0   'False
         FontUnderline   =   0   'False
         Height          =   200
         Left            =   120
         TabIndex        =   1
         Top             =   0
         Width           =   9372
      End
   End
   Begin Menu DBMenu
      Caption         =   "&File"
      Begin Menu DBOpen
         Caption         =   "&Open DataBase..."
         Begin Menu DBOpen_Access
            Caption         =   "&MS Access 1.1"
         End
         Begin Menu DBOpen_dBASE3
            Caption         =   "&dBASE III..."
         End
         Begin Menu DBOpen_dBASE4
            Caption         =   "dB&ASE IV..."
         End
         Begin Menu DBOpen_FoxPro
            Caption         =   "&FoxPro 2.0..."
         End
         Begin Menu DBOpen_Fox25
            Caption         =   "Fo&xPro 2.5..."
```

A-1

911MDI.FRM - 2

```
      End
      Begin Menu DBOpen_Paradox
         Caption         =    "&Paradox 3.X..."
      End
      Begin Menu DBOpen_Btrieve
         Caption         =    "&Btrieve..."
      End
      Begin Menu DBOpen_ODBC
         Caption         =    "&ODBC..."
      End
   End
   Begin Menu DBClose
      Caption         =    "&Close DataBase"
      Shortcut        =    ^C
      Visible         =    0    'False
   End
   Begin Menu DBProperties
      Caption         =    "&Properties..."
      Visible         =    0    'False
   End
   Begin Menu DBNew
      Caption         =    "&New..."
      Begin Menu DBNew_Access
         Caption         =    "&MS Access..."
      End
      Begin Menu DBNew_dBASE3
         Caption         =    "&dBASE III..."
      End
      Begin Menu DBNew_dBASE4
         Caption         =    "dB&ASE IV..."
      End
      Begin Menu DBNew_FoxPro
         Caption         =    "&FoxPro 2.0..."
      End
      Begin Menu DBNew_Fox25
         Caption         =    "Fo&xPro 2.5..."
      End
      Begin Menu DBNew_Paradox
         Caption         =    "&Paradox 3.X..."
      End
      Begin Menu DBNew_Btrieve
         Caption         =    "&Btrieve..."
      End
      Begin Menu DBNew_ODBC
         Caption         =    "&ODBC..."
      End
   End
   Begin Menu menubar1
      Caption         =    "-"
   End
   Begin Menu DBAbout
      Caption         =    "&About"
   End
   Begin Menu Exit
      Caption         =    "E&xit"
      Shortcut        =    ^X
   End
End
Begin Menu PrefMenu
   Caption         =    "&Preferences"
   Begin Menu PrefOpenOnStartup
```

A-2

911MDI.FRM - 3
```
            Caption         =   "&Open Last DataBase on Startup"
        End
        Begin Menu menubar4
            Caption         =   "-"
        End
        Begin Menu PrefQueryTimeout
            Caption         =   "&Query Timeout Value..."
        End
        Begin Menu PrefLoginTimeout
            Caption         =   "&Login Timeout Value..."
        End
        Begin Menu PrefMaxRows
            Caption         =   "&Max Grid View Rows..."
        End
        Begin Menu menubar5
            Caption         =   "-"
        End
        Begin Menu PrefShowPerf
            Caption         =   "&Show Performance Numbers"
        End
   End
   Begin Menu WinMenu
        Caption         =   "&Window"
        Begin Menu WinTile
            Caption         =   "&Tile"
        End
        Begin Menu WinCascade
            Caption         =   "&Cascade"
        End
        Begin Menu WinArrange
            Caption         =   "Arrange &Icons"
            Shortcut        =   ^I
        End
        Begin Menu menubar2
            Caption         =   "-"
        End
        Begin Menu WinAnswer
            Caption         =   "&Answer"
            Shortcut        =   ^A
        End
        Begin Menu WinPSAP
            Caption         =   "&PSAP List"
            Enabled         =   0   'False
            Shortcut        =   ^P
        End
        Begin Menu WinESN
            Caption         =   "&ESN List"
            Shortcut        =   ^E
        End
        Begin Menu WinSuper
            Caption         =   "Super&visor"
            Shortcut        =   ^V
        End
        Begin Menu WinMaint
            Caption         =   "&Maintenance"
            Begin Menu WinAgency
                Caption         =   "Agencies"
            End
            Begin Menu WinCode
                Caption         =   "Codes"
            End
```

A-3

```
911MDI.FRM - 4
      End
   End
   Begin Menu HelpMenu
      Caption        =   "&Help"
   End
End
```

911MDI.FRM - 1

```
Option Explicit
'Option Compare Text

Sub NewLocalISAM ()
    Dim nn As String
    Dim d As database
    On Error GoTo NewISAMErr nn = InputBox("Enter Name for New ISAM Database:")
    If nn = "" Then Exit Sub If Mid(nn, Len(nn), 1) <> "\" Then nn = nn + "\"

MkDir Mid(nn, 1, Len(nn) - 1)

gstDBName = nn
    OpenLocalDB True

If gfDBOpenFlag = True Then
       DBProperties.Visible = True
       DBClose.Visible = True
    End If GoTo NewISAMEnd NewISAMErr:
   If Err = 75 Then Resume Next  'catch the case where dir exists
   ShowError
   Resume NewISAMEnd NewISAMEnd:

End Sub

Sub OpenLocalDB (doit As Integer)
   Dim Connect As String, DataBaseName As String On Error GoTo OpenError If gfDBOpenFlag = True Then
     Call DBClose_Click
   End If If gfDBOpenFlag = True Then
     Beep
     MsgBox "You must Close First!", 48
     Exit Sub
   Else
     Select Case gstDatatype
       Case "MS Access"
          CMD1.Filter = "Access DBs (*.mdb)|*.mdb|All Files (*.*)|*.*"
          CMD1.DialogTitle = "Open MS Access Database"
       Case "dBASE III"
          CMD1.Filter = "dBASE III DBs (*.dbf)|*.dbf"
          CMD1.DialogTitle = "Open dBASE III Database"
       Case "dBASE IV"
          CMD1.Filter = "dBASE IV DBs (*.dbf)|*.dbf"
          CMD1.DialogTitle = "Open dBASE IV Database"
       Case "FoxPro 2.0"
```

```
911MDI.FRM - 2
      CMD1.Filter = "FoxPro DBs (*.dbf)|*.dbf"
      CMD1.DialogTitle = "Open FoxPro 2.0 Database"
   Case "FoxPro 2.5"
      CMD1.Filter = "FoxPro DBs (*.dbf)|*.dbf"
      CMD1.DialogTitle = "Open FoxPro 2.5 Database"
   Case "Paradox 3.X"
      CMD1.Filter = "Paradox DBs (*.db)|*.db"
      CMD1.DialogTitle = "Open Paradox 3.X Database"
   Case "Btrieve"
      CMD1.Filter = "Btrieve DBs (FILE.DDF)|FILE.DDF"
      CMD1.DialogTitle = "Open Btrieve Database"
End Select CMD1.FilterIndex = 1
CMD1.Filename = gstDBName    '""
CMD1.CancelError = True If doit = False Then
   CMD1.Action = 1

If CMD1.Filename <> "" Then
      gstDBName = CMD1.Filename
   Else
      Exit Sub
   End If
  End If
End If MsgBar "Opening " & gstDatatype & " DataBase", True SetHourglass Me Select Case gstDatatype
   Case "dBASE III"
      Connect = "dBASE III"
      DataBaseName = StripFileName(gstDBName)
   Case "dBASE IV"
      Connect = "dBASE IV"
      DataBaseName = StripFileName(gstDBName)
   Case "FoxPro 2.0"
      Connect = "FoxPro 2.0"
      DataBaseName = StripFileName(gstDBName)
   Case "FoxPro 2.5"
      Connect = "FoxPro 2.5"
      DataBaseName = StripFileName(gstDBName)
   Case "Paradox 3.X"
      Connect = "Paradox 3.X"
      DataBaseName = StripFileName(gstDBName)
   Case "Btrieve"
      Connect = "Btrieve;"
      DataBaseName = gstDBName
   Case Else
      Connect = ""
      DataBaseName = gstDBName
End Select Set gCurrentDB = OpenDatabase(DataBaseName, False, False, Connect)
If gfDBOpenFlag = True Then
   CloseAllDynasets
End If
```

A-6

```
911MDI.FRM - 3
    gfTransPending = False gCurrentDB.QueryTimeout = glQueryTimeout 'success
    gfDBOpenFlag = True
    DBProperties.Visible = True
    DBClose.Visible = True
    MsgBar "", False
    ResetMouse Me
    Exit Sub OpenError:
    ResetMouse Me
    gfDBOpenFlag = False
    gstDBName = ""
    gstDatatype = ""
    If Err <> 32755 Then      'check for common dialog cancelled
      ShowError
    End If
    Resume OpenEnd OpenEnd:

End Sub

Sub UtilCloseAll_Click ()
  CloseAllDynasets
End Sub

Sub DBAbout_Click ()
  MsgBar "Press any key to Close About Box", False
  AboutBox.Show MODAL
  MsgBar "", False
End Sub Sub DBClose_Click ()
  On Error GoTo DBCloseErr If gfDBChanged Then
    If MsgBox("Data has been changed, Commit it?", MSGBOX_TYPE) = YES Then
      gCurrentDB.CommitTrans
      gfDBChanged = False
    Else
      If MsgBox("RollBack All changes?", MSGBOX_TYPE) = YES Then
        gCurrentDB.Rollback
        gfDBChanged = False
      Else
        Beep
        MsgBox "Can't Close with Transactions Pending!", 48
        Exit Sub
      End If
    End If
  End If CloseAllDynasets
  gCurrentDB.Close DBProperties.Visible = False
  DBClose.Visible = False
```

```
911MDI.FRM - 4
    gfDBOpenFlag = False
    gfTransPending = False
    gstDBName = ""

GoTo DBCloseEnd

DBCloseErr:
    ShowError
    Resume DBCloseEnd

DBCloseEnd:

End Sub

Sub DBNew_Access_Click ()
    Dim nn As String
    Dim d As database
    Dim v10 As Integer
    On Error GoTo NewAccErr nn = InputBox("Enter Name for New MS Access Database:")
    If nn = "" Then Exit Sub If MsgBox("Make New Database Access 1.0 Compatible?", MSGBOX_TYPE) = YES Then
       Set d = CreateDatabase(nn, DB_CREATE_GENERAL, DB_VERSION10)
    Else
       Set d = CreateDatabase(nn, DB_CREATE_GENERAL, 0)
    End If
    d.Close gstDatatype = "MS Access"
    gstDBName = nn
    OpenLocalDB True If gfDBOpenFlag = True Then
      DBProperties.Visible = True
      DBClose.Visible = True End If GoTo NewAccEnd
NewAccErr:
   ShowError
   Resume NewAccEnd NewAccEnd:

End Sub

Sub DBNew_Btrieve_Click ()
    gstDatatype = "Btrieve"
    NewLocalISAM
End Sub

Sub DBNew_dBASE3_Click ()
    gstDatatype = "dBASE III"
    NewLocalISAM
End Sub Sub DBNew_dBASE4_Click ()
```

911MDI.FRM - 5

```
   gstDatatype = "dBASE IV"
   NewLocalISAM
End Sub

Sub DBNew_FoxPro_Click ()
   gstDatatype = "FoxPro 2.0"
   NewLocalISAM
End Sub

Sub DBNew_ODBC_Click ()
  Dim driver As String

On Error GoTo DBNErr
  MsgBar "Enter New Database Parameters", False

'driver must be an valid entry in ODBCINST.INI
  driver = InputBox("Enter Driver Name from ODBCINST.INI File:", "Driver Name", DEFAULTDRIVER)

RegisterDatabase "", driver, False, ""

SendKeys "%FOO"   'force open database dialog

GoTo DBNEnd

DBNErr:
  ShowError
  Resume DBNEnd

DBNEnd:
  MsgBar "", False

End Sub

Sub DBNew_Paradox_Click ()
   gstDatatype = "Paradox 3.X"
   NewLocalISAM
End Sub Sub DBOpen_Access_Click ()
   gstDatatype = "MS Access"
   OpenLocalDB False
End Sub Sub DBOpen_Btrieve_Click ()
   gstDatatype = "Btrieve"
   OpenLocalDB False
End Sub Sub DBOpen_dBASE3_Click ()
   gstDatatype = "dBASE III"
   OpenLocalDB False
End Sub Sub DBOpen_dBASE4_Click ()
   gstDatatype = "dBASE IV"
   OpenLocalDB False
End Sub Sub DBOpen_Fox25_Click ()
```

A-9

911MDI.FRM - 6

```
    gstDatatype = "FoxPro 2.5"
    OpenLocalDB False
End Sub

Sub DBOpen_FoxPro_Click ()
    gstDatatype = "FoxPro 2.0"
    OpenLocalDB False
End Sub Sub DBOpen_ODBC_Click ()
    If gfDBOpenFlag = True Then
        Call DBClose_Click
    End If If gfDBOpenFlag = True Then
        Beep
        MsgBox "You must Close First!", 48
    Else
        fOpenDB.Show MODAL
    End If If gfDBOpenFlag = True Then
        DBProperties.Visible = True
        DBClose.Visible = True
    End If
End Sub Sub DBOpen_Paradox_Click ()
    gstDatatype = "Paradox 3.X"
    OpenLocalDB False
End Sub Sub Exit_Click ()
  Unload Me
End Sub Sub MDIForm_Load ()
    Dim st As String
    Dim x As Integer Dim tmp As String
    crlf = Chr(13) + Chr(10)

tmp = String$(255, 32)
    PagingProductInstalled = True
    ODBCProductInstalled = True 'write ISAM entries in INI file just in case
    x = OSWritePrivateProfileString("Installable ISAMS", "Paradox 3.X", "PDX110.DLL", "E911.INI")
    x = OSWritePrivateProfileString("Installable ISAMS", "dBASE III", "XBS110.DLL", "E911.INI")
    x = OSWritePrivateProfileString("Installable ISAMS", "dBASE IV", "XBS110.DLL", "E911.INI")
    x = OSWritePrivateProfileString("Installable ISAMS", "FoxPro 2.0", "XBS110.DLL", "E911.INI")
    x = OSWritePrivateProfileString("Installable ISAMS", "FoxPro 2.5", "XBS110.DLL", "E911.INI")
    x = OSWritePrivateProfileString("Installable ISAMS", "Btrieve", "BTRV110.DLL", "E911.INI")
    x = OSWritePrivateProfileString("dBase ISAM", "Deleted", "On", "E911.INI")
```

A-10

911MDI.FRM - 7

```
x = OSGetWindowsDirectory(tmp, 255)
st = Mid$(tmp, 1, x)
SetDataAccessOption 1, st + "\E911.ini"

SetDefaultWorkspace "admin", ""

gwMaxGridRows = Val(GetINIString("MaxRows", "250"))
glQueryTimeout = Val(GetINIString("QueryTimeout", "5"))
glLoginTimeout = Val(GetINIString("LoginTimeout", "20"))
st = GetINIString("OpenOnStartup", "No")
If UCase(st) = "YES" Then
   PrefOpenOnStartup.Checked = True
Else
   PrefOpenOnStartup.Checked = False
End If
st = GetINIString("ShowPerf", "No")
If UCase(st) = "YES" Then
   PrefShowPerf.Checked = True
Else
   PrefShowPerf.Checked = False
End If
'get the last used database out of the INI file
gstDatatype = GetINIString("DataType", "")
gstDBName = GetINIString("Server", "")
gstDatabase = GetINIString("DataBase", "")
gstUserName = GetINIString("UserName", "")
gstPassword = GetINIString("Password", "")

If PrefOpenOnStartup.Checked = True Then
   If gstDatatype = "MS Access" Then
      SendKeys "%FOM"
   ElseIf gstDatatype = "dBASE III" Then
      SendKeys "%FOD"
   ElseIf gstDatatype = "dBASE IV" Then
      SendKeys "%FOA"
   ElseIf gstDatatype = "FoxPro 2.0" Then
      SendKeys "%FOF"
   ElseIf gstDatatype = "FoxPro 2.5" Then
      SendKeys "%FOX"
   ElseIf gstDatatype = "Paradox 3.X" Then
      SendKeys "%FOP"
   ElseIf gstDatatype = "Btrieve" Then
      SendKeys "%FOB"
   ElseIf gstDatatype = "ODBC" Then
      SendKeys "%FOO"
   End If
End If x = Val(GetINIString("WindowState", "2"))
If x <> 1 Then
   WindowState = x
Else
   WindowState = 0
End If
If x = 0 Then
   x = Val(GetINIString("WindowLeft", "0"))
   Left = x
   x = Val(GetINIString("WindowTop", "0"))
   Top = x
   x = Val(GetINIString("WindowWidth", "9135"))
```

911MDI.FRM - 8
```
    Width = x
    x = Val(GetINIString("WindowHeight", "6900"))
    Height = x
  End If
  Me.Show End Sub Sub MDIForm_QueryUnload (Cancel As Integer, UnloadMode As Integer)
  Dim x As Integer
  Dim st As String On Error Resume Next x = OSWritePrivateProfileString("E911", "DataType", gstDatatype, "E911.INI")
  x = OSWritePrivateProfileString("E911", "Server", gstDBName, "E911.INI")
  x = OSWritePrivateProfileString("E911", "DataBase", gstDatabase, "E911.INI")
  x = OSWritePrivateProfileString("E911", "UserName", gstUserName, "E911.INI")
  x = OSWritePrivateProfileString("E911", "Password", gstPassword, "E911.INI")

If PrefOpenOnStartup.Checked = True Then
    st = "Yes"
  Else
    st = "No"
  End If
  x = OSWritePrivateProfileString("E911", "OpenOnStartup", st, "E911.INI")
  If PrefShowPerf.Checked = True Then
    st = "Yes"
  Else
    st = "No"
  End If
  x = OSWritePrivateProfileString("E911", "ShowPerf", st, "E911.INI")

x = OSWritePrivateProfileString("E911", "WindowState", CStr(WindowState), "E91
1.INI")
    If WindowState <> 2 Then
      x = OSWritePrivateProfileString("E911", "WindowTop", CStr(Top), "E911.INI")
      x = OSWritePrivateProfileString("E911", "WindowLeft", CStr(Left), "E911.INI"
)
      x = OSWritePrivateProfileString("E911", "WindowWidth", CStr(Width), "E911.IN
I")
      x = OSWritePrivateProfileString("E911", "WindowHeight", CStr(Height), "E911.
INI")
    End If x = OSWritePrivateProfileString("E911", "MaxRows", CStr(gwMaxGridRows), "E911.
INI")
  x = OSWritePrivateProfileString("E911", "QueryTimeout", CStr(glQueryTimeout),
"E911.INI")
  x = OSWritePrivateProfileString("E911", "LoginTimeout", CStr(glLoginTimeout),
"E911.INI")
    If fCit.WindowState <> 1 Then
      x = OSWritePrivateProfileString("E911", "AnswerWindowTop", CStr(fCit.Top), "
E911.INI")
      x = OSWritePrivateProfileString("E911", "AnswerWindowLeft", CStr(fCit.Left),
 "E911.INI")
      x = OSWritePrivateProfileString("E911", "AnswerWindowWidth", CStr(fCit.Width
), "E911.INI")
      x = OSWritePrivateProfileString("E911", "AnswerWindowHeight", CStr(fCit.Heig
ht), "E911.INI")
    End If
```

911MDI.FRM - 9

```
  If gfDBChanged Then
    If MsgBox("Data has been changed, Commit it?", MSGBOX_TYPE) = YES Then
      gCurrentDB.CommitTrans
    End If
  End If CloseAllDynasets
  If gfDBOpenFlag Then gCurrentDB.Close End
End Sub Sub PrefLoginTimeout_Click ()
  On Error GoTo LTErr
  Dim nval As String nval = InputBox("Login Timeout is currently " & glLoginTimeout & " seconds." +
Chr(13) + Chr(10) + "Enter New Value:")
  If nval = "" Then Exit Sub 'try to set the new value
  If Val(nval) >= 0 Then
    glLoginTimeout = Val(nval)
  End If GoTo LTEnd LTErr:
  ShowError
  Resume LTEnd LTEnd:

End Sub

Sub PrefOpenOnStartup_Click ()
  'toggle the menu item
  If PrefOpenOnStartup.Checked = True Then
    PrefOpenOnStartup.Checked = False
  Else
    PrefOpenOnStartup.Checked = True
  End If
End Sub Sub PrefQueryTimeout_Click ()
  On Error GoTo QTErr
  Dim nval As String nval = InputBox("Query Timeout is currently " & gCurrentDB.QueryTimeout & " se
conds." + Chr(13) + Chr(10) + "Enter New Value:")
  If nval = "" Then Exit Sub 'try to set the new value
  gCurrentDB.QueryTimeout = Val(nval)
  glQueryTimeout = Val(nval)

GoTo QTEnd

QTErr:
  ShowError
```

A-13

```
911MDI.FRM - 10
   'reset the form control after the error
   glQueryTimeout = gCurrentDB.QueryTimeout
   Resume QTEnd QTEnd:

End Sub

Sub PrefShowPerf_Click ()
   If PrefShowPerf.Checked = True Then
      PrefShowPerf.Checked = False
   Else
      PrefShowPerf.Checked = True
   End If
End Sub Sub WinAnswer_Click ()
    fCit.WindowState = 0
    frmPSAP.WindowState = 0
    frmESN.WindowState = 0
    frmESN.Show
    WinPSAP.Enabled = True
End Sub Sub WinArrange_Click ()
  Me.Arrange 3
End Sub Sub WinCascade_Click ()
  Me.Arrange 0
End Sub Sub WinESN_Click ()
    frmESN.WindowState = 0
    frmESN.Show End Sub Sub WinPSAP_Click ()
    frmPSAP.WindowState = 0

End Sub

Sub WinSuper_Click ()
    frmSuper.WindowState = 2
End Sub

Sub WinTile_Click ()
  Me.Arrange 2
End Sub
```

A-14

```
ABOUTBOX.FRM - 1

VERSION 2.00
Begin Form AboutBox
    BorderStyle     =   3   'Fixed Double
    Caption         =   "About RBS 9-1-1 Answer"
    ClientHeight    =   3855
    ClientLeft      =   3810
    ClientTop       =   2955
    ClientWidth     =   7785
    ControlBox      =   0   'False
    FontBold        =   -1  'True
    FontItalic      =   0   'False
    FontName        =   "System"
    FontSize        =   9.75
    FontStrikethru  =   0   'False
    FontUnderline   =   0   'False
    Height          =   4260
    Icon            =   (none)
    Left            =   3750
    LinkMode        =   1   'Source
    LinkTopic       =   "Form1"
    MaxButton       =   0   'False
    MinButton       =   0   'False
    ScaleHeight     =   3855
    ScaleWidth      =   7785
    Top             =   2610
    Width           =   7905
    Begin CommandButton OkayButton
        Cancel          =   -1  'True
        Caption         =   "&OK"
        Default         =   -1  'True
        FontBold        =   -1  'True
        FontItalic      =   0   'False
        FontName        =   "Arial"
        FontSize        =   9.75
        FontStrikethru  =   0   'False
        FontUnderline   =   0   'False
        Height          =   360
        Left            =   3480
        TabIndex        =   0
        Top             =   2880
        Width           =   1080
    End
    Begin PictureBox PIC_Icon
        BorderStyle     =   0   'None
        FontBold        =   -1  'True
        FontItalic      =   0   'False
        FontName        =   "Arial"
        FontSize        =   7.5
        FontStrikethru  =   0   'False
        FontUnderline   =   0   'False
        Height          =   1575
        Left            =   0
        ScaleHeight     =   1575
        ScaleWidth      =   2055
        TabIndex        =   1
        Top             =   0
        Width           =   2055
    End
    Begin Label Label1
        Alignment       =   2   'Center
        Caption         =   "Version .5a"
```

```
ABOUTBOX.FRM - 2
    FontBold        =   -1  'True
    FontItalic      =   0   'False
    FontName        =   "Arial"
    FontSize        =   7.5
    FontStrikethru  =   0   'False
    FontUnderline   =   0   'False
    Height          =   210
    Left            =   2760
    TabIndex        =   4
    Top             =   480
    Width           =   2535
End
Begin Label LAB_2
    Alignment       =   2   'Center
    Caption         =   "An Enhanced 9-1-1 Answer Product with CIT"
    FontBold        =   -1  'True
    FontItalic      =   0   'False
    FontName        =   "Arial"
    FontSize        =   7.5
    FontStrikethru  =   0   'False
    FontUnderline   =   0   'False
    Height          =   210
    Left            =   2280
    TabIndex        =   3
    Top             =   240
    Width           =   3615
    WordWrap        =   -1  'True
End
Begin Label LAB_1
    Alignment       =   2   'Center
    AutoSize        =   -1  'True
    Caption         =   "RBS 9-1-1 Neutral Answer"
    FontBold        =   -1  'True
    FontItalic      =   0   'False
    FontName        =   "Arial"
    FontSize        =   9.75
    FontStrikethru  =   0   'False
    FontUnderline   =   0   'False
    Height          =   240
    Left            =   2760
    TabIndex        =   2
    Top             =   0
    Width           =   2625
    WordWrap        =   -1  'True
End
Begin Image Image1
    Height          =   1590
    Left            =   3000
    Picture         =   (Bitmap)
    Top             =   840
    Width           =   2055
End
End
```

A-17

ABOUTBOX.FRM - 1

```
Sub Form_KeyPress (KeyAscii As Integer)
  Unload Me
End Sub

Sub Form_Load ()
  Left = (Screen.Width - Width) / 2
End Sub

Sub OkayButton_Click ()
  Unload Me
End Sub

Sub OkayButton_KeyPress (KeyAscii As Integer)
  Unload Me
End Sub
```

A 18

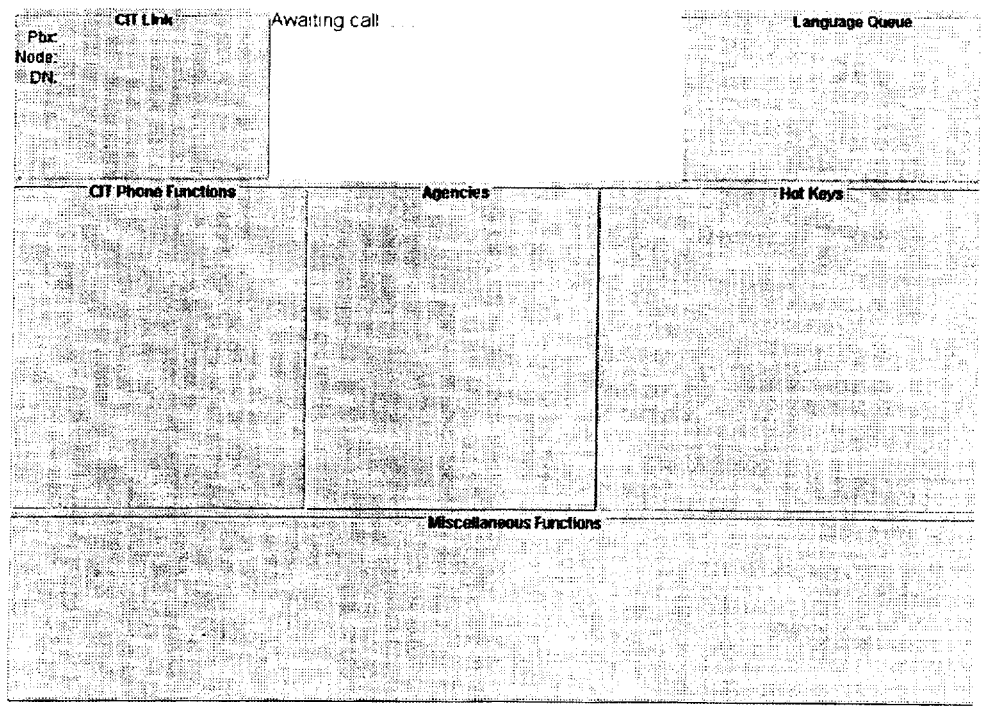

```
CIT.FRM - 1

VERSION 2.00
Begin Form fCIT
    BackColor       =   &H00808000&
    Caption         =   "CIT"
    ClientHeight    =   8310
    ClientLeft      =   75
    ClientTop       =   1050
    ClientWidth     =   12000
    FillColor       =   &H00FFFFFF&
    FontBold        =   -1  'True
    FontItalic      =   0   'False
    FontName        =   "Arial"
    FontSize        =   9.75
    FontStrikethru  =   0   'False
    FontUnderline   =   0   'False
    Height          =   8715
    Left            =   15
    MDIChild        =   -1  'True
    Picture         =   (Bitmap)
    ScaleHeight     =   8310
    ScaleWidth      =   12000
    Top             =   705
    Width           =   12120
    Begin OLE OLE2
        Class           =   "SoundRec"
        DisplayType     =   1   'Icon
        fFFHk           =   -1  'True
        Height          =   495
        Left            =   9720
        SourceDoc       =   "c:\windows\vb\e911\spanish.wav"
        TabIndex        =   62
        Top             =   7320
        Width           =   1215
    End
    Begin OLE OLE1
        BackColor       =   &H00FFFFFF&
        BorderStyle     =   0   'None
        Class           =   "SoundRec"
        DisplayType     =   1   'Icon
        fFFHk           =   -1  'True
        Height          =   495
        Left            =   9840
        SourceDoc       =   "c:\windows\vb\e911\english.wav"
        TabIndex        =   61
        Top             =   6240
        Width           =   1095
    End
    Begin SSCommand bSpanish
        Caption         =   "Spanish"
        Font3D          =   0   'None
        FontBold        =   -1  'True
        FontItalic      =   0   'False
        FontName        =   "Arial"
        FontSize        =   9
        FontStrikethru  =   0   'False
        FontUnderline   =   0   'False
        ForeColor       =   &H00000000&
        Height          =   492
        Left            =   9720
```

A-20

```
CIT.FRM - 2
      Picture         =   (none)
      TabIndex        =   59
      Top             =   840
      Width           =   1692
   End
   Begin SSCommand bEnglish
      Caption         =   "English"
      Font3D          =   0  'None
      FontBold        =   -1 'True
      FontItalic      =   0  'False
      FontName        =   "Arial"
      FontSize        =   9
      FontStrikethru  =   0  'False
      FontUnderline   =   0  'False
      ForeColor       =   &H00000000&
      Height          =   492
      Left            =   9720
      Picture         =   (none)
      TabIndex        =   58
      Top             =   240
      Width           =   1692
   End
   Begin SSCommand bLanguage
      Caption         =   "Language Line"
      Font3D          =   0  'None
      FontBold        =   -1 'True
      FontItalic      =   0  'False
      FontName        =   "Arial"
      FontSize        =   9
      FontStrikethru  =   0  'False
      FontUnderline   =   0  'False
      ForeColor       =   &H00000000&
      Height          =   492
      Left            =   9720
      Picture         =   (none)
      TabIndex        =   57
      Top             =   1440
      Width           =   1692
   End
   Begin SSCommand bAnswer
      Caption         =   "Answer"
      Enabled         =   0  'False
      Font3D          =   0  'None
      FontBold        =   -1 'True
      FontItalic      =   0  'False
      FontName        =   "Arial"
      FontSize        =   9
      FontStrikethru  =   0  'False
      FontUnderline   =   0  'False
      ForeColor       =   &H00000000&
      Height          =   612
      Left            =   240
      Picture         =   (none)
      TabIndex        =   8
      Top             =   3000
      Visible         =   0  'False
      Width           =   1332
   End
   Begin SSCommand bHangup
      Caption         =   "Hangup"
      Enabled         =   0  'False
```

```
CIT.FRM - 3
    Font3D          =   0       'None
    FontBold        =   -1      'True
    FontItalic      =   0       'False
    FontName        =   "Arial"
    FontSize        =   9
    FontStrikethru  =   0       'False
    FontUnderline   =   0       'False
    ForeColor       =   &H00000000&
    Height          =   612
    Left            =   240
    Picture         =   (none)
    TabIndex        =   13
    Top             =   3000
    Visible         =   0       'False
    Width           =   1332
End
Begin MsgBlaster MsgBlaster1
    Prop8           =   "Click on ""...""  for the About Box ---->"
End
Begin Timer ALITimer
    Enabled         =   0       'False
    Interval        =   5000
    Left            =   9960
    Top             =   6840
End
Begin SSCommand bESNList
    Caption         =   "Map"
    Font3D          =   0       'None
    FontBold        =   -1      'True
    FontItalic      =   0       'False
    FontName        =   "Arial"
    FontSize        =   9
    FontStrikethru  =   0       'False
    FontUnderline   =   0       'False
    ForeColor       =   &H00000000&
    Height          =   612
    Left            =   9480
    Picture         =   (none)
    TabIndex        =   55
    Top             =   2400
    Width           =   2412
End
Begin TextBox txtSDial
    FontBold        =   -1      'True
    FontItalic      =   0       'False
    FontName        =   "MS Serif"
    FontSize        =   6.75
    FontStrikethru  =   0       'False
    FontUnderline   =   0       'False
    Height          =   288
    Index           =   5
    Left            =   11400
    TabIndex        =   43
    Top             =   5160
    Visible         =   0       'False
    Width           =   492
End
Begin TextBox tEMS
    BackColor       =   &H00C0C0C0&
    BorderStyle     =   0       'None
    DataField       =   "EMS.Name"
```

```
CIT.FRM - 4
        Enabled         =   0    'False
        FontBold        =   0    'False
        FontItalic      =   0    'False
        FontName        =   "MS Serif"
        FontSize        =   6.75
        FontStrikethru  =   0    'False
        FontUnderline   =   0    'False
        Height          =   195
        Index           =   1
        Left            =   6360
        TabIndex        =   54
        Top             =   5040
        Visible         =   0    'False
        Width           =   495
     End
     Begin TextBox tFire
        BackColor       =   &H00C0C0C0&
        BorderStyle     =   0    'None
        DataField       =   "Fire.Name"
        Enabled         =   0    'False
        FontBold        =   0    'False
        FontItalic      =   0    'False
        FontName        =   "MS Serif"
        FontSize        =   6.75
        FontStrikethru  =   0    'False
        FontUnderline   =   0    'False
        Height          =   195
        Index           =   1
        Left            =   5880
        TabIndex        =   53
        Top             =   3840
        Visible         =   0    'False
        Width           =   615
     End
     Begin TextBox tPolice
        BackColor       =   &H00C0C0C0&
        BorderStyle     =   0    'None
        DataField       =   "Police.Name"
        Enabled         =   0    'False
        FontBold        =   0    'False
        FontItalic      =   0    'False
        FontName        =   "MS Serif"
        FontSize        =   6.75
        FontStrikethru  =   0    'False
        FontUnderline   =   0    'False
        Height          =   195
        Index           =   1
        Left            =   5520
        TabIndex        =   52
        Top             =   2880
        Visible         =   0    'False
        Width           =   735
     End
     Begin TextBox txtSDial
        FontBold        =   -1   'True
        FontItalic      =   0    'False
        FontName        =   "MS Serif"
        FontSize        =   6.75
        FontStrikethru  =   0    'False
        FontUnderline   =   0    'False
        Height          =   288
```

```
CIT.FRM - 5
    Index           =   4
    Left            =   11400
    TabIndex        =   47
    Top             =   4200
    Visible         =   0    'False
    Width           =   492
End
Begin TextBox txtSDial
    FontBold        =   -1   'True
    FontItalic      =   0    'False
    FontName        =   "MS Serif"
    FontSize        =   6.75
    FontStrikethru  =   0    'False
    FontUnderline   =   0    'False
    Height          =   288
    Index           =   3
    Left            =   11400
    TabIndex        =   48
    Top             =   3240
    Visible         =   0    'False
    Width           =   492
End
Begin TextBox txtSDial
    FontBold        =   -1   'True
    FontItalic      =   0    'False
    FontName        =   "MS Serif"
    FontSize        =   6.75
    FontStrikethru  =   0    'False
    FontUnderline   =   0    'False
    Height          =   288
    Index           =   2
    Left            =   8880
    TabIndex        =   51
    Top             =   5160
    Visible         =   0    'False
    Width           =   492
End
Begin TextBox txtSDial
    FontBold        =   -1   'True
    FontItalic      =   0    'False
    FontName        =   "MS Serif"
    FontSize        =   6.75
    FontStrikethru  =   0    'False
    FontUnderline   =   0    'False
    Height          =   288
    Index           =   1
    Left            =   8880
    TabIndex        =   50
    Top             =   4200
    Visible         =   0    'False
    Width           =   492
End
Begin TextBox txtSDial
    FontBold        =   -1   'True
    FontItalic      =   0    'False
    FontName        =   "MS Serif"
    FontSize        =   6.75
    FontStrikethru  =   0    'False
    FontUnderline   =   0    'False
    Height          =   288
    Index           =   0
```

```
CIT.FRM - 6
     Left            =   8880
     TabIndex        =   49
     Top             =   3240
     Visible         =   0     'False
     Width           =   492
  End
  Begin SSCommand bSpeedDial
     Caption         =   "Speed Dial #6"
     Enabled         =   0     'False
     Font3D          =   0     'None
     FontBold        =   -1    'True
     FontItalic      =   0     'False
     FontName        =   "Arial"
     FontSize        =   9
     FontStrikethru  =   0     'False
     FontUnderline   =   0     'False
     ForeColor       =   &H00000000&
     Height          =   612
     Index           =   5
     Left            =   9480
     Picture         =   (none)
     TabIndex        =   46
     Top             =   5160
     Width           =   2412
  End
  Begin SSCommand bSpeedDial
     Caption         =   "Speed Dial #5"
     Enabled         =   0     'False
     Font3D          =   0     'None
     FontBold        =   -1    'True
     FontItalic      =   0     'False
     FontName        =   "Arial"
     FontSize        =   9
     FontStrikethru  =   0     'False
     FontUnderline   =   0     'False
     ForeColor       =   &H00000000&
     Height          =   612
     Index           =   4
     Left            =   9480
     Picture         =   (none)
     TabIndex        =   45
     Top             =   4200
     Width           =   2412
  End
  Begin SSCommand bSpeedDial
     Caption         =   "Speed Dial #4"
     Enabled         =   0     'False
     Font3D          =   0     'None
     FontBold        =   -1    'True
     FontItalic      =   0     'False
     FontName        =   "Arial"
     FontSize        =   9
     FontStrikethru  =   0     'False
     FontUnderline   =   0     'False
     ForeColor       =   &H00000000&
     Height          =   612
     Index           =   3
     Left            =   9480
     Picture         =   (none)
     TabIndex        =   24
     Top             =   3240
```

```
CIT.FRM - 7
        Width           =   2412
     End
     Begin SSCommand bSpeedDial
        Caption         =   "Speed Dial #3"
        Enabled         =   0   'False
        Font3D          =   0   'None
        FontBold        =   -1  'True
        FontItalic      =   0   'False
        FontName        =   "Arial"
        FontSize        =   9
        FontStrikethru  =   0   'False
        FontUnderline   =   0   'False
        ForeColor       =   &H00000000&
        Height          =   615
        Index           =   2
        Left            =   7080
        Picture         =   (none)
        TabIndex        =   25
        Top             =   5160
        Width           =   2295
     End
     Begin SSCommand bSpeedDial
        Caption         =   "Speed Dial #2"
        Enabled         =   0   'False
        Font3D          =   0   'None
        FontBold        =   -1  'True
        FontItalic      =   0   'False
        FontName        =   "Arial"
        FontSize        =   9
        FontStrikethru  =   0   'False
        FontUnderline   =   0   'False
        ForeColor       =   &H00000000&
        Height          =   615
        Index           =   1
        Left            =   7080
        Picture         =   (none)
        TabIndex        =   28
        Top             =   4200
        Width           =   2295
     End
     Begin SSCommand bSpeedDial
        Caption         =   "Speed Dial #1"
        Enabled         =   0   'False
        Font3D          =   0   'None
        FontBold        =   -1  'True
        FontItalic      =   0   'False
        FontName        =   "Arial"
        FontSize        =   9
        FontStrikethru  =   0   'False
        FontUnderline   =   0   'False
        ForeColor       =   &H00000000&
        Height          =   615
        Index           =   0
        Left            =   7080
        Picture         =   (none)
        TabIndex        =   38
        Top             =   3240
        Width           =   2295
     End
     Begin TextBox tCitStatus
        BackColor       =   &H00FFFFFF&
```

A-26

```
CIT.FRM - 8
      FontBold        =   -1  'True
      FontItalic      =   0   'False
      FontName        =   "Arial"
      FontSize        =   7.5
      FontStrikethru  =   0   'False
      FontUnderline   =   0   'False
      Height          =   972
      Left            =   0
      MultiLine       =   -1  'True
      ScrollBars      =   2   'Vertical
      TabIndex        =   26
      Text            =   "CIT awaiting command......"
      Top             =   1080
      Width           =   3012
   End
   Begin SSFrame frameCitMsg
      Alignment       =   2   'Center
      Caption         =   "CIT Link"
      Font3D          =   0   'None
      FontBold        =   -1  'True
      FontItalic      =   0   'False
      FontName        =   "Arial"
      FontSize        =   9
      FontStrikethru  =   0   'False
      FontUnderline   =   0   'False
      ForeColor       =   &H00000000&
      Height          =   2052
      Left            =   0
      TabIndex        =   37
      Top             =   0
      Width           =   3012
      Begin TextBox tDN
         BackColor       =   &H00C0C0C0&
         BorderStyle     =   0   'None
         DataField       =   "DN"
         FontBold        =   0   'False
         FontItalic      =   0   'False
         FontName        =   "Arial"
         FontSize        =   8.25
         FontStrikethru  =   0   'False
         FontUnderline   =   0   'False
         Height          =   285
         Left            =   600
         TabIndex        =   44
         Top             =   720
         Width           =   1335
      End
      Begin TextBox tNode
         BackColor       =   &H00C0C0C0&
         BorderStyle     =   0   'None
         FontBold        =   0   'False
         FontItalic      =   0   'False
         FontName        =   "Arial"
         FontSize        =   8.25
         FontStrikethru  =   0   'False
         FontUnderline   =   0   'False
         Height          =   285
         Left            =   600
         TabIndex        =   41
         Top             =   480
         Width           =   1335
```

```
CIT.FRM - 9
    End
    Begin TextBox tPBX
        BackColor       =   &H00C0C0C0&
        BorderStyle     =   0   'None
        FontBold        =   0   'False
        FontItalic      =   0   'False
        FontName        =   "Arial"
        FontSize        =   8.25
        FontStrikethru  =   0   'False
        FontUnderline   =   0   'False
        Height          =   285
        Left            =   600
        TabIndex        =   40
        Top             =   240
        Width           =   1335
    End
    Begin Label lblDN
        Alignment       =   1   'Right Justify
        BackColor       =   &H00C0C0C0&
        Caption         =   "DN:"
        DataField       =   "lpNode"
        FontBold        =   0   'False
        FontItalic      =   0   'False
        FontName        =   "Arial"
        FontSize        =   9
        FontStrikethru  =   0   'False
        FontUnderline   =   0   'False
        Height          =   252
        Left            =   0
        TabIndex        =   27
        Top             =   720
        Width           =   492
    End
    Begin Label txtNode
        Alignment       =   1   'Right Justify
        BackColor       =   &H00C0C0C0&
        Caption         =   "Node:"
        DataField       =   "lpNode"
        FontBold        =   0   'False
        FontItalic      =   0   'False
        FontName        =   "Arial"
        FontSize        =   9
        FontStrikethru  =   0   'False
        FontUnderline   =   0   'False
        Height          =   252
        Left            =   0
        TabIndex        =   42
        Top             =   480
        Width           =   492
    End
    Begin Label lblPBX
        Alignment       =   1   'Right Justify
        BackColor       =   &H00C0C0C0&
        Caption         =   "Pbx:"
        FontBold        =   0   'False
        FontItalic      =   0   'False
        FontName        =   "Arial"
        FontSize        =   9
        FontStrikethru  =   0   'False
        FontUnderline   =   0   'False
        Height          =   252
```

```
CIT.FRM - 10
         Left            =   0
         TabIndex        =   39
         Top             =   240
         Width           =   492
      End
   End
   Begin SSCommand bAssign
      Caption         =   "Assign"
      Font3D          =   0  'None
      FontBold        =   -1  'True
      FontItalic      =   0  'False
      FontName        =   "Arial"
      FontSize        =   9
      FontStrikethru  =   0  'False
      FontUnderline   =   0  'False
      ForeColor       =   &H00000000&
      Height          =   612
      Left            =   240
      Picture         =   (none)
      TabIndex        =   22
      Top             =   2400
      Width           =   1332
   End
   Begin SSCommand bDeassign
      Caption         =   "Deassign"
      Font3D          =   0  'None
      FontBold        =   -1  'True
      FontItalic      =   0  'False
      FontName        =   "Arial"
      FontSize        =   9
      FontStrikethru  =   0  'False
      FontUnderline   =   0  'False
      ForeColor       =   &H00000000&
      Height          =   612
      Left            =   240
      Picture         =   (none)
      TabIndex        =   23
      Top             =   2400
      Visible         =   0  'False
      Width           =   1332
   End
   Begin PictureBox picPoison
      BackColor       =   &H00C0C0C0&
      BorderStyle     =   0  'None
      FontBold        =   -1  'True
      FontItalic      =   0  'False
      FontName        =   "MS Serif"
      FontSize        =   6.75
      FontStrikethru  =   0  'False
      FontUnderline   =   0  'False
      Height          =   615
      Left            =   5760
      Picture         =   (Metafile)
      ScaleHeight     =   615
      ScaleWidth      =   975
      TabIndex        =   36
      Top             =   5280
      Visible         =   0  'False
      Width           =   975
   End
   Begin PictureBox picEMSAmbulance
```

A-29

CIT.FRM - 11

```
        BackColor       =   &H00C0C0C0&
        BorderStyle     =   0   'None
        FontBold        =   -1  'True
        FontItalic      =   0   'False
        FontName        =   "MS Serif"
        FontSize        =   6.75
        FontStrikethru  =   0   'False
        FontUnderline   =   0   'False
        Height          =   612
        Left            =   5520
        Picture         =   (Metafile)
        ScaleHeight     =   615
        ScaleWidth      =   1215
        TabIndex        =   35
        Top             =   4200
        Visible         =   0   'False
        Width           =   1212
    End
    Begin PictureBox picFireTruck
        BackColor       =   &H00C0C0C0&
        BorderStyle     =   0   'None
        FillStyle       =   0   'Solid
        FontBold        =   -1  'True
        FontItalic      =   0   'False
        FontName        =   "MS Serif"
        FontSize        =   6.75
        FontStrikethru  =   0   'False
        FontUnderline   =   0   'False
        Height          =   615
        Left            =   5400
        Picture         =   (Metafile)
        ScaleHeight     =   615
        ScaleWidth      =   1455
        TabIndex        =   34
        Top             =   3240
        Visible         =   0   'False
        Width           =   1455
    End
    Begin PictureBox picPoliceCar
        BackColor       =   &H00C0C0C0&
        BorderStyle     =   0   'None
        DrawMode        =   3   'Mask Not Pen
        FontBold        =   -1  'True
        FontItalic      =   0   'False
        FontName        =   "MS Serif"
        FontSize        =   6.75
        FontStrikethru  =   0   'False
        FontUnderline   =   0   'False
        ForeColor       =   &H00C0C0C0&
        Height          =   615
        Left            =   5400
        Picture         =   (Metafile)
        ScaleHeight     =   615
        ScaleWidth      =   1455
        TabIndex        =   33
        Top             =   2280
        Visible         =   0   'False
        Width           =   1455
    End
    Begin PictureBox picOtherLangPhone
        BackColor       =   &H00C0C0C0&
```

CIT.FRM - 12

```
      BorderStyle     =   0  'None
      FontBold        =   -1 'True
      FontItalic      =   0  'False
      FontName        =   "MS Serif"
      FontSize        =   6.75
      FontStrikethru  =   0  'False
      FontUnderline   =   0  'False
      Height          =   492
      Left            =   8280
      Picture         =   (Metafile)
      ScaleHeight     =   495
      ScaleWidth      =   1095
      TabIndex        =   2
      Top             =   1440
      Visible         =   0  'False
      Width           =   1092
   End
   Begin PictureBox picPoisonPhone
      BackColor       =   &H00C0C0C0&
      BorderStyle     =   0  'None
      FontBold        =   -1 'True
      FontItalic      =   0  'False
      FontName        =   "MS Serif"
      FontSize        =   6.75
      FontStrikethru  =   0  'False
      FontUnderline   =   0  'False
      Height          =   492
      Left            =   3600
      Picture         =   (Metafile)
      ScaleHeight     =   495
      ScaleWidth      =   1215
      TabIndex        =   29
      Top             =   5280
      Visible         =   0  'False
      Width           =   1212
   End
   Begin PictureBox picEMSPhone
      BackColor       =   &H00C0C0C0&
      BorderStyle     =   0  'None
      FontBold        =   -1 'True
      FontItalic      =   0  'False
      FontName        =   "MS Serif"
      FontSize        =   6.75
      FontStrikethru  =   0  'False
      FontUnderline   =   0  'False
      Height          =   492
      Left            =   3600
      Picture         =   (Metafile)
      ScaleHeight     =   495
      ScaleWidth      =   1215
      TabIndex        =   32
      Top             =   4320
      Visible         =   0  'False
      Width           =   1212
   End
   Begin PictureBox picFirePhone
      BackColor       =   &H00C0C0C0&
      BorderStyle     =   0  'None
      FontBold        =   -1 'True
      FontItalic      =   0  'False
      FontName        =   "MS Serif"
```

```
CIT.FRM - 13
    FontSize         =   6.75
    FontStrikethru   =   0    'False
    FontUnderline    =   0    'False
    Height           =   492
    Left             =   3600
    Picture          =   (Metafile)
    ScaleHeight      =   495
    ScaleWidth       =   1215
    TabIndex         =   31
    Top              =   3360
    Visible          =   0    'False
    Width            =   1212
 End
 Begin PictureBox picPolicePhone
    BackColor        =   &H00C0C0C0&
    BorderStyle      =   0    'None
    FontBold         =   -1   'True
    FontItalic       =   0    'False
    FontName         =   "MS Serif"
    FontSize         =   6.75
    FontStrikethru   =   0    'False
    FontUnderline    =   0    'False
    Height           =   492
    Left             =   3600
    Picture          =   (Metafile)
    ScaleHeight      =   495
    ScaleWidth       =   1215
    TabIndex         =   30
    Top              =   2400
    Visible          =   0    'False
    Width            =   1212
 End
 Begin SSCommand bCancel
    Caption          =   "Cancel"
    Enabled          =   0    'False
    Font3D           =   0    'None
    FontBold         =   -1   'True
    FontItalic       =   0    'False
    FontName         =   "Arial"
    FontSize         =   9
    FontStrikethru   =   0    'False
    FontUnderline    =   0    'False
    ForeColor        =   &H00000000&
    Height           =   615
    Left             =   1800
    Picture          =   (none)
    TabIndex         =   21
    Top              =   4200
    Visible          =   0    'False
    Width            =   1335
 End
 Begin SSCommand bDisturb
    Caption          =   "Do not Disturb"
    Font3D           =   0    'None
    FontBold         =   -1   'True
    FontItalic       =   0    'False
    FontName         =   "Arial"
    FontSize         =   9
    FontStrikethru   =   0    'False
    FontUnderline    =   0    'False
    ForeColor        =   &H000000FF&
```

```
CIT.FRM - 14
         Height          =    372
         Left            =    240
         Picture         =    (none)
         TabIndex        =    19
         Top             =    5160
         Visible         =    0     'False
         Width           =    2772
      End
      Begin SSCommand bRetrieve
         Caption         =    "Retrieve"
         Enabled         =    0     'False
         Font3D          =    0     'None
         FontBold        =    -1    'True
         FontItalic      =    0     'False
         FontName        =    "Arial"
         FontSize        =    9
         FontStrikethru  =    0     'False
         FontUnderline   =    0     'False
         ForeColor       =    &H00000000&
         Height          =    612
         Left            =    240
         Picture         =    (none)
         TabIndex        =    18
         Top             =    3600
         Visible         =    0     'False
         Width           =    1332
      End
      Begin SSCommand bPSAPList1
         Caption         =    "PSAP"
         Font3D          =    0     'None
         FontBold        =    -1    'True
         FontItalic      =    0     'False
         FontName        =    "Arial"
         FontSize        =    9
         FontStrikethru  =    0     'False
         FontUnderline   =    0     'False
         ForeColor       =    &H00000000&
         Height          =    615
         Left            =    7080
         Picture         =    (none)
         TabIndex        =    7
         Top             =    2400
         Width           =    2295
      End
      Begin MMControl mSpanishAnnounce
         BackVisible     =    0     'False
         DeviceType      =    "WaveAudio"
         EjectVisible    =    0     'False
         FileName        =    "Spanish.wav"
         Height          =    624
         Left            =    8760
         NextVisible     =    0     'False
         Orientation     =    1     'Vertical
         PauseVisible    =    0     'False
         RecordMode      =    1     'Overwrite
         RecordVisible   =    0     'False
         Shareable       =    -1    'True
         StepVisible     =    0     'False
         StopVisible     =    0     'False
         TabIndex        =    17
         Top             =    240
```

A-33

```
CIT.FRM - 15
      Visible         =   0    'False
      Width           =   432
   End
   Begin TextBox tEMS
      BackColor       =   &H00C0C0C0&
      BorderStyle     =   0  'None
      DataField       =   "EMS.Name"
      FontBold        =   0    'False
      FontItalic      =   0    'False
      FontName        =   "Arial"
      FontSize        =   7.5
      FontStrikethru  =   0    'False
      FontUnderline   =   0    'False
      Height          =   285
      Index           =   0
      Left            =   3600
      TabIndex        =   16
      Top             =   4920
      Width           =   3015
   End
   Begin TextBox tFire
      BackColor       =   &H00C0C0C0&
      BorderStyle     =   0  'None
      DataField       =   "Fire.Name"
      FontBold        =   0    'False
      FontItalic      =   0    'False
      FontName        =   "Arial"
      FontSize        =   7.5
      FontStrikethru  =   0    'False
      FontUnderline   =   0    'False
      Height          =   285
      Index           =   0
      Left            =   3600
      TabIndex        =   15
      Top             =   3840
      Width           =   3015
   End
   Begin TextBox tPolice
      BackColor       =   &H00C0C0C0&
      BorderStyle     =   0  'None
      DataField       =   "Police.Name"
      FontBold        =   0    'False
      FontItalic      =   0    'False
      FontName        =   "Arial"
      FontSize        =   7.5
      FontStrikethru  =   0    'False
      FontUnderline   =   0    'False
      Height          =   285
      Index           =   0
      Left            =   3600
      TabIndex        =   14
      Top             =   3000
      Width           =   3015
   End
   Begin SSCommand bTransfer
      Caption         =   "Transfer"
      Enabled         =   0    'False
      Font3D          =   0    'None
      FontBold        =   -1   'True
      FontItalic      =   0    'False
      FontName        =   "Arial"
```

A-34

CIT.FRM - 16

```
      FontSize         =   9
      FontStrikethru   =   0    'False
      FontUnderline    =   0    'False
      ForeColor        =   &H00000000&
      Height           =   615
      Left             =   1800
      Picture          =   (none)
      TabIndex         =   9
      Top              =   3000
      Visible          =   0    'False
      Width            =   1335
   End
   Begin SSCommand bConference
      Caption          =   "Conference"
      Enabled          =   0    'False
      Font3D           =   0    'None
      FontBold         =   -1   'True
      FontItalic       =   0    'False
      FontName         =   "Arial"
      FontSize         =   9
      FontStrikethru   =   0    'False
      FontUnderline    =   0    'False
      ForeColor        =   &H00000000&
      Height           =   615
      Left             =   1800
      Picture          =   (none)
      TabIndex         =   10
      Top              =   2400
      Visible          =   0    'False
      Width            =   1335
   End
   Begin SSCommand bMakeCall
      Caption          =   "Make Call"
      Enabled          =   0    'False
      Font3D           =   0    'None
      FontBold         =   -1   'True
      FontItalic       =   0    'False
      FontName         =   "Arial"
      FontSize         =   9
      FontStrikethru   =   0    'False
      FontUnderline    =   0    'False
      ForeColor        =   &H00000000&
      Height           =   615
      Left             =   1800
      Picture          =   (none)
      TabIndex         =   12
      Top              =   3600
      Visible          =   0    'False
      Width            =   1335
   End
   Begin MMControl mEnglishAnnounce
      BackVisible      =   0    'False
      DeviceType       =   "WaveAudio"
      EjectVisible     =   0    'False
      FileName         =   "english.wav"
      Height           =   624
      Left             =   8160
      NextVisible      =   0    'False
      Orientation      =   1    'Vertical
      PauseVisible     =   0    'False
      RecordMode       =   1    'Overwrite
```

A-35

```
CIT.FRM - 17
        RecordVisible    =    0     'False
        Shareable        =    -1    'True
        StepVisible      =    0     'False
        StopVisible      =    0     'False
        TabIndex         =    5
        Top              =    240
        Visible          =    0     'False
        Width            =    432
    End
    Begin SSFrame frameLanguage
        Alignment        =    2     'Center
        Caption          =    "Language Queue"
        Font3D           =    0     'None
        FontBold         =    -1    'True
        FontItalic       =    0     'False
        FontName         =    "Arial"
        FontSize         =    9
        FontStrikethru   =    0     'False
        FontUnderline    =    0     'False
        ForeColor        =    &H00000000&
        Height           =    2055
        Left             =    7920
        TabIndex         =    4
        Top              =    0
        Width            =    4095
    End
    Begin MMControl mPlayBack
        BackEnabled      =    -1    'True
        BorderStyle      =    0     'None
        DeviceType       =    "WaveAudio"
        EjectEnabled     =    -1    'True
        FileName         =    "c:\windows\vb\e911\english.wav"
        Height           =    612
        Left             =    2400
        MousePointer     =    1     'Arrow
        NextEnabled      =    -1    'True
        PauseEnabled     =    -1    'True
        PlayEnabled      =    -1    'True
        PrevEnabled      =    -1    'True
        RecordEnabled    =    -1    'True
        RecordMode       =    1     'Overwrite
        Shareable        =    -1    'True
        Silent           =    -1    'True
        StepEnabled      =    -1    'True
        StopEnabled      =    -1    'True
        TabIndex         =    3
        Top              =    6720
        Width            =    7044
    End
    Begin CommandButton bClose
        Caption          =    "Close"
        FontBold         =    -1    'True
        FontItalic       =    0     'False
        FontName         =    "Arial"
        FontSize         =    9
        FontStrikethru   =    0     'False
        FontUnderline    =    0     'False
        Height           =    615
        Left             =    600
        TabIndex         =    1
        Top              =    6720
```

CIT.FRM - 18

```
        Width           =   1335
     End
     Begin SSFrame bAgency
        Alignment       =   2   'Center
        Caption         =   "Agencies"
        Font3D          =   0   'None
        FontBold        =   -1  'True
        FontItalic      =   0   'False
        FontName        =   "Arial"
        FontSize        =   9
        FontStrikethru  =   0   'False
        FontUnderline   =   0   'False
        ForeColor       =   &H00000000&
        Height          =   3972
        Left            =   3480
        TabIndex        =   6
        Top             =   2040
        Width           =   3492
     End
     Begin SSFrame frameMisc
        Alignment       =   2   'Center
        Caption         =   "Miscellaneous Functions"
        Font3D          =   0   'None
        FontBold        =   -1  'True
        FontItalic      =   0   'False
        FontName        =   "Arial"
        FontSize        =   9
        FontStrikethru  =   0   'False
        FontUnderline   =   0   'False
        ForeColor       =   &H00000000&
        Height          =   2295
        Left            =   0
        TabIndex        =   20
        Top             =   6000
        Width           =   12015
     End
     Begin TextBox tALI
        BackColor       =   &H00FFFFFF&
        BorderStyle     =   0   'None
        DataSource      =   "dALI"
        FontBold        =   0   'False
        FontItalic      =   0   'False
        FontName        =   "Arial"
        FontSize        =   12
        FontStrikethru  =   0   'False
        FontUnderline   =   0   'False
        Height          =   2052
        Left            =   3000
        MultiLine       =   -1  'True
        ScrollBars      =   2   'Vertical
        TabIndex        =   0
        Text            =   "Awaiting call ......"
        Top             =   0
        Width           =   4932
     End
     Begin SSFrame framePhoneFunc
        Alignment       =   2   'Center
        Caption         =   "CIT Phone Functions"
        Font3D          =   0   'None
        FontBold        =   -1  'True
        FontItalic      =   0   'False
```

A-37

```
CIT.FRM - 19
        FontName        =   "Arial"
        FontSize        =   9
        FontStrikethru  =   0   'False
        FontUnderline   =   0   'False
        ForeColor       =   &H00000000&
        Height          =   3975
        Left            =   0
        TabIndex        =   11
        Top             =   2040
        Width           =   3495
    End
    Begin SSFrame frmHotKeys
        Alignment       =   2   'Center
        Caption         =   "Hot Keys"
        Font3D          =   0   'None
        FontBold        =   -1  'True
        FontItalic      =   0   'False
        FontName        =   "Arial"
        FontSize        =   9
        FontStrikethru  =   0   'False
        FontUnderline   =   0   'False
        ForeColor       =   &H00000000&
        Height          =   3975
        Left            =   6960
        TabIndex        =   60
        Top             =   2040
        Width           =   5055
    End
    Begin Label Label1
        Caption         =   "Label1"
        Height          =   495
        Left            =   4080
        TabIndex        =   56
        Top             =   3240
        Width           =   1215
    End
End
```

CIT.FRM - 1

Option Explicit
'Option Compare Text

Sub Command3D1_Click ()
    ' Set the number of milliseconds between successive
    ' StatusUpdate events.
    mSpanishAnnounce.UpdateInterval = Interval ' Play the audio file.
    On Error GoTo picSpanishAnnounce_Play_Error 'mSpanishAnnounce.Command = "Play"
    mSpanishAnnounce.Command = "Sound"
    On Error GoTo 0
    Exit Sub picSpanishAnnounce_Play_Error:
    DisplayErrorMessageBox
    Resume picSpanishAnnounce_Play_Exit picSpanishAnnounce_Play_Exit:

End Sub

Sub GetALI (Phone As Variant)
    Dim sql As String sql = "Select * from ALI where phone = '" & Trim$(Phone) & "';"
    On Error GoTo GetALI_Error
    Set ALIDS = gCurrentDB.CreateDynaset(sql)
    If ALIDS.EOF = True Then
        ALITimer.Interval = 5000
        ALITimer.Enabled = True
        GoTo GetALI_Error
    Else
        ALITimer.Enabled = False
    End If 'If NOALI = true, then RBOC has no ALI information for that phone
    If ALIDS("NOALI") = True Then
        GoTo GetALI_Error
    End If 'Show data on form
    tALI.Text = tALI.Text & ALIDS.Fields("Block") & "   " & ALIDS.Fields("Direct
ion") & "   " & ALIDS("Suffix") & "   " & ALIDS("Street") & crlf & ALIDS("city")
 & "   " & ALIDS.Fields("state") & "   " & ALIDS.Fields("ESN") & "   " & ALIDS.F
ields("Service") & crlf & ALIDS("Customer") & crlf & ALIDS("Location") & "   " &
 Mid$(ALIDS("Pilot"), 1, 3) & "-" & Mid$(ALIDS("Pilot"), 4) & crlf & crlf & ALID
S("PoliceComm") & crlf & crlf & ALIDS("FireComm") & crlf & crlf & ALIDS("EMSComm
") & crlf 'If MOBL = true, then the caller is mobile and obviously, no address
    If ALIDS("Service") = "MOBL" Then
        GoTo GetALI_Error
    End If
    'Turn flag off indicating ALI was returned
    gfNoALI = False
    gsESN = ALIDS("ESN")

CIT.FRM - 2

```
    On Error Resume Next
    'Prepare call for adding data
    'Set CallHistoryDS = gCurrentDB.CreateDynaset("CallHistory")
    If gCurrentDB.Transactions = True Then
        BeginTrans
    End If CallHistoryDS.Edit
    'Agency Data
    CallHistoryDS("ESN") = ALIDS("ESN")
    CallHistoryDS("AnswerDt") = Now
    CallHistoryDS("Block") = ALIDS("Block")
    CallHistoryDS("Direction") = ALIDS("Direction")
    CallHistoryDS("Suffix") = ALIDS("Suffix")
    CallHistoryDS("Street") = ALIDS("Street")
    CallHistoryDS("City") = ALIDS("City")
    CallHistoryDS("State") = ALIDS("State")
    CallHistoryDS("Location") = ALIDS("Location")
    CallHistoryDS("Customer") = ALIDS("Customer")
    CallHistoryDS("Pilot") = ALIDS("Pilot")
    CallHistoryDS("Service") = ALIDS("Service")
    'Update Info
    CallHistoryDS("UpdEmpno") = gsAgent
    CallHistoryDS.Update
    If gCurrentDB.Transactions = True Then
        CommitTrans
    End If Exit Sub GetALI_Error:
    gfNoALI = True
    gsESN = Null
    Exit Sub GetALI_Exit:

End Sub

Sub GetEMSAgencyByAgencyNo (AgencyNo As Variant)
    Dim sql As String
    On Error GoTo 0
    sql = "Select * from AgencyQry where AgencyNo = '" & AgencyNo & "';"
    Set EmsDS = gCurrentDB.CreateDynaset(sql)
    If EmsDS.EOF = True Then
        MsgBar "Unable to Find Agency " & AgencyNo, False
        tEMS(0).Text = "Unknown"
        tEMS(1).Text = ""
    Else
        tEMS(0).Text = EmsDS("Name")
        tEMS(1).Text = EmsDS("AgencyNo")
        picEMSAmbulance.Visible = True
        picEMSAmbulance.Enabled = True
    End If End Sub Sub GetEMSAgencyByESN (ESN As Variant)
    Dim sql As String
    On Error GoTo 0
    sql = "Select * from EmsByESNQry where ESN = '" & ESN & "';"
```

A-40

CIT.FRM - 3

```
    Set EmsDS = gCurrentDB.CreateDynaset(sql)
    If EmsDS.EOF = True Then
            tEMS(0).Text = "Unknown"
            tEMS(1).Text = ""
    Else
            tEMS(0).Text = EmsDS("Name")
            tEMS(1).Text = EmsDS("AgencyNo")
            picEMSAmbulance.Visible = True
            picEMSAmbulance.Enabled = True
    End If End Sub Sub GetFireAgencyByAgencyNo (AgencyNo As Variant)

Dim sql As String
    On Error GoTo 0
    sql = "Select * from AgencyQry where AgencyNo = '" & AgencyNo & "';"
    Set FireDS = gCurrentDB.CreateDynaset(sql)
    If FireDS.EOF = True Then
        MsgBar "Unable to Find Agency " & AgencyNo, False
        tFire(0).Text = "Unknown"
        tFire(1).Text = ""
    Else tFire(1).Text = FireDS("AgencyNo")
        picFireTruck.Visible = True
        picFireTruck.Enabled = True
    End If End Sub Sub GetFireAgencyByESN (ESN As Variant)
    Dim sql As String
    On Error GoTo 0
    sql = "Select * from FireByESNQry where ESN = '" & ESN & "';"
    Set FireDS = gCurrentDB.CreateDynaset(sql)
    If FireDS.EOF = True Then
            tFire(0).Text = "Unknown"
            tFire(1).Text = ""
    Else
            tFire(0).Text = FireDS("Name")
            tFire(1).Text = FireDS("AgencyNo")
            picFireTruck.Visible = True
            picFireTruck.Enabled = True End If End Sub Sub GetLawAgencyByAgencyNo (AgencyNo As Variant)
    Dim sql As String
    On Error GoTo 0
    'Check for Police Agency
    sql = "Select * from AgencyQry where AgencyNo = '" & AgencyNo & "';"
    Set PoliceDS = gCurrentDB.CreateDynaset(sql)
    If PoliceDS.EOF = True Then
        MsgBar "Unable to Find Agency " & AgencyNo, False
        tPolice(0).Text = "Unknown"
        tPolice(1).Text = ""
```

CIT.FRM - 4

```
    Else
        tPolice(0).Text = PoliceDS("Name")
        tPolice(1).Text = PoliceDS("AgencyNo")
        picPoliceCar.Visible = True
        picPoliceCar.Enabled = True
    End If End Sub Sub GetLawAgencyByESN (ESN As Variant)
    Dim sql As String
    On Error GoTo 0
    'Check for Police ESN
    sql = "Select * from LawByESNQry where ESN = '" & ESN & "';"
    Set PoliceDS = gCurrentDB.CreateDynaset(sql)
    If PoliceDS.EOF = True Then
        tPolice(0).Text = "Unknown"
        tPolice(1).Text = ""
    Else
        tPolice(0).Text = PoliceDS("Name")
        tPolice(1).Text = PoliceDS("AgencyNo")
        picPoliceCar.Visible = True
        picPoliceCar.Enabled = True
    End If End Sub Sub PlaceConferenceCall (Phone As Variant)

On Error GoTo PlaceConferenceCall_Error

'Check Agency voice phone number
    'Check ALI for Agency
    If IsNull(Phone) Or Phone = "" Then
        MsgBar "Cannot Page or Conference, No EMS Agency Available", False
        bMakeCall_Click
        Exit Sub
    End If CitInitiateConferenceCall (Phone)
    If gfCitError = True Then
        GoTo PlaceConferenceCall_Error
    End If PlaceConferenceCall_Error:

Exit Sub

End Sub

Sub ALITimer_Timer ()
    'Dim CdrDS As dynaset

End Sub

Sub bAnswer_Click ()

Dim s As String * 1024

'If CIT installed, then the phone is answered by software
```

CIT.FRM - 5

```
    If CitProductInstalled = True Then
    Else
        On Error GoTo bAnswer_SQLerror
            If CDRDS.EOF = True Then
                MsgBar "No calls pending " & Now, True
                gsPhone = ""
                Set CDRDS = gCurrentDB.CreateDynaset("CDR")
                Exit Sub
            Else
                gsPhone = CDRDS("ANIPhone")
                CreateCallHistory
            End If
    End If
    s = tALI.Text
    tALI.Text = ""
    tALI.Text = "(" & Mid$(gsPhone, 1, 3) + ")" & " " & Mid$(gsPhone, 4, 3) & "-
" & Mid$(gsPhone, 7) & "   " & Now & crlf
    GetALI gsPhone If gfNoALI = True Then
        MsgBar "Please choose an ESN from the Map " & Time, False
        'row = row + 1
        'phone.Text = "NoPhone" ' Increment Row.
        'If row = 1 Then       ' First time only.
            ' Make sure the link is not active.
        '    phone.LinkMode = 1
            ' Set the application name and topic name.
        '    phone.LinkTopic = "Excel|sheet1"
        '    phone.LinkItem = "R1C1" ' Set the LinkItem.
        ' Else
            ' Update the Row in the data item.
        '    phone.LinkMode = 3
        '    phone.LinkItem = "R1C1" 'Set the LinkItem.

'End If
          frmMap.Show modal
          gsESN = "029"
          'demo
    End If 'Check for Police ESN
    GetLawAgencyByESN gsESN 'Check for Fire ESN
    GetFireAgencyByESN gsESN 'Check for EMS ESN
    GetEMSAgencyByESN gsESN bAnswer_setup:
    'setup ali screen, current, prior
    tALI.Text = tALI.Text & crlf & s 'Set Cit buttons visible and/or enabled
    bConference.Enabled = True
    bConference.Visible = True
    bAnswer.Enabled = False
    bAnswer.Visible = False
    bTransfer.Enabled = True
    bTransfer.Visible = True
    bRetrieve.Enabled = False
```

CIT.FRM - 6

```
    bMakeCall.Enabled = True
    bMakeCall.Visible = True
    bHangUp.Enabled = True
    bHangUp.Visible = True
    bCancel.Enabled = True
    bCancel.Visible = True
    bDisturb.Enabled = False
    bAssign.Visible = False
    ' Poson Control
    picPoison.Visible = True
    picPoison.Enabled = True MsgBar "Call Answered", False
    tCitStatus = Time & " Seized" & crlf & tCitStatus
    Exit Sub bAnswer_SQLerror:

ShowError
    Exit Sub
End Sub

Sub bAssign_Click ()

On Error GoTo bAssign_Error
    'Determine type of CIT
    CitProduct
    'Assign one channel
    If CitProductInstalled Then
        CitAssign
        'Check return status
        If gfCitError = True Then
            GoTo bAssign_Error
        End If
    Else
        On Error GoTo bAssign_SqlError
        Set CDRDS = gCurrentDB.CreateDynaset("CDR")
    End If 'Set CIT buttons visible and/or enabled
    tCitStatus = Time & " Assigned" & crlf
    bAssign.Enabled = False
    bAssign.Visible = False
    bDeassign.Visible = True
    bDeassign.Enabled = True
    bConference.Enabled = False
    bAnswer.Enabled = True
    bAnswer.Visible = True
    bTransfer.Enabled = False
    bRetrieve.Enabled = False
    bMakeCall.Enabled = True
    bHangUp.Enabled = False
    bHangUp.Visible = False
    bCancel.Enabled = False
    bDisturb.Enabled = True
    bDisturb.Visible = True Exit Sub
```

```
CIT.FRM - 7 bAssign_SqlError:
    ShowError
    Exit Sub bAssign_Error:
    ShowError
    Exit Sub End Sub Sub bCancel_Click ()

bConference.Enabled = False
    bAnswer.Enabled = False
    bTransfer.Enabled = False
    bRetrieve.Enabled = True
    bMakeCall.Enabled = True
    bHangUp.Enabled = True
    bCancel.Enabled = True
    bDisturb.Enabled = False
    bDeassign.Enabled = False 'Reset flags
    tCitStatus = Time & " Cancelled " & crlf & tCitStatus End Sub Sub bClose_Click ()
    Unload Me End Sub Sub bConference_Click ()

On Error GoTo bConference_Error
    MsgBar "Conferencing " & AgencyDS.Fields("Name") & " " & AgencyDS("Voice"),
True CitInitiateConferenceCall AgencyDS("Voice")
    If gfCitError = True Then
        GoTo bConference_Error
    End If
    DecAwaitConf = True
    DecAwaitCall = False bConference_Error:

Exit Sub
End Sub

Sub bDeassign_Click ()
    On Error Resume Next
    bHangup_Click
    If CitProductInstalled Then
        CitDeassign
        If gfCitError = True Then
            GoTo bDeassign_Error
        End If
    Else
        CDRDS.Close
    End If
```

CIT.FRM - 8

```
        bConference.Enabled = False
        bAnswer.Enabled = False
        bAnswer.Visible = False
        bTransfer.Enabled = False
        bRetrieve.Enabled = False
        bMakeCall.Enabled = False
        bHangUp.Enabled = False
        bCancel.Enabled = False
        bDisturb.Enabled = True
        bDeassign.Enabled = False
        bAssign.Visible = True
        bAssign.Enabled = True
        bDisturb.Enabled = True
        tCitStatus = Time & " Deassign" & crlf & tCitStatus
        Exit Sub bDeassign_Error:
        Exit Sub End Sub Sub bDisturb_Click ()
        bAssign.Enabled = False
        bConference.Enabled = False
        bAnswer.Enabled = True
        bTransfer.Enabled = False
        bRetrieve.Enabled = False
        bMakeCall.Enabled = True
        bHangUp.Enabled = False
        bCancel.Enabled = False
        bDisturb.Enabled = True
        bDeassign.Enabled = False
        tCitStatus = Time & " Disturb" & crlf & tCitStatus End Sub Sub bEnglish_Click ()
        ' Set the number of milliseconds between successive
        ' StatusUpdate events.
        mEnglishAnnounce.UpdateInterval = Interval ' Play the audio file.
        On Error GoTo picEnglishAnnounce_Play_Error mEnglishAnnounce.Command = "Play"
        'mEnglishAnnounce.Command = "Sound"
        Exit Sub picEnglishAnnounce_Play_Error:
        DisplayErrorMessageBox
        Resume picEnglishAnnounce_Play_Exit picEnglishAnnounce_Play_Exit:

End Sub

Sub bESNList_Click ()
        frmMap.WindowState = 0
        frmMap.Show
```

A-46

CIT.FRM - 9

End Sub

```
Sub bHangup_Click ()
    On Error GoTo bHangup_Error:
    If CitProductInstalled Then
        CitHangupCall
        Call vvHangup(util.Voice)
        DoEvents
        If gfCitError = True Then
            GoTo bHangup_Error
        End If
    Else
        CDRDS.MoveNext
    End If 'Reset CIT phone buttons
    bAssign.Enabled = False
    bConference.Enabled = False
    bAnswer.Enabled = True
    bAnswer.Visible = True
    bTransfer.Enabled = False
    bRetrieve.Enabled = False
    bMakeCall.Enabled = True
    bHangUp.Enabled = False
    bHangUp.Visible = False
    bCancel.Enabled = False
    bDisturb.Enabled = True
    bDeassign.Enabled = True 'Clear reponding agencies
    tPolice(0).Text = ""
    tPolice(1).Text = ""
    tFire(0).Text = ""
    tFire(1).Text = ""
    tEMS(0).Text = ""
    tEMS(1).Text = ""
    picPoliceCar.Visible = False
    picFireTruck.Visible = False
    picEMSAmbulance.Visible = False
    picPoison.Visible = False
    bLanguage.Visible = False 'Clear picture of phone
    picPolicePhone.Visible = False
    picFirePhone.Visible = False
    picEMSPhone.Visible = False
    picPoisonPhone.Visible = False
    picOtherLangPhone.Visible = False 'Reset flags
    DecAwaitCall = True
    DecAwaitConf = False
    gfNoALI = True
    gsPoliceName = Null
    gsPoliceAgencyNo = Null
    gsPoliceVoice = Null
    gsPolicePager = Null
    gsFireName = Null
    gsFireAgencyNo = Null
    gsFireVoice = Null
    gsFirePager = Null
```

```
CIT.FRM - 10
    gsEMSName = Null
    gsEMSAgencyNo = Null
    gsEMSVoice = Null
    gsEMSPager = Null
    gsESN = Null tCitStatus = Time & " Hangup" & crlf & tCitStatus Exit Sub bHangup_Error:
    ShowError
    Exit Sub End Sub Sub bLanguage_Click ()
    On Error GoTo 0

'Check ALI for Agency
    If IsNull(gsLanguagePhone) Then
        MsgBar "Cannot Conference, No Language Phone Available", False
        Exit Sub
    End If 'Conference Language Line
    DecAwaitConf = True
    DecAwaitCall = False
    PlaceConferenceCall gsLanguagePhone If gfCitError = False Then
        bLanguage.Enabled = False
        picOtherLangPhone.Visible = True
    End If End Sub Sub bMakeCall_Click ()

fPhoneSet.Show
End Sub

Sub bPSAPList1_Click ()
    frmPSAP.WindowState = 0
    frmPSAP.Show
End Sub

Sub bRetrieve_Click ()
    On Error GoTo bRetrieve_Error:
    bConference.Enabled = True
    bAnswer.Enabled = False
    bTransfer.Enabled = True
    bRetrieve.Enabled = False
    bMakeCall.Enabled = True
    bHangUp.Enabled = True
    bCancel.Enabled = True
    bDisturb.Enabled = False
    bDeassign.Enabled = False bRetrieve_Error:
```

```
CIT.FRM - 11
    Exit Sub
End Sub

Sub bTransfer_Click ()
    bConference.Enabled = False
    bAnswer.Enabled = False
    bTransfer.Enabled = True
    bRetrieve.Enabled = False
    bMakeCall.Enabled = True
    bHangUp.Enabled = True
    bCancel.Enabled = True
    bDisturb.Enabled = False
    bDeassign.Enabled = False End Sub Sub Form_Load ()
    ' Set properties needed for English Announcement
    mEnglishAnnounce.Notify = True
    mEnglishAnnounce.Wait = True
    mEnglishAnnounce.Shareable = True
    mEnglishAnnounce.DeviceType = "WaveAudio"
    mEnglishAnnounce.FileName = "c:\windows\vb\e911\english.WAV"

' Set properties needed for Announcement
    mSpanishAnnounce.Notify = True
    mSpanishAnnounce.Wait = True
    mSpanishAnnounce.Shareable = True
    mSpanishAnnounce.DeviceType = "WaveAudio"
    mSpanishAnnounce.FileName = "c:\windows\vb\e911\spanish.WAV"

' If the English device is already open, close it.
    If Not mEnglishAnnounce.Mode = MCI_MODE_NOT_OPEN Then
        mEnglishAnnounce.Command = "Close"
    End If ' If the Spanish device is already open, close it.
    If Not mSpanishAnnounce.Mode = MCI_MODE_NOT_OPEN Then
        mSpanishAnnounce.Command = "Close"
    End If 'Attempt to open the wave device
    On Error Resume Next
    mEnglishAnnounce.Command = "Open"

'Attempt to open the Spanish wave device
    On Error Resume Next
    mSpanishAnnounce.Command = "Open"

On Error GoTo 0
    'set the height and width
    Dim X As Integer

X = Val(GetINIString("AnswerWindowHeight", "6000"))
    Height = X
    X = Val(GetINIString("AnswerWindowWidth", "10240"))
    Width = X
    X = Val(GetINIString("AnswerWindowTop", "0"))
    Top = X
    X = Val(GetINIString("AnswerWindowLeft", "0"))
    Left = X
```

A-49

CIT.FRM - 12

```
    Me.Show

'Load message blaster to monitor telephony events
    MsgBlaster1.hWndTarget = Me.hWnd
    MsgBlaster1.MsgList(0) = PM_CIT_EVENT
    MsgBlaster1.MsgList(1) = PM_CIT_ROUTE
    MsgBlaster1.MsgList(2) = PM_CIT_NETERR 'Poison Control
    Dim sql As String
    sql = "Select Desc from Codes where (KeyID = 'PROF' and KeyCd = 'POISON');"
    On Error GoTo Form_SqlError
    Set CodesDS = gCurrentDB.CreateDynaset(sql)
    If CodesDS.EOF = True Then
        MsgBar "No Poison Control Phone in PROF Codes Table", False
        Stop
    Else
        gsPoisonPhone = Trim$(CodesDS("Desc"))
    End If 'AT&T Language Line
    sql = "Select Desc from Codes where (KeyID = 'PROF' and KeyCd = 'LANGUAGE');
"
    On Error GoTo Form_SqlError
    Set CodesDS = gCurrentDB.CreateDynaset(sql)
    If CodesDS.EOF = True Then
        MsgBar "No Poison Control Phone in PROF Codes Table", False
        Stop
    Else
        gsLanguagePhone = Trim$(CodesDS("Desc"))
    End If 'Start MapInfo
    'StartMapInfo
    'Call ddeToMapInfo("c:\windows\mapinfo\houston\st_inter.mbx", "SELECT|ALL",
ddeCallBack)

util.Voice.PhoneLine = 1
    util.Voice.Action = VV_ALLOCATE_LINE
    util.Audio.PhoneLine = 2
    util.Audio.Action = VV_ALLOCATE_LINE
    'Call vvAllocateLine(Util.Voice, 1, 0)
    'Call vvAllocateLine(Util.Audio, 2, 0)

Exit Sub
Form_SqlError:
    DisplayErrorMessageBox
    Exit Sub

MCI_ERROR:
    DisplayErrorMessageBox
    Exit Sub

MCI_EXIT:

End Sub

Sub Form_Unload (Cancel As Integer)
    On Error Resume Next
```

A-50

CIT.FRM - 13
```
    mEnglishAnnounce.Command = "Close"
    mSpanishAnnounce.Command = "Close"
    Me.WindowState = 1
    Cancel = True End Sub Sub MsgBlaster1_Message (MsgVal As Integer, wParam As Integer, lParam As Long, R
eturnVal As Long)
    Debug.Print "State " & CStr(DecCitEventList.State)
    Debug.Print "Event " & CStr(DecCitEventList.Event)
    Debug.Print "ASB " & CStr(DecCitASB.Status)
    Debug.Print "ASB " & CStr(DecCitASB.UserPointer)

Select Case MsgVal
        Case PM_CIT_EVENT, PM_CIT_ROUTE

'If DecAwaitCall = True Then
        Select Case DecCitEventList.State

Case DecCit_M_Deliver_State

Select Case DecCitEventList.Event
                    Case DecCit_K_Dest_Seized
                        tCitStatus = Time & " Seized" & crlf & tCitStatus End Select Case DecCit_M_Receive_State Select Case DecCitEventList.Event
                    Case DecCit_K_Inbound_Call
                        DecANI = Mid$(DecCitEventList.OtherPartyHolder, 6, 15)
                        DecCallID = DecCitEventList.RefID
                        DecHeldCallId = DecCitEventList.RefID
                        DecActiveCallID = DecCitEventList.RefID
                        gsCitDN = Mid$(DecANI, 1, 10)
                        gsPhone = Mid$(DecANI, 1, 3)
                        'Create a call record
                        CreateCallHistory
                        bAnswer_Click
                        Call vvRecordFile(util.Voice, "test.vox")
                        DoEvents End Select Case DecCit_M_Active_State
                Select Case DecCitEventList.Event 'If DecAwaitConf = True Then
                        Case DecCit_K_Op_Answered
                            If gCurrentDB.Transactions = True Then
                                BeginTrans
                            End If
                            CallHistoryDS.Edit
                            CallHistoryDS("AnswerDt") = Now
                            CallHistoryDS.Update
                            If gCurrentDB.Transactions = True Then
                                CommitTrans
                            End If
                            CitConferenceJoin
```

CIT.FRM - 14

```
                        DecAwaitConf = False

End Select

Case DecCit_M_Null_State

Select Case DecCitEventList.Event

Case DecCit_K_TP_Disconnected
                    If DecAwaitConf Then
                    Else
                        bHangup_Click
                    End If Case DecCit_K_Monitor_Enabled
                    Debug.Print "Monitor enabled"

Case DecCit_K_OP_Disconnected
                    If DecAwaitConf Then
                    Else
                        bHangup_Click
                    End If End Select
        End Select Case PM_CIT_NETERR
            bDeassign_Click
        End Select CitGetEvent
    Debug.Print "Cit event loop"

MsgBar "CIT Event Processing in Progress", True

End Sub

Sub picEMSAmbulance_Click ()

'Get the EMS agency for voice phone

GetEMSAgencyByAgencyNo CVar(tEMS(1).Text)

'Conference EMS
    DecAwaitConf = True

PlaceConferenceCall CStr(EmsDS("Voice"))

MsgBar "Paging EMS", False
    SendPage EmsDS, ALIDS

'set pic enabled = false to show action has been taken
    If gfCitError = False Then
        picEMSAmbulance.Enabled = False
        picEMSPhone.Visible = True
    End If
```

A-52

CIT.FRM - 15

```
End Sub

Sub picFireTruck_Click ()
    On Error GoTo 0

GetFireAgencyByAgencyNo CVar(tFire(1).Text)

'Conference Fire
    DecAwaitConf = True
    PlaceConferenceCall CStr(FireDS("Voice"))

'Send page
    MsgBar "Paging Fire", False
    SendPage FireDS, ALIDS

If gfCitError = False Then
        picFireTruck.Enabled = False
        picFirePhone.Visible = True
    End If End Sub Sub picPoison_Click ()
    On Error GoTo 0

'Check ALI for Agency
    If IsNull(gsPoisonPhone) Then
        MsgBar "Cannot Conference, No Poison Control Phone Available", False
        Exit Sub
    End If 'Conference Poison Control
    DecAwaitConf = True
    DecAwaitCall = False
    PlaceConferenceCall gsPoisonPhone If gfCitError = False Then
        picPoison.Enabled = False
        picPoisonPhone.Visible = True
    End If End Sub Sub picPoliceCar_Click ()
    On Error GoTo 0
    'Check agencyNo available GetLawAgencyByAgencyNo CVar(tPolice(1).Text)

'Conference Law
    DecAwaitConf = True
    DecAwaitCall = False
    PlaceConferenceCall CStr(PoliceDS("Voice"))

'If Agency wants a page
    'Send Page
    MsgBar "Paging Law", False
    SendPage PoliceDS, ALIDS If gfCitError = False Then
```

A-53

```
CIT.FRM - 16
        picPoliceCar.Enabled = False
        picPolicePhone.Visible = True
    End If End Sub
```

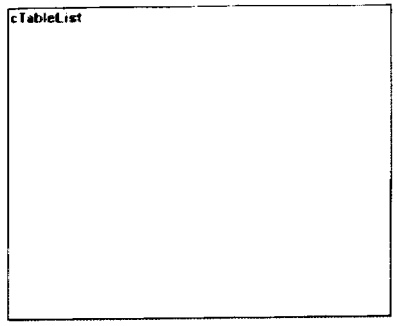

```
ESN.FRM - 1

VERSION 2.00
Begin Form frmESN
    AutoRedraw      =   -1      'True
    BackColor       =   &H00C0C0C0&
    Caption         =   "ESN List"
    ClientHeight    =   3750
    ClientLeft      =   2250
    ClientTop       =   1635
    ClientWidth     =   4575
    ControlBox      =   0       'False
    FontBold        =   -1      'True
    FontItalic      =   0       'False
    FontName        =   "Arial"
    FontSize        =   7.5
    FontStrikethru  =   0       'False
    FontUnderline   =   0       'False
    Height          =   4155
    Left            =   2190
    LinkTopic       =   "Form1"
    ScaleHeight     =   3725.091
    ScaleMode       =   0       'User
    ScaleWidth      =   4604.226
    Top             =   1290
    Width           =   4695
    Begin ListBox cTableList
        FontBold        =   -1      'True
        FontItalic      =   0       'False
        FontName        =   "Arial"
        FontSize        =   8.25
        FontStrikethru  =   0       'False
        FontUnderline   =   0       'False
        Height          =   3600
        Left            =   0
        TabIndex        =   0
        Top             =   0
        Width           =   4575
    End
End
```

ESN.FRM - 1

```
Option Explicit

Sub cTableList_Click ()
    'cField.Clear
    If (cTableList) <> fCit.bSpeedDial(0).Caption Then
        If (cTableList) <> fCit.bSpeedDial(1).Caption Then
            If (cTableList) <> fCit.bSpeedDial(2).Caption Then
                If (cTableList) <> fCit.bSpeedDial(3).Caption Then
                    If (cTableList) <> fCit.bSpeedDial(4).Caption Then
                        If (cTableList) <> fCit.bSpeedDial(5).Caption Then
                            If fCit.bSpeedDial(4).Enabled = True Then
                                fCit.bSpeedDial(5).Caption = fCit.bSpeedDial(4).Caption
                                fCit.txtSDial(5).Text = fCit.txtSDial(4).Text
                                fCit.bSpeedDial(5).Enabled = True
                            End If
                            If fCit.bSpeedDial(3).Enabled = True Then
                                fCit.bSpeedDial(4).Caption = fCit.bSpeedDial(3).Caption
                                fCit.txtSDial(4).Text = fCit.txtSDial(3).Text
                                fCit.bSpeedDial(4).Enabled = True
                            End If
                            If fCit.bSpeedDial(2).Enabled = True Then
                                fCit.bSpeedDial(3).Caption = fCit.bSpeedDial(2).Caption
                                fCit.txtSDial(3).Text = fCit.txtSDial(2).Text
                                fCit.bSpeedDial(3).Enabled = True
                            End If
                            If fCit.bSpeedDial(1).Enabled = True Then
                                fCit.bSpeedDial(2).Caption = fCit.bSpeedDial(1).Caption
                                fCit.txtSDial(2).Text = fCit.txtSDial(1).Text
                                fCit.bSpeedDial(2).Enabled = True
                            End If
                            If fCit.bSpeedDial(0).Enabled = True Then
                                fCit.bSpeedDial(1).Caption = fCit.bSpeedDial(0).Caption
                                fCit.txtSDial(1).Text = fCit.txtSDial(0).Text
                                fCit.bSpeedDial(1).Enabled = True
                            End If
                            fCit.bSpeedDial(0).Caption = Mid$(cTableList, 5, (Len(cTableList) - 4))
                            fCit.txtSDial(0).Text = Mid$(cTableList, 1, 3)
                            fCit.bSpeedDial(0).Enabled = True
                            'Debug.Print "Name " & fCit.bSpeedDial(0).Caption
                            'Debug.Print "No. " & fCit.txtSDial(0).Text
                        End If
                    End If
                End If
            End If
        End If
    End If fCit.Refresh Me.Hide
    Load fCit
End Sub
```

A-57

ESN.FRM - 2

```
Sub Form_Load ()
    'set the height and width
    Height = 3870
    Width = 3156
    Top = 3870
    Left = fCit.Width
    Dim ROW As Integer
    MsgBar "Running ESN look-up", True
    SetHourglass Me 'Dim EsnQuery As QueryDef, EsnSet As Snapshot
    'Set EsnQuery = gCurrentDB.OpenQueryDef("EsnQry")    ' Open QueryDef.
    'MyQuery![State Wanted] = "NY"    ' Set parameter.
    'Set EsnSet = EsnQuery.CreateSnapshot()    ' Create Snapshot.

Dim sql As String
    'create a new dynaset form
    sql = "Select KeyCD, Desc from Codes where (KeyID = 'ESNT');"
    'Debug.Print "ESN sql=" & sql
    On Error GoTo bESN_SQLError
    Set EsnDS = gCurrentDB.CreateDynaset(sql)
    While (Not EsnDS.EOF)
       cTableList.AddItem EsnDS("KeyCD") & " " & EsnDS("Desc")
       'get all the others
       EsnDS.MoveNext
       ROW = ROW + 1
    Wend Hide GoTo bESN_End bESN_SQLError:
    On Error GoTo bESN_End
    ShowError
    Resume bESN_End bESN_End:

ResetMouse Me
    MsgBar "", False

End Sub

Sub Form_Resize ()
   'On Error Resume Next

'If WindowState <> 0 Then
      'cTableList(0).Height = Height - 1350
      'cTableList(0).Width = Width - 320
      'Me.Refresh
   'End If
End Sub Sub Form_Unload (Cancel As Integer)
   'Me.WindowState = 1
   Cancel = True
End Sub
```

A-58

```
MAP.FRM - 1

VERSION 2.00
Begin Form frmMap
   Caption          =   "Map"
   ClientHeight     =   8625
   ClientLeft       =   -135
   ClientTop        =   210
   ClientWidth      =   12000
   FontBold         =   -1  'True
   FontItalic       =   0   'False
   FontName         =   "Arial"
   FontSize         =   9
   FontStrikethru   =   0   'False
   FontUnderline    =   0   'False
   Height           =   9030
   Left             =   -195
   LinkTopic        =   "Map"
   ScaleHeight      =   8625
   ScaleWidth       =   12000
   Top              =   -135
   Width            =   12120
   Begin SSCommand bClose
      Caption          =   "Close"
      Font3D           =   0   'None
      FontBold         =   -1  'True
      FontItalic       =   0   'False
      FontName         =   "Arial"
      FontSize         =   9
      FontStrikethru   =   0   'False
      FontUnderline    =   0   'False
      ForeColor        =   &H00000000&
      Height           =   495
      Left             =   10680
      Picture          =   (none)
      TabIndex         =   3
      Top              =   8040
      Width            =   1215
   End
   Begin SSCommand bZoomOut
      Caption          =   "Zoom Out"
      Font3D           =   0   'None
      FontBold         =   -1  'True
      FontItalic       =   0   'False
      FontName         =   "Arial"
      FontSize         =   9
      FontStrikethru   =   0   'False
      FontUnderline    =   0   'False
      ForeColor        =   &H00000000&
      Height           =   492
      Left             =   5640
      Picture          =   (none)
      TabIndex         =   2
      Top              =   8040
      Width            =   1332
   End
   Begin SSCommand bZoomIn
      Caption          =   "Zoom In"
      Font3D           =   0   'None
      FontBold         =   -1  'True
      FontItalic       =   0   'False
      FontName         =   "Arial"
      FontSize         =   9
```

```
MAP.FRM - 2
      FontStrikethru  =    0      'False
      FontUnderline   =    0      'False
      ForeColor       =    &H00000000&
      Height          =    492
      Left            =    4080
      Picture         =    (none)
      TabIndex        =    1
      Top             =    8040
      Width           =    1332
   End
   Begin PictureBox picMap
      AutoRedraw      =    -1     'True
      FontBold        =    -1     'True
      FontItalic      =    0      'False
      FontName        =    "Arial"
      FontSize        =    9
      FontStrikethru  =    0      'False
      FontUnderline   =    0      'False
      Height          =    7932
      Left            =    0
      Picture         =    (Bitmap)
      ScaleHeight     =    7905
      ScaleWidth      =    11985
      TabIndex        =    0
      Top             =    0
      Width           =    12012
   End
End
```

A-61

MAP.FRM - 1

```
Sub LoadMap (Action As String)
    Dim Msg  ' Declare variables.
    Static map As String
    On Error Resume Next    ' Set up error handling.
    'Height = 3990: Width = 4890 ' Set height and width.
    Select Case Action
        Case "zoomout"
            Select Case map
                Case "Hou1.0"
                    picMap.Picture = LoadPicture("c:\windows\vb\e911\Hou25.bmp")
' Load bitmap.
                    map = "Hou2.5"
                    bZoomIn.Visible = True
                    bZoomOut.Visible = True
                Case "Hou2.5"
                    picMap.Picture = LoadPicture("c:\windows\vb\e911\Hou50.bmp")
' Load bitmap.
                    map = "Hou5.0"
                    bZoomIn.Visible = True
                    bZoomOut.Visible = False End Select Case "zoomin"
            Select Case map
                Case "Hou5.0"
                    picMap.Picture = LoadPicture("c:\windows\vb\e911\Hou25.bmp")
' Load bitmap.
                    map = "Hou2.5"
                    bZoomIn.Visible = True
                    bZoomOut.Visible = True Case "Hou2.5"
                    picMap.Picture = LoadPicture("c:\windows\vb\e911\Hou10.bmp")
                    map = "Hou1.0"
                    bZoomIn.Visible = False
                    bZoomOut.Visible = True End Select
        Case Else
            picMap.Picture = LoadPicture("c:\windows\vb\e911\Hou50.bmp")
            map = "Hou5.0"
            bZoomIn.Visible = True
            bZoomOut.Visible = False End Select If Err Then
        Msg = "Could not find the Map .BMP file."
        MsgBox Msg   ' Display error message.
        Exit Sub     ' Quit if error occurs.
    End If End Sub Sub bClose_Click ()
    frmMap.Hide
    DoEvents
End Sub
```

A-62

MAP.FRM - 2

```
Sub bZoomIn_Click ()
    LoadMap "zoomin"
End Sub

Sub bZoomOut_Click ()
    LoadMap "zoomout"
End Sub

Sub Form_Load ()
    LoadMap "Initial"
End Sub

Sub picMap_Click ()
    gsESN = "029"
    frmMap.Hide
End Sub
```

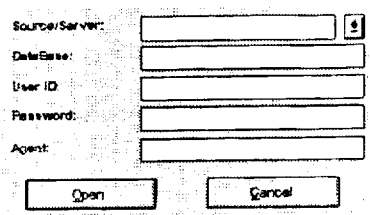

```
OPENDB.FRM - 1

VERSION 2.00
Begin Form fOpenDB
   BackColor       =   &H00C0C0C0&
   BorderStyle     =   1  'Fixed Single
   Caption         =   "Open DataBase"
   ClientHeight    =   2505
   ClientLeft      =   3000
   ClientTop       =   2460
   ClientWidth     =   4395
   ControlBox      =   0  'False
   FontBold        =   -1 'True
   FontItalic      =   0  'False
   FontName        =   "MS Serif"
   FontSize        =   6.75
   FontStrikethru  =   0  'False
   FontUnderline   =   0  'False
   ForeColor       =   &H00C0C0C0&
   Height          =   2910
   Left            =   2940
   LinkTopic       =   "Form2"
   MaxButton       =   0  'False
   MinButton       =   0  'False
   ScaleHeight     =   2461.24
   ScaleMode       =   0  'User
   ScaleWidth      =   4447.084
   Top             =   2115
   Width           =   4515
   Begin TextBox cAgent
      BackColor       =   &H00FFFFFF&
      FontBold        =   -1 'True
      FontItalic      =   0  'False
      FontName        =   "MS Serif"
      FontSize        =   6.75
      FontStrikethru  =   0  'False
      FontUnderline   =   0  'False
      Height          =   288
      Left            =   1680
      TabIndex        =   4
      Top             =   1560
      Width           =   2652
   End
   Begin ComboBox cDBName
      BackColor       =   &H00FFFFFF&
      Height          =   300
      Left            =   1680
      Sorted          =   -1 'True
      TabIndex        =   0
      Tag             =   "OL"
      Top             =   105
      Width           =   2655
   End
   Begin TextBox cDataBase
      BackColor       =   &H00FFFFFF&
      Height          =   285
      Left            =   1680
      TabIndex        =   1
      Tag             =   "OL"
      Top             =   465
      Width           =   2655
   End
   Begin TextBox cUserName
```

A-65

OPENDB.FRM - 2

```
        BackColor       =   &H00FFFFFF&
        Height          =   285
        Left            =   1680
        TabIndex        =   2
        Tag             =   "OL"
        Top             =   825
        Width           =   2655
     End
     Begin TextBox cPassword
        BackColor       =   &H00FFFFFF&
        Height          =   285
        Left            =   1680
        PasswordChar    =   "*"
        TabIndex        =   3
        Tag             =   "OL"
        Top             =   1185
        Width           =   2655
     End
     Begin CommandButton OkayButton
        BackColor       =   &H00C0C0C0&
        Caption         =   "&Open"
        Default         =   -1   'True
        FontBold        =   -1   'True
        FontItalic      =   0    'False
        FontName        =   "Arial"
        FontSize        =   7.5
        FontStrikethru  =   0    'False
        FontUnderline   =   0    'False
        Height          =   375
        Left            =   300
        TabIndex        =   5
        Top             =   2040
        Width           =   1575
     End
     Begin CommandButton CancelButton
        BackColor       =   &H00C0C0C0&
        Cancel          =   -1   'True
        Caption         =   "&Cancel"
        FontBold        =   -1   'True
        FontItalic      =   0    'False
        FontName        =   "Arial"
        FontSize        =   7.5
        FontStrikethru  =   0    'False
        FontUnderline   =   0    'False
        Height          =   375
        Left            =   2460
        TabIndex        =   6
        Top             =   2040
        Width           =   1575
     End
     Begin Label Label1
        BackColor       =   &H00C0C0C0&
        Caption         =   "Agent:"
        FontBold        =   -1   'True
        FontItalic      =   0    'False
        FontName        =   "Arial"
        FontSize        =   7.5
        FontStrikethru  =   0    'False
        FontUnderline   =   0    'False
        Height          =   252
        Left            =   120
```

```
OPENDB.FRM - 3
      TabIndex        =   11
      Top             =   1560
      Width           =   1332
   End
   Begin Label DataBaseLabel
      BackColor       =   &H00C0C0C0&
      Caption         =   "DataBase:"
      FontBold        =   -1  'True
      FontItalic      =   0   'False
      FontName        =   "Arial"
      FontSize        =   7.5
      FontStrikethru  =   0   'False
      FontUnderline   =   0   'False
      Height          =   255
      Left            =   120
      TabIndex        =   10
      Top             =   465
      Width           =   1335
   End
   Begin Label DBNameLabel
      BackColor       =   &H00C0C0C0&
      Caption         =   "Source/Server:"
      FontBold        =   -1  'True
      FontItalic      =   0   'False
      FontName        =   "Arial"
      FontSize        =   7.5
      FontStrikethru  =   0   'False
      FontUnderline   =   0   'False
      Height          =   255
      Left            =   120
      TabIndex        =   7
      Top             =   105
      Width           =   1470
   End
   Begin Label UserNameLabel
      BackColor       =   &H00C0C0C0&
      Caption         =   "User ID:"
      FontBold        =   -1  'True
      FontItalic      =   0   'False
      FontName        =   "Arial"
      FontSize        =   7.5
      FontStrikethru  =   0   'False
      FontUnderline   =   0   'False
      Height          =   255
      Left            =   120
      TabIndex        =   8
      Top             =   825
      Width           =   1335
   End
   Begin Label PasswordLabel
      BackColor       =   &H00C0C0C0&
      Caption         =   "Password:"
      FontBold        =   -1  'True
      FontItalic      =   0   'False
      FontName        =   "Arial"
      FontSize        =   7.5
      FontStrikethru  =   0   'False
      FontUnderline   =   0   'False
      Height          =   255
      Left            =   120
      TabIndex        =   9
```

```
OPENDB.FRM - 4
      Top             =    1170
      Width           =    1335
   End
End
```

OPENDB.FRM - 1

Option Explicit

Dim BeenLoaded As Integer

'ODBC.DLL APIs
Declare Function SQLAllocEnv Lib "odbc.dll" (env As Long) As Integer
Declare Function SQLDataSources Lib "ODBC.DLL" (ByVal henv As Long, ByVal fdir A
s Integer, ByVal szDSN As String, ByVal cbDSNMAx As Integer, pcbDSN As Integer,
ByVal szDesc As String, ByVal cbDescMax As Integer, pcbDesc As Integer) As Integ
er '
'this routine fills a list box with all available
'ODBC data sources found in ODBC.INI
'
Sub GetDataSources (listctrl As Control)
  Dim DataSource As String, Description As String
  Dim DataSourceLen As Integer, DescriptionLen As Integer
  Dim retcode As Integer
  Dim henv As Long If SQLAllocEnv(henv) <> -1 Then
    DataSource = String$(32, 32)
    Description = String$(255, 32)
    'get the first one
    retcode = SQLDataSources(henv, 2, DataSource, Len(DataSource), DataSourceLen
, Description, Len(Description), DescriptionLen)
    While retcode = 0 Or retcode = 1
       listctrl.AddItem Mid(DataSource, 1, DataSourceLen)
       DataSource = String$(32, 32)
       Description = String$(255, 32)
       'get all the others
       retcode = SQLDataSources(henv, 1, DataSource, Len(DataSource), DataSourceL
en, Description, Len(Description), DescriptionLen)
    Wend
  End If End Sub Function RegisterDB (dbname As String) As Integer
   On Error GoTo RDBErr Dim driver As String driver = InputBox("Enter Driver Name from ODBCINST.INI File:", "Driver Name",
DEFAULTDRIVER)
   If driver <> DEFAULTDRIVER Then
     RegisterDatabase cDBName, driver, False, ""
   Else
     RegisterDatabase cDBName, driver, True, ""
   End If RegisterDB = True
   GoTo RDBEnd RDBErr:
   RegisterDB = False
   Resume RDBEnd RDBEnd:

A-69

OPENDB.FRM - 2

```
End Function

Sub CancelButton_Click ()
  gfDBOpenFlag = False
  Unload Me
End Sub

Sub cDBName_Click ()
  On Error Resume Next

Dim tmp As String
  Dim x As Integer cDataBase = ""
  cUserName = ""
  cPassword = ""

'get the database name if there is one
  tmp = String$(255, 32)
  x = OSGetPrivateProfileString(cDBName, "database", "", tmp, Len(tmp), "ODBC.IN
I")
  cDataBase = Mid$(tmp, 1, x)

'get the last user name is there is one
  tmp = String$(255, 32)
  x = OSGetPrivateProfileString(cDBName, "lastuser", "", tmp, Len(tmp), "ODBC.IN
I")
  cUserName = Mid$(tmp, 1, x)

cPassword = ""

If cUserName <> "" Then
    cPassword.SetFocus
  Else
    cDataBase.SetFocus
  End If End Sub Sub Form_Load ()
  Left = (Screen.Width - Width) / 2
  Top = (Screen.Height - Height) / 2

GetDataSources cDBName

MsgBar "Enter DataBase Parameters", False

BeenLoaded = True

End Sub

Sub Form_Unload (Cancel As Integer)
  MsgBar "", False
End Sub

Sub OkayButton_Click ()
    Dim Connect As String, DataSource As String
    Dim x As Integer
    Dim st As String
    Dim i As Integer
```

A-70

OPENDB.FRM - 3

```
    Dim s As String, t As String
    Dim dbq As String

On Error GoTo OpenError

MsgBar "Opening DataBase", True

If frmMDI.PrefOpenOnStartup.Checked = True Then
       Me.Refresh
    End If

SetHourglass Me

'check for blank server name and clear other parms
    If cDBName = "" Then
       cDataBase = ""
       cUserName = ""
       cPassword = ""
    End If 'build connect string
    If cDBName <> "" Then
        Connect = "ODBC;"
        If cUserName <> "" Then
            Connect = Connect + "UID=" + cUserName + ";PWD=" + cPassword
        End If
        If cDataBase <> "" Then
            Connect = Connect + ";DATABASE=" + cDataBase
        End If
        'add login timeout
        Connect = Connect + ";LoginTimeout=" & glLoginTimeout
        DataSource = cDBName
    Else
        DataSource = cDataBase
    End If 'save the values
    gstDBName = cDBName
    gstDatabase = cDataBase
    gstUserName = cUserName
    gstPassword = cPassword
    gsAgent = cAgent
    gstDataType = "ODBC"

Me.Hide
    Set gCurrentDB = OpenDatabase(DataSource, False, False, Connect)
    If gfDBOpenFlag = True Then
        CloseAllDynasets
    End If
    gfTransPending = False 'process the connect string just in case the
    'values came from the ODBC dialogs
    t = gCurrentDB.Connect
    If InStr(t, "=") Then
        i = 1
        While i <= Len(t) + 1
            If Mid(t, i, 1) = ";" Or i = Len(t) + 1 Then
                If s <> "" And InStr(s, "=") > 0 Then
                    Select Case Mid(s, 1, InStr(1, s, "=") - 1)
                    Case "DSN"
```

A-71

OPENDB.FRM - 4

```
                                gstDBName = Mid(s, InStr(1, s, "=") + 1, Len(s))
                    Case "DATABASE"
                                gstDatabase = Mid(s, InStr(1, s, "=") + 1, Len(s))
                    Case "DBQ"
                                gstDatabase = Mid(s, InStr(1, s, "=") + 1, Len(s))
                    Case "UID"
                                gstUserName = Mid(s, InStr(1, s, "=") + 1, Len(s))
                    Case "PWD"
                                gstPassword = Mid(s, InStr(1, s, "=") + 1, Len(s))
                    Case Else
                        'nothing
                    End Select
                End If
                s = ""
            Else
                s = s + Mid(t, i, 1)
            End If
            i = i + 1
        Wend
    End If cDBName = gstDBName
    cDataBase = gstDatabase
    cUserName = gstUserName
    cPassword = gstPassword
    cAgent = gsAgent x = OSWritePrivateProfileString(gstDBName, "Database", gstDatabase, "ODBC.IN
I")
    x = OSWritePrivateProfileString(gstDBName, "LastUser", gstUserName, "ODBC.IN
I")
    x = OSWritePrivateProfileString("AssignTo", "dn", gsAgent, "PW.INI")

'fTables.Caption = gstDBName + "." + gstDatabase
    gCurrentDB.QueryTimeout = glQueryTimeout 'success
    gfDBOpenFlag = True ResetMouse Me
    Unload Me GoTo OkayEnd OpenError:
    ResetMouse Me
    gfDBOpenFlag = False
    If cDBName <> "" Then
        If InStr(1, Error$, "Data source not found") > 0 Then
            Beep
            MsgBox "This DataBase has not been Registered, this will now be atte
mpted for you!", 48
            cDataBase = ""
            cUserName = ""
            cPassword = ""
            If RegisterDB((cDBName)) = True Then
                MsgBox "'" & cDBName & "' has been Registered, proceed with Open
.", 48
            End If
        ElseIf InStr(1, Error$, "Login failed") > 0 Then
            Beep
```

A-72

OPENDB.FRM - 5

```
            MsgBox "Invalid Parameter(s), Please try again!", 48
        ElseIf InStr(1, Error$, "QueryTimeout property") > 0 Then
            If glQueryTimeout <> 5 Then
                Beep
                MsgBox "Query Timeout Could not be set, default will be used!", 48
            End If
            Resume Next
            Else
            ShowError
            End If
        End If MsgBar "Enter DataBase Parameters", False
        Me.Show MODAL
        Resume OkayEnd OkayEnd:

End Sub
```

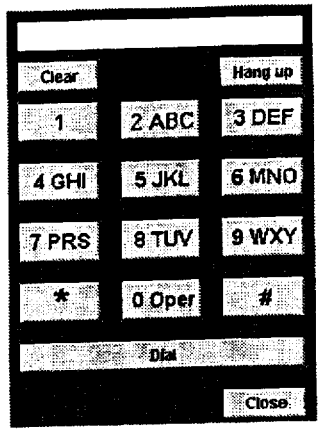

```
PHONESET.FRM - 1

VERSION 2.00
Begin Form fPhoneSet
   BackColor       =   &H00808000&
   Caption         =   "Phone Set"
   ClientHeight    =   4980
   ClientLeft      =   975
   ClientTop       =   1635
   ClientWidth     =   3600
   FontBold        =   -1  'True
   FontItalic      =   0   'False
   FontName        =   "Arial"
   FontSize        =   7.5
   FontStrikethru  =   0   'False
   FontUnderline   =   0   'False
   Height          =   5385
   Left            =   915
   MaxButton       =   0   'False
   MDIChild        =   -1  'True
   ScaleHeight     =   249
   ScaleMode       =   0   'User
   ScaleWidth      =   180
   Top             =   1290
   Width           =   3720
   Begin SSCommand bClose
      Caption         =   "Close"
      Font3D          =   1   'Raised w/light shading
      FontBold        =   -1  'True
      FontItalic      =   0   'False
      FontName        =   "Arial"
      FontSize        =   9
      FontStrikethru  =   0   'False
      FontUnderline   =   0   'False
      Height          =   372
      Left            =   2520
      Picture         =   (none)
      TabIndex        =   16
      Top             =   4560
      Width           =   972
   End
   Begin SSCommand bDial
      Caption         =   "Dial"
      Font3D          =   1   'Raised w/light shading
      FontBold        =   -1  'True
      FontItalic      =   0   'False
      FontName        =   "Arial"
      FontSize        =   9
      FontStrikethru  =   0   'False
      FontUnderline   =   0   'False
      Height          =   372
      Left            =   120
      Picture         =   (none)
      TabIndex        =   15
      Top             =   3960
      Width           =   3372
   End
   Begin SSCommand bClear
      Caption         =   "Clear"
      Font3D          =   1   'Raised w/light shading
      FontBold        =   -1  'True
      FontItalic      =   0   'False
      FontName        =   "Arial"
```

```
PHONESET.FRM - 2
    FontSize         =   9
    FontStrikethru   =   0    'False
    FontUnderline    =   0    'False
    Height           =   372
    Left             =   120
    Picture          =   (none)
    TabIndex         =   14
    Top              =   600
    Width            =   972
End
Begin SSCommand bHangup
    Caption          =   "Hang up"
    Font3D           =   1    'Raised w/light shading
    FontBold         =   -1   'True
    FontItalic       =   0    'False
    FontName         =   "Arial"
    FontSize         =   9
    FontStrikethru   =   0    'False
    FontUnderline    =   0    'False
    Height           =   372
    Left             =   2520
    Picture          =   (none)
    TabIndex         =   13
    Top              =   600
    Width            =   972
End
Begin TextBox tLCD
    FontBold         =   -1   'True
    FontItalic       =   0    'False
    FontName         =   "Arial"
    FontSize         =   7.5
    FontStrikethru   =   0    'False
    FontUnderline    =   0    'False
    ForeColor        =   &H000000FF&
    Height           =   372
    Left             =   120
    TabIndex         =   12
    Top              =   120
    Width            =   3372
End
Begin SSCommand bPhonePound
    Caption          =   "#"
    Font3D           =   1    'Raised w/light shading
    FontBold         =   -1   'True
    FontItalic       =   0    'False
    FontName         =   "Arial"
    FontSize         =   13.5
    FontStrikethru   =   0    'False
    FontUnderline    =   0    'False
    Height           =   492
    Left             =   2520
    Picture          =   (none)
    TabIndex         =   11
    Top              =   3240
    Width            =   972
End
Begin SSCommand bPhone0
    Caption          =   "0 Oper"
    Font3D           =   1    'Raised w/light shading
    FontBold         =   -1   'True
    FontItalic       =   0    'False
```

```
PHONESET.FRM - 3
      FontName        =   "Arial"
      FontSize        =   12
      FontStrikethru  =   0   'False
      FontUnderline   =   0   'False
      Height          =   492
      Left            =   1320
      Picture         =   (none)
      TabIndex        =   10
      Top             =   3240
      Width           =   972
   End
   Begin SSCommand bPhoneStar
      Caption         =   "*"
      Font3D          =   1   'Raised w/light shading
      FontBold        =   -1  'True
      FontItalic      =   0   'False
      FontName        =   "Arial"
      FontSize        =   24
      FontStrikethru  =   0   'False
      FontUnderline   =   0   'False
      Height          =   492
      Left            =   120
      Picture         =   (none)
      TabIndex        =   9
      Top             =   3240
      Width           =   972
   End
   Begin SSCommand bPhone9
      Caption         =   "9 WXY"
      Font3D          =   1   'Raised w/light shading
      FontBold        =   -1  'True
      FontItalic      =   0   'False
      FontName        =   "Arial"
      FontSize        =   12
      FontStrikethru  =   0   'False
      FontUnderline   =   0   'False
      Height          =   492
      Left            =   2520
      Picture         =   (none)
      TabIndex        =   8
      Top             =   2520
      Width           =   972
   End
   Begin SSCommand bPhone8
      Caption         =   "8 TUV"
      Font3D          =   1   'Raised w/light shading
      FontBold        =   -1  'True
      FontItalic      =   0   'False
      FontName        =   "Arial"
      FontSize        =   12
      FontStrikethru  =   0   'False
      FontUnderline   =   0   'False
      Height          =   492
      Left            =   1320
      Picture         =   (none)
      TabIndex        =   7
      Top             =   2520
      Width           =   972
   End
   Begin SSCommand bPhone7
      Caption         =   "7 PRS"
```

```
PHONESET.FRM - 4
      Font3D          =   1   'Raised w/light shading
      FontBold        =   -1  'True
      FontItalic      =   0   'False
      FontName        =   "Arial"
      FontSize        =   12
      FontStrikethru  =   0   'False
      FontUnderline   =   0   'False
      Height          =   492
      Left            =   120
      Picture         =   (none)
      TabIndex        =   6
      Top             =   2520
      Width           =   972
   End
   Begin SSCommand bPhone6
      Caption         =   "6 MNO"
      Font3D          =   1   'Raised w/light shading
      FontBold        =   -1  'True
      FontItalic      =   0   'False
      FontName        =   "Arial"
      FontSize        =   12
      FontStrikethru  =   0   'False
      FontUnderline   =   0   'False
      Height          =   492
      Left            =   2520
      Picture         =   (none)
      TabIndex        =   5
      Top             =   1800
      Width           =   972
   End
   Begin SSCommand bPhone5
      Caption         =   "5 JKL"
      Font3D          =   1   'Raised w/light shading
      FontBold        =   -1  'True
      FontItalic      =   0   'False
      FontName        =   "Arial"
      FontSize        =   12
      FontStrikethru  =   0   'False
      FontUnderline   =   0   'False
      Height          =   492
      Left            =   1320
      Picture         =   (none)
      TabIndex        =   4
      Top             =   1800
      Width           =   972
   End
   Begin SSCommand bPhone4
      Caption         =   "4 GHI"
      Font3D          =   1   'Raised w/light shading
      FontBold        =   -1  'True
      FontItalic      =   0   'False
      FontName        =   "Arial"
      FontSize        =   12
      FontStrikethru  =   0   'False
      FontUnderline   =   0   'False
      Height          =   492
      Left            =   120
      Picture         =   (none)
      TabIndex        =   3
      Top             =   1800
      Width           =   972
```

```
PHONESET.FRM - 5
   End
   Begin SSCommand bPhone3
      Caption         =   "3 DEF"
      Font3D          =   1  'Raised w/light shading
      FontBold        =   -1 'True
      FontItalic      =   0  'False
      FontName        =   "Arial"
      FontSize        =   12
      FontStrikethru  =   0  'False
      FontUnderline   =   0  'False
      Height          =   492
      Left            =   2520
      Picture         =   (none)
      TabIndex        =   2
      Top             =   1080
      Width           =   972
   End
   Begin SSCommand bPhone2
      Caption         =   "2 ABC"
      Font3D          =   1  'Raised w/light shading
      FontBold        =   -1 'True
      FontItalic      =   0  'False
      FontName        =   "MS Sans Serif"
      FontSize        =   12
      FontStrikethru  =   0  'False
      FontUnderline   =   0  'False
      Height          =   492
      Left            =   1320
      Picture         =   (none)
      TabIndex        =   1
      Top             =   1080
      Width           =   972
   End
   Begin SSCommand bPhone1
      Caption         =   "1"
      Font3D          =   1  'Raised w/light shading
      FontBold        =   -1 'True
      FontItalic      =   0  'False
      FontName        =   "Arial"
      FontSize        =   12
      FontStrikethru  =   0  'False
      FontUnderline   =   0  'False
      Height          =   492
      Left            =   120
      Picture         =   (none)
      TabIndex        =   0
      Top             =   1080
      Width           =   972
   End
End
```

A-79

PHONESET.FRM - 1

```
Sub Command3D11_Click ()
    tLCD.Text = ""
End Sub

Sub bClear_Click ()
    tLCD.Text = ""
End Sub

Sub bClose_Click ()
    Unload Me
End Sub

Sub bDial_Click ()
    ' Stuff phone into call
    CitMakeCall (Trim$(tLCD))
End Sub Sub bHangup_Click ()
    CitHangupCall
End Sub Sub bPhone0_Click ()
    tLCD.Text = tLCD.Text + "0"
End Sub Sub bPhone1_Click ()
    tLCD.Text = tLCD.Text + "1"
End Sub Sub bPhone2_Click ()
    tLCD.Text = tLCD.Text + "2"
End Sub Sub bPhone3_Click ()
    tLCD.Text = tLCD.Text + "3"
End Sub Sub bPhone4_Click ()
    tLCD.Text = tLCD.Text + "4"
End Sub Sub bPhone5_Click ()
    tLCD.Text = tLCD.Text + "5"
End Sub Sub bPhone6_Click ()
    tLCD.Text = tLCD.Text + "6"
End Sub Sub bPhone7_Click ()
    tLCD.Text = tLCD.Text + "7"
End Sub Sub bPhone8_Click ()
    tLCD.Text = tLCD.Text + "8"
End Sub Sub bPhone9_Click ()
    tLCD.Text = tLCD.Text + "9"
```

PHONESET.FRM - 2

End Sub

```
Sub bPhonePound_Click ()
    tLCD.Text = tLCD.Text + "#"
End Sub

Sub Form_Unload (Cancel As Integer)
    fCIT.Show
End Sub
```

PSAP Transfer List

```
PSAP.FRM - 1

VERSION 2.00
Begin Form frmPSAP
    AutoRedraw      =   -1  'True
    BackColor       =   &H00C0C0C0&
    Caption         =   "PSAP List"
    ClientHeight    =   5775
    ClientLeft      =   375
    ClientTop       =   3930
    ClientWidth     =   9150
    FontBold        =   -1  'True
    FontItalic      =   0   'False
    FontName        =   "MS Serif"
    FontSize        =   6.75
    FontStrikethru  =   0   'False
    FontUnderline   =   0   'False
    Height          =   6180
    Left            =   315
    LinkTopic       =   "Form1"
    ScaleHeight     =   5740.388
    ScaleMode       =   0   'User
    ScaleWidth      =   9202.105
    Top             =   3585
    Width           =   9270
    Begin CommandButton bClose
        Caption         =   "Close"
        FontBold        =   -1  'True
        FontItalic      =   0   'False
        FontName        =   "Arial"
        FontSize        =   9
        FontStrikethru  =   0   'False
        FontUnderline   =   0   'False
        Height          =   372
        Left            =   7200
        TabIndex        =   25
        Top             =   5280
        Width           =   1572
    End
    Begin CommandButton bPSAP
        FontBold        =   -1  'True
        FontItalic      =   0   'False
        FontName        =   "Arial"
        FontSize        =   7.5
        FontStrikethru  =   0   'False
        FontUnderline   =   0   'False
        Height          =   612
        Index           =   6
        Left            =   120
        TabIndex        =   7
        Top             =   3960
        Width           =   2892
    End
    Begin CommandButton bPSAP
        FontBold        =   -1  'True
        FontItalic      =   0   'False
        FontName        =   "Arial"
        FontSize        =   7.5
        FontStrikethru  =   0   'False
        FontUnderline   =   0   'False
        Height          =   612
        Index           =   5
        Left            =   120
```

```
PSAP.FRM - 2
      TabIndex        =   6
      Top             =   3360
      Width           =   2892
   End
   Begin CommandButton bPSAP
      FontBold        =   -1   'True
      FontItalic      =   0    'False
      FontName        =   "Arial"
      FontSize        =   7.5
      FontStrikethru  =   0    'False
      FontUnderline   =   0    'False
      Height          =   612
      Index           =   4
      Left            =   120
      TabIndex        =   5
      Top             =   2760
      Width           =   2892
   End
   Begin CommandButton bPSAP
      FontBold        =   -1   'True
      FontItalic      =   0    'False
      FontName        =   "Arial"
      FontSize        =   7.5
      FontStrikethru  =   0    'False
      FontUnderline   =   0    'False
      Height          =   612
      Index           =   3
      Left            =   120
      TabIndex        =   4
      Top             =   2160
      Width           =   2892
   End
   Begin CommandButton bPSAP
      FontBold        =   -1   'True
      FontItalic      =   0    'False
      FontName        =   "Arial"
      FontSize        =   7.5
      FontStrikethru  =   0    'False
      FontUnderline   =   0    'False
      Height          =   612
      Index           =   2
      Left            =   120
      TabIndex        =   3
      Top             =   1560
      Width           =   2892
   End
   Begin CommandButton bPSAP
      FontBold        =   -1   'True
      FontItalic      =   0    'False
      FontName        =   "Arial"
      FontSize        =   7.5
      FontStrikethru  =   0    'False
      FontUnderline   =   0    'False
      Height          =   612
      Index           =   1
      Left            =   120
      TabIndex        =   2
      Top             =   960
      Width           =   2892
   End
   Begin CommandButton bPSAP
```

PSAP.FRM - 3

```
    FontBold         =   -1      'True
    FontItalic       =   0       'False
    FontName         =   "Arial"
    FontSize         =   7.5
    FontStrikethru   =   0       'False
    FontUnderline    =   0       'False
    Height           =   612
    Index            =   0
    Left             =   120
    TabIndex         =   1
    Top              =   360
    Width            =   2892
End
Begin SSFrame frmPSAP
    Alignment        =   2       'Center
    Caption          =   "PSAP Transfer List"
    Font3D           =   1       'Raised w/light shading
    FontBold         =   -1      'True
    FontItalic       =   0       'False
    FontName         =   "Arial"
    FontSize         =   9
    FontStrikethru   =   0       'False
    FontUnderline    =   0       'False
    ForeColor        =   &H00000000&
    Height           =   5775
    Left             =   0
    ShadowStyle      =   1       'Raised
    TabIndex         =   0
    Top              =   0
    Width            =   8895
    Begin CommandButton bPSAP
        FontBold         =   -1      'True
        FontItalic       =   0       'False
        FontName         =   "Arial"
        FontSize         =   7.5
        FontStrikethru   =   0       'False
        FontUnderline    =   0       'False
        Height           =   612
        Index            =   23
        Left             =   5880
        TabIndex         =   24
        Top              =   4560
        Width            =   2892
    End
    Begin CommandButton bPSAP
        FontBold         =   -1      'True
        FontItalic       =   0       'False
        FontName         =   "Arial"
        FontSize         =   7.5
        FontStrikethru   =   0       'False
        FontUnderline    =   0       'False
        Height           =   612
        Index            =   22
        Left             =   5880
        TabIndex         =   23
        Top              =   3960
        Width            =   2892
    End
    Begin CommandButton bPSAP
        FontBold         =   -1      'True
        FontItalic       =   0       'False
```

A-85

```
PSAP.FRM - 4
            FontName       =   "Arial"
            FontSize       =   7.5
            FontStrikethru =   0   'False
            FontUnderline  =   0   'False
            Height         =   612
            Index          =   21
            Left           =   5880
            TabIndex       =   22
            Top            =   3360
            Width          =   2892
         End
         Begin CommandButton bPSAP
            FontBold       =   -1  'True
            FontItalic     =   0   'False
            FontName       =   "Arial"
            FontSize       =   7.5
            FontStrikethru =   0   'False
            FontUnderline  =   0   'False
            Height         =   612
            Index          =   20
            Left           =   5880
            TabIndex       =   21
            Top            =   2760
            Width          =   2892
         End
         Begin CommandButton bPSAP
            FontBold       =   -1  'True
            FontItalic     =   0   'False
            FontName       =   "Arial"
            FontSize       =   7.5
            FontStrikethru =   0   'False
            FontUnderline  =   0   'False
            Height         =   612
            Index          =   19
            Left           =   5880
            TabIndex       =   20
            Top            =   2160
            Width          =   2892
         End
         Begin CommandButton bPSAP
            FontBold       =   -1  'True
            FontItalic     =   0   'False
            FontName       =   "Arial"
            FontSize       =   7.5
            FontStrikethru =   0   'False
            FontUnderline  =   0   'False
            Height         =   612
            Index          =   18
            Left           =   5880
            TabIndex       =   19
            Top            =   1560
            Width          =   2892
         End
         Begin CommandButton bPSAP
            FontBold       =   -1  'True
            FontItalic     =   0   'False
            FontName       =   "Arial"
            FontSize       =   7.5
            FontStrikethru =   0   'False
            FontUnderline  =   0   'False
            Height         =   612
```

```
PSAP.FRM - 5
            Index           =   17
            Left            =   5880
            TabIndex        =   18
            Top             =   960
            Width           =   2892
         End
         Begin CommandButton bPSAP
            FontBold        =   -1  'True
            FontItalic      =   0   'False
            FontName        =   "Arial"
            FontSize        =   7.5
            FontStrikethru  =   0   'False
            FontUnderline   =   0   'False
            Height          =   612
            Index           =   16
            Left            =   5880
            TabIndex        =   17
            Top             =   360
            Width           =   2892
         End
         Begin CommandButton bPSAP
            FontBold        =   -1  'True
            FontItalic      =   0   'False
            FontName        =   "Arial"
            FontSize        =   7.5
            FontStrikethru  =   0   'False
            FontUnderline   =   0   'False
            Height          =   612
            Index           =   15
            Left            =   3000
            TabIndex        =   16
            Top             =   4560
            Width           =   2892
         End
         Begin CommandButton bPSAP
            FontBold        =   -1  'True
            FontItalic      =   0   'False
            FontName        =   "Arial"
            FontSize        =   7.5
            FontStrikethru  =   0   'False
            FontUnderline   =   0   'False
            Height          =   612
            Index           =   14
            Left            =   3000
            TabIndex        =   15
            Top             =   3960
            Width           =   2892
         End
         Begin CommandButton bPSAP
            FontBold        =   -1  'True
            FontItalic      =   0   'False
            FontName        =   "Arial"
            FontSize        =   7.5
            FontStrikethru  =   0   'False
            FontUnderline   =   0   'False
            Height          =   612
            Index           =   13
            Left            =   3000
            TabIndex        =   14
            Top             =   3360
            Width           =   2892
```

A-87

```
PSAP.FRM - 6
         End
         Begin CommandButton bPSAP
            FontBold         =   -1   'True
            FontItalic       =   0    'False
            FontName         =   "Arial"
            FontSize         =   7.5
            FontStrikethru   =   0    'False
            FontUnderline    =   0    'False
            Height           =   612
            Index            =   12
            Left             =   3000
            TabIndex         =   13
            Top              =   2760
            Width            =   2892
         End
         Begin CommandButton bPSAP
            FontBold         =   -1   'True
            FontItalic       =   0    'False
            FontName         =   "Arial"
            FontSize         =   7.5
            FontStrikethru   =   0    'False
            FontUnderline    =   0    'False
            Height           =   612
            Index            =   11
            Left             =   3000
            TabIndex         =   12
            Top              =   2160
            Width            =   2892
         End
         Begin CommandButton bPSAP
            FontBold         =   -1   'True
            FontItalic       =   0    'False
            FontName         =   "Arial"
            FontSize         =   7.5
            FontStrikethru   =   0    'False
            FontUnderline    =   0    'False
            Height           =   612
            Index            =   10
            Left             =   3000
            TabIndex         =   11
            Top              =   1560
            Width            =   2892
         End
         Begin CommandButton bPSAP
            FontBold         =   -1   'True
            FontItalic       =   0    'False
            FontName         =   "Arial"
            FontSize         =   7.5
            FontStrikethru   =   0    'False
            FontUnderline    =   0    'False
            Height           =   612
            Index            =   9
            Left             =   3000
            TabIndex         =   10
            Top              =   960
            Width            =   2892
         End
         Begin CommandButton bPSAP
            FontBold         =   -1   'True
            FontItalic       =   0    'False
            FontName         =   "Arial"
```

A-88

```
PSAP.FRM - 7
        FontSize        =   7.5
        FontStrikethru  =   0       'False
        FontUnderline   =   0       'False
        Height          =   612
        Index           =   8
        Left            =   3000
        TabIndex        =   9
        Top             =   360
        Width           =   2892
    End
    Begin CommandButton bPSAP
        FontBold        =   -1      'True
        FontItalic      =   0       'False
        FontName        =   "Arial"
        FontSize        =   7.5
        FontStrikethru  =   0       'False
        FontUnderline   =   0       'False
        Height          =   612
        Index           =   7
        Left            =   120
        TabIndex        =   8
        Top             =   4560
        Width           =   2892
    End
  End
End
```

PSAP.FRM - 1

```
Option Explicit

Sub cTableList_Click ()

fCit.Refresh

End Sub

Sub Form_Load ()
    'set the height and width
    Height = 5120
    Width = 5120
    Top = 0
    Left = 0
    MsgBar "Running PSAP look-up", True
    SetHourglass Me
    Dim sql As String
    'create a new dynaset form
    sql = "Select AgencyNo, Name from AgencyQry order by name;"
    Debug.Print "PSAP sql=" & sql
    On Error GoTo bSpeedDial_SQLError
    Set PSAPDS = gCurrentDB.CreateDynaset(sql)
    If PSAPDS.EOF = True Then
        MsgBar "No PSAPs available for selection ", False
        GoTo bSpeedDial_SQLError
    End If
    Dim cnt As Integer
    While Not PSAPDS.EOF And cnt < 24
        bPSAP(cnt).Caption = PSAPDS("AgencyNo") & " " & PSAPDS("Name")
        'get all the others
        PSAPDS.MoveNext
        cnt = cnt + 1
    Wend Hide GoTo bSpeedDial_End bSpeedDial_SQLError:
    ResetMouse Me
    MsgBar "", False
    ShowError
    Exit Sub bSpeedDial_End:
    ResetMouse Me
    MsgBar "", False
    Exit Sub End Sub Sub Form_Unload (Cancel As Integer)
  Me.WindowState = 1
  Cancel = True
End Sub
```

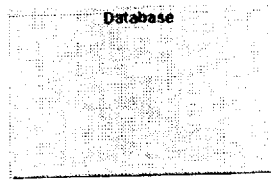

```
SUPER.FRM - 1

VERSION 2.00
Begin Form FrmSuper
   Caption         =   "Supervisor"
   ClientHeight    =   2040
   ClientLeft      =   870
   ClientTop       =   1530
   ClientWidth     =   3105
   FontBold        =   -1  'True
   FontItalic      =   0   'False
   FontName        =   "Arial"
   FontSize        =   7.5
   FontStrikethru  =   0   'False
   FontUnderline   =   0   'False
   Height          =   2445
   Left            =   810
   LinkTopic       =   "Form1"
   ScaleHeight     =   2040
   ScaleWidth      =   3105
   Top             =   1185
   Width           =   3225
   Begin SSCommand bQuery
      Caption         =   "Ad-hoc Query"
      Font3D          =   0   'None
      FontBold        =   -1  'True
      FontItalic      =   0   'False
      FontName        =   "Arial"
      FontSize        =   9
      FontStrikethru  =   0   'False
      FontUnderline   =   0   'False
      Height          =   372
      Left            =   720
      Picture         =   (none)
      TabIndex        =   1
      Top             =   480
      Width           =   1572
   End
   Begin PictureBox Connect1
      Height          =   492
      Left            =   1080
      ScaleHeight     =   465
      ScaleWidth      =   945
      TabIndex        =   2
      Top             =   1080
      Width           =   972
   End
   Begin SSFrame frDatabase
      Alignment       =   2   'Center
      Caption         =   "Database"
      Font3D          =   0   'None
      FontBold        =   -1  'True
      FontItalic      =   0   'False
      FontName        =   "Arial"
      FontSize        =   9
      FontStrikethru  =   0   'False
      FontUnderline   =   0   'False
      ForeColor       =   &H00000000&
      Height          =   2052
      Left            =   0
      TabIndex        =   0
      Top             =   0
      Width           =   3132
```

```
SUPER.FRM - 2
    End
End
```

SUPER.FRM - 1

Option Explicit

```
Sub bQuery_Click ()
    'fTables.WindowState = 1    hide
    'fQuery.WindowState = 0    load
End Sub
```

```
UTIL.FRM - 1

VERSION 2.00
Begin Form Util
    Caption         =   "Utility"
    ClientHeight    =   5820
    ClientLeft      =   2505
    ClientTop       =   1515
    ClientWidth     =   7365
    FontBold        =   -1  'True
    FontItalic      =   0   'False
    FontName        =   "Arial"
    FontSize        =   9
    FontStrikethru  =   0   'False
    FontUnderline   =   0   'False
    Height          =   6225
    Left            =   2445
    LinkTopic       =   "Form1"
    ScaleHeight     =   5820
    ScaleWidth      =   7365
    Top             =   1170
    Width           =   7485
    Begin VOICE Audio
        Prop5           =   "Click on """"..."""" for About Box"
        ActionResult    =   0
        CallTimeOut     =   20
        CompressSilence =   0   'False
        ConnectLength   =   0
        ConnectResult   =   0
        DateFormat      =   "mm/dd/yyyy"
        Debug           =   0   'False
        Digits          =   ""
        DigitsTimeOut   =   15
        DTermDigits     =   "#"
        FileFormat      =   3   'PCM 8 KHz
        InterDigitTimeOut=  0
        Left            =   1560
        MaxDigits       =   1
        MaxNonSilence   =   0
        MaxSilence      =   0
        PhoneLine       =   2
        Precision       =   6   'General
        Rate            =   0
        RecordTimeOut   =   60
        Rings           =   1
        SystemError     =   0
        Top             =   3840
        Value           =   ""
        Volume          =   0
        VTermDigits     =   "@"
    End
    Begin VOICE Voice
        Prop5           =   "Click on """"..."""" for About Box"
        ActionResult    =   0
        CallTimeOut     =   20
        CompressSilence =   -1  'True
        ConnectLength   =   0
        ConnectResult   =   0
        DateFormat      =   "mm/dd/yyyy"
        Debug           =   -1  'True
        Digits          =   ""
        DigitsTimeOut   =   15
        DTermDigits     =   "#"
```

```
UTIL.FRM - 2
      FileFormat        =    1    'ADPCM 8 KHz
      InterDigitTimeOut=    0
      Left              =    1560
      MaxDigits         =    1
      MaxNonSilence     =    0
      MaxSilence        =    0
      PhoneLine         =    1
      Precision         =    6    'General
      Rate              =    0
      RecordTimeOut     =    60
      Rings             =    1
      SystemError       =    0
      Top               =    3360
      Value             =    ""
      Volume            =    0
      VTermDigits       =    "@"
   End
   Begin TextBox SendBox
      Height            =    495
      Left              =    3120
      TabIndex          =    0
      Text              =    "Text1"
      Top               =    2640
      Width             =    1215
   End
   Begin Timer Timer1
      Left              =    3120
      Top               =    2640
   End
End
```

UTIL.FRM - 1

```
CIT.BAS - 1

Option Explicit
Global gfCitError As Variant
Global gwCitError As Long
Global gsCitVerb As String
Global gsCitMsg As String
'Cit specific variables
Global hWin As Integer
Global gsCitDN As String * 19

Sub CheckCitError (gsCitVerb As String)
    If DecCitProductInstalled = True Then
        CheckDecCitError gsCitVerb
        Exit Sub
    End If
    If TAPICitProductInstalled = True Then
        CheckTAPICitError gsCitVerb
        Exit Sub
    End If
    MsgBar "Unrecognized Cit product installed, see Supervisor", False End Sub Sub CitAssign ()
'Cit string structure
    MsgBar "Cit Assigning Channel", True
    'unsigned long __pascal __far CitAssign(unsigned int __far *lphChan,void __t
ar *lpvItemList,unsigned short cbPbxnLen,char __far *lpPbxName,unsigned short cL
NodeLen,char__far *lpNode,unsigned int hAppWin);

On Error GoTo CitAssign_Runtime_error
    ' Check the installed Cit Product
    If DecCitProductInstalled = True Then
        DecCitAssignItem.Length = 24
        DecCitAssignItem.Code = DecCit__DN
        'DecCitAssignItem.ByteCnt = Chr$(Len(RTrim$(DecDN)))
        DecCitAssignItem.ByteCnt = Chr$(3)
        DecCitAssignItem.DN = Trim$(DecDN)
        DecCitAssignItem.Zeroword = 0
        gwCitError = DecCitAssign(DecChannel, DecCitAssignItem, Len(RTrim$(DecPt
xName)), DecPbxName, Len(RTrim$(DecNode)), DecNode, fCit.tCitStatus.hWnd)
    End If CheckCitError "CitAssign"
    If gfCitError = True Then
        GoTo CitAssign_Error
    End If If DecCitProductInstalled = True Then
        DecCitDeviceAttributeList.Length = 12
        DecCitDeviceAttributeList.Code = DecCit__Monitor
        DecCitDeviceAttributeList.StateLength = 8
        DecCitDeviceAttributeList.StateCode = DecCit__State_Mode
        DecCitDeviceAttributeList.State = DecCit_M_All
        DecCitDeviceAttributeList.Zeroword = 0
        gwCitError = DecCitSetDeviceAttributes(DecChannel, DecCitDeviceAttribute
List)
    End If CheckCitError "CitSetDeviceAttributes"
    If gfCitError = True Then
```

CIT.BAS - 2
```
        GoTo CitAssign_Error
    End If

If DecCitProductInstalled = True Then
        DecAwaitCall = True
        DecAwaitConf = False
        CitGetEvent
    End If
    MsgBar "Cit Channel Assigned and Attributes Set", False Exit Sub CitAssign_Error:
    Exit Sub CitAssign_Runtime_error:
    ShowError
    Exit Sub End Sub Sub CitCancelCall ()
    'unsigned long __pascal __far CitCancelCall(unsigned int hC,unsigned long dw
CallId);
    MsgBar "Cit Cancelling Call", True
    On Error GoTo Cit_CancelCall_Runtime_Error
    ' Check the installed Cit Product
    If DecCitProductInstalled = True Then
        gwCitError = DecCitCancelCall(DecChannel, DecCallId)
    End If CheckCitError "CitCancelCall"
    If gfCitError = True Then
        GoTo Cit_CancelCall_Error
    End If Exit Sub Cit_CancelCall_Error:

Exit Sub

Cit_CancelCall_Runtime_Error:
    ShowError
    Exit Sub

End Sub

Sub CitConferenceJoin ()
    'unsigned long __pascal __far CitConferenceJoin(unsigned int hC,unsigned lon
g dwCallId,unsigned long dwActiveCallId);
    MsgBar "Initiating Cit Conference Join", True
    On Error GoTo Cit_ConferenceJoin_Runtime_Error
    ' Check the installed Cit Product
    If DecCitProductInstalled = True Then
        gwCitError = DecCitConferenceJoin(DecChannel, DecHeldCallId, 0&)
    End If
    'Check error
    CheckCitError "CitConferenceJoin"
```

A-100

```
CIT.BAS - 3
    If gfCitError = True Then
        GoTo Cit_ConferenceJoin_Error
    End If fCit.bConference.Enabled = True
    fCit.bTransfer.Enabled = True
    fCit.bRetrieve.Enabled = False
    fCit.bMakeCall.Enabled = True
    fCit.bHangup.Enabled = True
    fCit.bHangup.Visible = True
    fCit.bCancel.Enabled = True
    fCit.bDisturb.Enabled = False
    fCit.tCitStatus = Time & " Conference" & crlf & fCit.tCitStatus Exit Sub Cit_ConferenceJoin_Error:

Exit Sub

Cit_ConferenceJoin_Runtime_Error:
    ShowError
    Exit Sub

End Sub

Sub CitDeassign ()
    MsgBar "Cit Deassigning Channel", True
'unsigned long __pascal __far CitDeassign(unsigned int hC);

On Error GoTo Cit_Deassign_Runtime_error
    ' Check the installed Cit Product
    If DecCitProductInstalled = True Then
        gwCitError = DecCitDeassign(DecChannel)
    End If
    'Check error
    CheckCitError "CitDeassign"
    If gfCitError = True Then
        GoTo Cit_Deassign_Error
    End If
    MsgBar "", False
    Exit Sub Cit_Deassign_Error:
    Exit Sub Cit_Deassign_Runtime_error:
    ShowError
    Exit Sub End Sub Sub CitGetEvent ()
    'unsigned long __pascal __far CitGetEvent(unsigned int hC,void __far *lpvIte
mList,unsigned inthWnd,void __far *lpvAsb);
    MsgBar "Cit Checking Telephone Events", True
    On Error GoTo Cit_GetEvent_Runtime_error
    If DecCitProductInstalled = True Then
        DecCitEventList.RefLength = 8
```

A-101

CIT.BAS - 4

```
        DecCitEventList.RefCode = DecCit__REF_ID
        '
        DecCitEventList.StateLength = 8
        DecCitEventList.StateCode = DecCit__State
        '
        DecCitEventList.EventLength = 8
        DecCitEventList.EventCode = DecCit__Event
        '
        DecCitEventList.OtherPartyLength = 40
        DecCitEventList.OtherPartyCode = DecCit__Other_Party
        '
        DecCitEventList.ThirdPartyLength = 36
        DecCitEventList.ThirdPartyCode = DecCit__Third_Party
        '
        DecCitEventList.DialedNumberLength = 36
        DecCitEventList.DialedNumberCode = DecCit__Dialed_Number
        '
        DecCitEventList.Zeroword = 0
        '
        gwCitError = DecCitGetEvent(DecChannel, DecCitEventList, fCit.hWnd, DecC
itASB)
    End If 'Check error
    CheckCitError "CitGetEvent"
    If gfCitError = True Then
        GoTo Cit_GetEvent_Error
    End If
    MsgBar "", False Exit Sub Cit_GetEvent_Error:

Exit Sub

Cit_GetEvent_Runtime_error:
    ShowError
    Exit Sub

End Sub

Sub CitHangupCall ()

MsgBar "Cit Hanging up", True

On Error GoTo Cit_HangupCall_Runtime_error
    ' Check the installed Cit Product
    If DecCitProductInstalled = True Then
        gwCitError = DecCitHangupCall(DecChannel, DecCallId)
    End If 'Check error
    CheckCitError "CitHangupCall"
    If gfCitError = True Then
        GoTo Cit_HangupCall_Error
    End If MsgBar "", False
    Exit Sub
```

A-102

CIT.BAS - 5

```
Cit_HangupCall_Error:

Exit Sub

Cit_HangupCall_Runtime_error:
      ShowError
      Exit Sub

End Sub

Sub CitInitiateConferenceCall (Phone As Variant)
        'unsigned long __pascal __far CitInitiateConferenceCall(unsigned int hC,void
  __far *lpvItmList);
      MsgBar "Cit Initiating Conference Call", True
      On Error GoTo Cit_InitiateConferenceCall_Runtime_Error
      ' Check the installed Cit Product
      If DecCitProductInstalled = True Then
          DecCitAssignItem.Length = 24
          DecCitAssignItem.Code = DecCit__DN
          DecCitAssignItem.ByteCnt = Chr$(Len(Phone))
          DecCitAssignItem.DN = Trim$(Phone)
          DecCitAssignItem.Zeroword = 0
          gwCitError = DecCitInitiateConferenceCall(DecChannel, DecCitAssignItem)
      End If 'Check error
      CheckCitError "CitInitiateConferenceCall"
      If gfCitError = True Then
          GoTo Cit_InitiateConferenceCall_Error
      End If MsgBar "Cit Initiate Conference Call Completed", False Exit Sub Cit_InitiateConferenceCall_Error:

Exit Sub

Cit_InitiateConferenceCall_Runtime_Error:
      ShowError
      Exit Sub

End Sub

Sub CitInitiateTransferCall (Phone As Variant)
        'unsigned long __pascal __far CitTransferCall(unsigned int hC,unsigned long
dwCallId,unsigned long dwActiveCallId);
      MsgBar "Cit Initiating Transfer", True On Error GoTo Cit_InitiateTransferCall_Runtime_Error
      ' Check the installed Cit Product
      If DecCitProductInstalled = True Then
          DecCitAssignItem.Length = 24
          DecCitAssignItem.Code = DecCit__DN
          DecCitAssignItem.ByteCnt = Chr$(Len(Phone))
          DecCitAssignItem.DN = RTrim$(Phone)
          gwCitError = DecCitInitiateTransferCall(DecChannel, DecCitAssignItem)
      End If
      'Check error
      CheckCitError "CitInitiateTransferCall"
```

CIT.BAS - 6

```
    If gfCitError = True Then
        GoTo Cit_InitiateTransferCall_Error
    End If Cit_InitiateTransferCall_Error:

Exit Sub

Cit_InitiateTransferCall_Runtime_Error:
    ShowError
    Exit Sub

End Sub

Sub CitMakeCall (Phone As String)
    'unsigned long __pascal __far CitAssign(unsigned int __far *lphChan,void __f
ar *lpvItemList,unsigned short cbPbxnLen,char __far *lpPbxName,unsigned short ct
NodeLen,char __far *lpNode,unsigned int hAppWin);
    MsgBar "Cit Making Call", True
    On Error GoTo Cit_MakeCall_Runtime_error
    ' Check the installed Cit Product
    If DecCitProductInstalled = True Then
        DecCitAssignItem.Length = 24
        DecCitAssignItem.Code = DecCit__DN
        DecCitAssignItem.ByteCnt = Chr$(Len(Phone))
        DecCitAssignItem.DN = Trim$(Phone)
        gwCitError = DecCitMakeCall(DecChannel, DecCitAssignItem)
    End If
    'Check error
    CheckCitError "CitMakeCall"
    If gfCitError = True Then
            GoTo Cit_MakeCall_Error
    End If Exit Sub Cit_MakeCall_Error:

Exit Sub

Cit_MakeCall_Runtime_error:
    ShowError
    Exit Sub

End Sub

Sub CitProduct ()
    Dim tmp As String
    Dim x As Integer
    Dim s As String
    tmp = String$(2048, 32)
    CitProductInstalled = True
    TAPICitProductInstalled = False
    DecCitProductInstalled = True
    'get Digital Cit ini params
    If DecCitProductInstalled Then
        x = OSGetPrivateProfileString("AssignTo", "NODE", "", tmp, Len(tmp), "PV
.INI")
        If x > 0 Then
```

A-104

CIT.BAS - 7

```
            DecNode = Trim$(Mid$(tmp, 1, x))
            Debug.Print "node = " & DecNode
            fCit.tNode = DecNode
            x = OSGetPrivateProfileString("AssignTo", "LOGID", "", tmp, Len(tmp)
, "PW.INI")
            If x > 0 Then
                DecPbxName = Trim$(Mid$(tmp, 1, x))
                Debug.Print "logid = " & DecPbxName
                fCit.tPBX = DecPbxName
                x = OSGetPrivateProfileString("AssignTo", "DN", "", tmp, Len(tmp
), "PW.INI")
                If x > 0 Then
                    DecDN = Trim$(Mid$(tmp, 1, x))
                    Debug.Print "DN = " & DecDN
                    fCit.tDN = DecDN
                    s = "PBX Name " & DecPbxName & "  Node " & DecNode & "  DN "
& DecDN
                Else
                    GoTo CitProductDNError
                End If
            Else
                GoTo CitProductLogidError
            End If
        Else
        GoTo CitProductNodeError
        End If
    End If MsgBar s, False
    Exit Sub CitProductDNError:
    s = "Cit Bad DN in PW.INI"
    MsgBar s, False
    Stop CitProductLogidError:
    s = "Cit Bad Logid in PW.INI"
    MsgBar s, False
    Stop CitProductNodeError:
    s = "Cit Bad Node in PW.INI or PW.INI missing from Windows Directory"
    MsgBar s, False
    Stop End Sub Sub CitTransferCall ()
    'unsigned long __pascal __far CitInitiateTransferCall(unsigned int hC,void _
_far *lpvItmList);
    MsgBar "Cit Transferring Call", True
    On Error GoTo Cit_TransferCall_Runtime_Error
    ' Check the installed Cit Product
    If DecCitProductInstalled = True Then
        gwCitError = DecCitTransferCall(DecChannel, DecHeldCallId, DecCallId)
    End If
    'Check error
    CheckCitError "CitTransferCall"
    If gfCitError = True Then
        GoTo Cit_TransferCall_Error
```

A-105

```
CIT.BAS - 8
    End If

Exit Sub

Cit_TransferCall_Error:

Exit Sub

Cit_TransferCall_Runtime_Error:
    ShowError
    Exit Sub

End Sub

Sub ShowCitError (CitVerb As String, CitError As Variant, CitMsg As String)
  Dim msg As String
  Const MB_STOP = 16 msg = "The following Cit Error occurred:" + crlf + crlf
  'add the error string
  msg = msg + "Function: " + CitVerb + crlf
  msg = msg + "Message: " + CitMsg + crlf
  'add the error number
  msg = msg + "Number: " + CStr(CitError) 'CStr(Err)
  'beep and show the error
  Beep
  MsgBox msg, MB_STOP
  'Stop End Sub
```

```
DECCIT.BAS - 1

Option Explicit

'Phone number item list
Type DecCitAssignItem
    Length As Integer
    Code As Integer
    ByteCnt As String * 1
    'Bcs As String * DecCit_K_DN_LEN
    DN As String * 19
    Zeroword As Long
End Type
Global DecCitAssignItem As DecCitAssignItem 'Variables as defined in the DEC Cit Applications
'for MS-Windows  AA-PTPAA-TE
Global DecAwaitCall As Variant
Global DecAwaitConf As Variant
Global DecPbxName As String
Global DecNode As String
Global DecCallId As Long
Global DecChannel As Integer
Global DecHeldCallId As Long
Global DecActiveCallId As Long
Global DecDN As String
Global DecANI As String 'Global Const _Cit_DEFINITIONS_H
Global Const WM_USER = &H400
Global Const PM_Cit_EVENT = WM_USER + 100
Global Const PM_Cit_ROUTE = WM_USER + 101
Global Const PM_Cit_NETERR = WM_USER + 102

Global Const DecCit_K_MAX_VMS_FILE = 32
Global Const DecCit_K_MAX_DEV_LEN = 15
Global Const DecCit_K_MAX_LOGICALNAME_LEN = 15
Global Const DecCit_K_PBXNAME_LEN = 15
Global Const DecCit_K_PROTOCOL_LEN = 15
Global Const DecCit_K_MAX_FOR_CALLS = 10
Global Const DecCit_K_MAX_DN_LEN = 19
Global Const DecCit_K_DN_LEN = 19
Global Const DecCit_K_LINE_ITEM_LIST_LEN = 72
Global Const DecCit_K_MONITOR_LEN = 12
Global Const DecCit_K_MAX_SETDEV_LEN = 64
Global Const DecCit_K_MIN_GETDEV_LEN = 16
Global Const DecCit_K_MAX_GETDEV_LEN = 64
Global Const DecCit_K_MAX_GBLMSG_LEN = 15
Global Const DecCit_K_MAX_NODE_LEN = 7

' literals representing on and off
'
Global Const DecCit_K_OFF = 0
Global Const DecCit_K_ON = 1
Global Const DecCit_K_MIN_LITERAL = 0
Global Const DecCit_K_MAX_LITERAL = 1
'
'    Additional item codes required for foreign protocol support
'
Global Const DecCit__FUNCS_SUPP = 50        'FUNCTIONS SUPPORTED MASK USED
```

```
DECCIT.BAS - 2

ON ASSIGN

Global Const DecCit__LOGICAL_ID = 51              'LOGICAL IDENTIFIER/PBX NAME
Global Const DecCit__MON_MAX = 52                 'MAXIMUM MONITORS (MGMT PARAM)
Global Const DecCit__INQUEUE_MAX = 53             'MAXIMUM INQUEUE MGMT PARAM VALUE
UE
Global Const DecCit__DEVICE_NAME = 54             'COMMUNICATIONS DEVICE
Global Const DecCit__LINE_STATE = 55              'STATE OF COMMS LINK WITH SWITCH
H
Global Const DecCit__MON_CURRENT = 56             'CURRENT NUMBER OF MONITORS ON
(MGMT PARAM)
Global Const DecCit__CALL_REFERENCE = 57          'CALL REFERENCE
Global Const DecCit__RESPONSE = 58                'RESPONSE TO INACTIVE
Global Const DecCit_K_MIN_FOR_ITEM = 50
Global Const DecCit_K_MAX_FOR_ITEM = 58
Global Const DecCit_K_BARGE_IN = 100
Global Const DecCit_K_RING_BACK = 101
Global Const DecCit_K_CAMP_ON = 102
Global Const DecCit_K_MIN_FEATURE = 100
Global Const DecCit_K_MAX_FEATURE = 102
'
'   Telephony Device item codes
'
Global Const DecCit__DN = 200                     ' DIALABLE NUMBER
Global Const DecCit__DN_QUALIFIER = 201           ' DN QUALIFIER SUCH AS PRIME DN
Global Const DecCit__PLID = 202                   ' LOGICAL IDENTIFIER FOR THE PH
ONE
Global Const DecCit__TRUNK = 203                  ' TRUNK NUMBER
Global Const DecCit__DNIS = 204                   ' DNIS - OUTPUT ONLY
Global Const DecCit__LINE_ID = 205                ' CALLING LINE ID
Global Const DecCit__PARTY_QUALIFIER = 206        ' PARTY QUALIFIER
Global Const DecCit_K_MIN_DN_ITEM = 200
Global Const DecCit_K_MAX_DN_ITEM = 206
'
'   Monitor item codes
'
Global Const DecCit__STATE_MODE = 300             ' BITMASK DESCRIBING STATES TO
BE MONITORED
Global Const DecCit__EVENT_MODE = 301             ' CONSTANT STATING WHETHER EVEN
TS ARE TO BE MONITORED
Global Const DecCit_K_MIN_MONITOR_ITEM = 300
Global Const DecCit_K_MAX_MONITOR_ITEM = 301
'
'   Call forward item codes
'
Global Const DecCit__CF_MODE = 400
Global Const DecCit__CF_DN = 401
Global Const DecCit_K_MIN_CF_ITEM = 400
Global Const DecCit_K_MAX_CF_ITEM = 401
'
'
Global Const DecCit__REQUEST = 450
Global Const DecCit__FREE = 451
Global Const DecCit__VOICE_RESOURCE_NAME = 452
Global Const DecCit__VOICE_SERVICE_STATUS = 453
Global Const DecCit_K_MIN_VS_ITEM = 450
Global Const DecCit_K_MAX_VS_ITEM = 453
'
'
'   Set Device Attributes item codes
'
```

DECCIT.BAS - 3

```
Global Const DecCit__MONITOR = 500              ' SET MONITOR FOR THE SPECIFIED
 MASKS
Global Const DecCit__CF = 501                   ' SET CALL FORWARD ON FOR THE S
PECIFIED CALLS
Global Const DecCit__BUSY = 502                 ' MAKE SET BUSY/FREE
Global Const DecCit__MSG_WAITING = 503          ' INCREMENT, DECREMENT OR RESET
 MESSAGE WAITING LAMP
Global Const DecCit__AUTO_ANSWER = 504          ' ENABLE/DISABLE AUTO-ANSWER
Global Const DecCit__AGENT_STATUS = 505         ' SET AGENT STATUS FOR SPECIFED
 MODE
Global Const DecCit__VOICE_SERVICES = 506
Global Const DecCit__VOICE_WAIT_FOR_CALL = 507
Global Const DecCit_K_MIN_SETDEV_ITEM = 500
Global Const DecCit_K_MAX_SETDEV_ITEM = 507
'
'       Get Channel Information item codes
'
Global Const DecCit__DEVICE = 600
Global Const DecCit__LINE_TYPE = 601            ' LINE TYPE - IE SET, TRUNK, MU
LTILINE GP.
Global Const DecCit__SET_DN = 602               ' IF SET THEN SET KIND
Global Const DecCit__PRIME = 603                ' IF SET BOOLEAN FOR PRIME LINE
Global Const DecCit__SET_TYPE = 604             ' IF SET THEN SET KIND
Global Const DecCit__TRUNK_NO = 605             ' IF TRUNK - THEN TRUNK NUMBER
Global Const DecCit__TRUNK_TYPE = 606           ' IF TRUNK - THEN TRUNK TYPE
Global Const DecCit__MULTI_NO = 607             ' IF MULTILINE GROUP - THEN NUM
BER OF MEMBERS
Global Const DecCit__PROCEDURE_SUPPORT = 608    ' PROCEDURES SUPPORTED BY THEDE
VICE
Global Const DecCit__MONITOR_MASK = 609         ' CURRENT MONITOR SETTINGS
Global Const DecCit_K_MIN_GCI_ITEM = 600
Global Const DecCit_K_MAX_GCI_ITEM = 609
'
'       Get Channel State Change item codes
'
Global Const DecCit__REF_ID = 700               ' CALL REFERENCE IDENTIFIER
Global Const DecCit__State = 701                ' CURRENT CALL STATE
Global Const DecCit__Event = 702                ' CURRENT EVENT
Global Const DecCit__EVENT_QUALIFIER = 703      ' PBX SPECIFIC EVENT
Global Const DecCit__TYPE = 704                 ' CURRENT CALL TYPE,
Global Const DecCit__OTHER_PARTY = 705          ' TELEPHONY DEVICE OF THE OTHER
 PARTY
Global Const DecCit__THIRD_PARTY = 706          ' TELEPHONY DEVICE OF THE THIRD
 PARTY
Global Const DecCit__DIALED_NUMBER = 707        ' ITEM CODE FOR DNIS SUPPORT
Global Const DecCit_K_MIN_GSC_ITEM = 700
Global Const DecCit_K_MAX_GSC_ITEM = 707
'
' Call Forward Literals
'
Global Const DecCit_K_CF_EXT_BUSY = 800
Global Const DecCit_K_CF_INT_BUSY = 801
Global Const DecCit_K_CF_EXT_NO_ANSWER = 802
Global Const DecCit_K_CF_INT_NO_ANSWER = 803
Global Const DecCit_K_CF_NO_ANSWER_BUSY = 804
Global Const DecCit_K_CF_ALL = 805
Global Const DecCit_K_MIN_CF_LITERAL = 800
Global Const DecCit_K_MAX_CF_LITERAL = 805
'
' Line type literals
'
```

```
DECCIT.BAS - 4

Global Const DecCit_K_LINE_VOICE_SET = 900
Global Const DecCit_K_LINE_DATA_SET = 901
Global Const DecCit_K_LINE_TRUNK = 902
Global Const DecCit_K_LINE_MULTI_GP = 903
Global Const DecCit_K_LINE_ACD = 904
Global Const DecCit_K_LINE_ROUTE_POINT = 905
Global Const DecCit_K_MIN_LINE_LITERAL = 900
Global Const DecCit_K_MAX_LINE_LITERAL = 905
'
'   Agent Status item codes
'
Global Const DecCit__AGENT_MODE = 1000
Global Const DecCit__AGENT_DATA = 1001
Global Const DecCit__LOGICAL_AGENT = 1002
Global Const DecCit_K_MIN_AGENT_ITEM = 1000
Global Const DecCit_K_MAX_AGENT_ITEM = 1002
'
' Agent Status-Mode Literals
'
Global Const DecCit_K_AGENT_AFTER_CALL_WORK = 1100
Global Const DecCit_K_AGENT_LOGIN = 1101
Global Const DecCit_K_AGENT_LOGOUT = 1102
Global Const DecCit_K_AGENT_NOT_READY = 1103
Global Const DecCit_K_AGENT_READY = 1104
Global Const DecCit_K_AGENT_OTHER_WORK = 1105
Global Const DecCit_K_MIN_AGENT_LITERAL = 1100
Global Const DecCit_K_MAX_AGENT_LITERAL = 1105
'
' Line type literals
'
Global Const DecCit_K_SET_500 = 0
Global Const DecCit_K_SET_2500 = 1
Global Const DecCit_K_SET_VT100 = 2
Global Const DecCit_K_SET_TTY = 3
Global Const DecCit_K_SET_MONARCH_CON = 10
Global Const DecCit_K_SET_SS3 = 20
Global Const DecCit_K_SET_SS4 = 21
Global Const DecCit_K_SET_SS3DN = 22
Global Const DecCit_K_SET_SS4DN = 23
Global Const DecCit_K_SET_SS7 = 24
Global Const DecCit_K_SET_LCDCON = 25
Global Const DecCit_K_SET_DATASET1 = 30
Global Const DecCit_K_SET_DATASET2 = 31
Global Const DecCit_K_SET_DATASET110X = 32
Global Const DecCit_K_SET_DATASET210X = 33
Global Const DecCit_K_SET_DATASET220X = 34
Global Const DecCit_K_SET_DATASET411X = 35
Global Const DecCit_K_SET_DATASET4122 = 36
'
' iap set type literals
'
Global Const DecCit_K_IAP_SET_500 = 0
Global Const DecCit_K_IAP_SET_2500 = 1
Global Const DecCit_K_IAP_SET_SL1 = 2
Global Const DecCit_K_IAP_SET_TRUNK = 3
Global Const DecCit_K_IAP_DLI_LOOP = 28
Global Const DecCit_K_IAP_PROPRIETARY = 29
Global Const DecCit_K_IAP_DATA_SERVICE_VT = 30
Global Const DecCit_K_IAP_VOICE_MSG_VT = 31
Global Const DecCit_K_IAP_TOUCH_DIGITAL_SET = 32
Global Const DecCit_K_IAP_COMPACT_12 = 33
```

```
DECCIT.BAS - 5

Global Const DecCit_K_IAP_COMPACT_18 = 34
Global Const DecCit_K_IAP_DELTA_1 = 35
Global Const DecCit_K_IAP_DELTA_2 = 36
Global Const DecCit_K_IAP_DELTA_3 = 37
'
' HICOM set type literals
'
Global Const DecCit_K_HICOM_SET_OTHER = 0
Global Const DecCit_K_HICOM_SET_ANATE = 1
Global Const DecCit_K_HICOM_SET_DIGITE_211 = 20
Global Const DecCit_K_HICOM_SET_DIGITE_260 = 21
Global Const DecCit_K_HICOM_SET_S400 = 24
Global Const DecCit_K_HICOM_SET_S500 = 25
Global Const DecCit_K_HICOM_SET_S700 = 26
Global Const DecCit_K_HICOM_SET_T3510 = 30
Global Const DecCit_K_HICOM_SET_FUNCTIONAL = 31
'
' CSTA literals
'
Global Const DecCit_K_CSTA_SET_STATION = 0
Global Const DecCit_K_CSTA_LINE = 1
Global Const DecCit_K_CSTA_BUTTON = 2
Global Const DecCit_K_CSTA_ACD = 3
Global Const DecCit_K_CSTA_TRUNK = 4
Global Const DecCit_K_CSTA_OPERATOR = 5
Global Const DecCit_K_CSTA_STATION_GROUP = 16
Global Const DecCit_K_CSTA_LINE_GROUP = 17
Global Const DecCit_K_CSTA_BUTTON_GROUP = 18
Global Const DecCit_K_CSTA_ACD_GROUP = 19
Global Const DecCit_K_CSTA_TRUNK_GROUP = 20
Global Const DecCit_K_CSTA_OPERATOR_GROUP = 21
Global Const DecCit_K_CSTA_OTHER = 255
'
' Trunk type literals
'
Global Const DecCit_K_ANALOGUE_TIE_TRUNK = 1000
Global Const DecCit_K_DIGITAL_TIE_TRUNK = 1001
Global Const DecCit_K_ANALOGUE_COE_TRUNK = 1002
Global Const DecCit_K_DIGITAL_COE_TRUNK = 1003
Global Const DecCit_K_MIN_TRUNK_LITERAL = 1000
Global Const DecCit_K_MAX_TRUNK_LITERAL = 1003
'
' Protocol literals
'
Global Const DecCit_K_PROT_HCI = 1100
Global Const DecCit_K_PROT_IAP = 1101
Global Const DecCit_K_PROT_HICOM = 1102
Global Const DecCit_K_PROT_FOREIGN = 1103
Global Const DecCit_K_PROT_DECVOICE = 1104
Global Const DecCit_K_PROT_ASAI = 1105
Global Const DecCit_K_PROT_CSTA = 1106
Global Const DecCit_K_PROT_VER_0 = 0
Global Const DecCit_K_PROT_VER_1 = 1
Global Const DecCit_K_PROT_VER_2 = 2
Global Const DecCit_K_PROT_VER_3 = 3
Global Const DecCit_K_PROT_VER_4 = 4
Global Const DecCit_K_PROT_VER_5 = 5
Global Const DecCit_K_PROT_VER_6 = 6
Global Const DecCit_K_PROT_VER_7 = 7
Global Const DecCit_K_PROT_VER_8 = 8
Global Const DecCit_K_PROT_VER_9 = 9
```

```
DECCIT.BAS - 6

Global Const DecCit_K_MIN_PROT_LITERAL = 1100
Global Const DecCit_K_MAX_PROT_LITERAL = 1106
'
' Voice literals
'
'
' Get Message Information item codes
'
Global Const DecCit_K_GMI_SIZE_RAW = 1200
Global Const DecCit_K_GMI_SIZE_MSG = 1201
Global Const DecCit_K_GMI_LENGTH = 1202
Global Const DecCit_K_GMI_FORMAT = 1203
Global Const DecCit_K_MIN_GMI_LITERAL = 1200
Global Const DecCit_K_MAX_GMI_LITERAL = 1203
'
'   Literals for DECvoice item codes. These equate to VOX$K_MSG
'   and VOX$K_STRING_ASCIZ (msg handle and null-terminated string)
'
Global Const DecCit__MSG_HANDLE = 1
Global Const DecCit__MSG_STRING = 3
'
' Get Context Information item codes
'
Global Const DecCit_K_GCI_LENGTH = 1300
Global Const DecCit_K_GCI_POSITION = 1301
Global Const DecCit_K_GCI_STATE = 1302
Global Const DecCit_K_MIN_GCI_LITERAL = 1300
Global Const DecCit_K_MAX_GCI_LITERAL = 1302
'
' Voice item codes.
'
Global Const DecCit_K_ITEM_HEAD_SIZE = 4
Global Const DecCit_K_RELATIVE = 0
Global Const DecCit_K_ABSOLUTE = 1
Global Const DecCit_K_ACTIVE = 1
Global Const DecCit_K_PAUSED = 2
Global Const DecCit_K_MORE_DATA = 1
Global Const DecCit_K_NO_MORE_DATA = 0
Global Const DecCit_K_SIXTEENK_VOICE = 1
Global Const DecCit_K_TEXT = 2
Global Const DecCit_K_ALG_16K_ADPCM = 266
Global Const DecCit_K_ALG_24K_ADPCM = 265
Global Const DecCit_K_ALG_32K_ADPCM = 264
Global Const DecCit_K_ALG_16K_SUBBAND = 4
Global Const DecCit_K_ALG_64K_ALAW = 2
Global Const DecCit_K_ALG_64K_ULAW = 1
Global Const DecCit_K_ALG_128K_LINEAR = 7
Global Const DecCit_K_FRM_HEADER_LEN = 133
Global Const DecCit_K_FRM_SMALL_DATA_LEN = 170
Global Const DecCit_K_MAX_DATA_SIZE = 7255
Global Const DecCit_K_MAX_VOICE_BUFFSIZE = 7388
Global Const DecCit_K_MIN_DATA_SIZE = 512
Global Const DecCit_K_MAX_INDEX = 16
Global Const DecCit_K_MAX_MSG_HDLS = 32
Global Const DecCit_K_MAX_PROMPT_SIZE = 170
Global Const DecCit_K_MAX_TEXT_SIZE = 7255
Global Const DecCit_K_MIN_FREQ = 200
Global Const DecCit_K_MAX_FREQ = 2400
Global Const DecCit_K_MAX_DUR = 4000
Global Const DecCit_K_MIN_RECOG_BUFLEN = 3
Global Const DecCit_K_MAX_RECOG_BUFLEN = 32
```

A-112

```
DECCIT.BAS - 7

'
' Voice services masks.
'
Global Const DecCit_M_SM1_TEXT_DEFAULT = 1
Global Const DecCit_M_SM1_RECOG_DEFAULT = 2
Global Const DecCit_M_SM1_STORE_DEFAULT = 4
Global Const DecCit_M_SM1_AUDIO_DEFAULT = 8
Global Const DecCit_M_SM1_TONE_DEFAULT = 16
'struct SERVICES_MASKS {
'     unsigned Cit_V_SM1_TEXT_DEFAULT : 1;
'     unsigned Cit_V_SM1_RECOG_DEFAULT : 1;
'     unsigned Cit_V_SM1_STORE_DEFAULT : 1;
'     unsigned Cit_V_SM1_AUDIO_DEFAULT : 1;
'     unsigned Cit_V_SM1_TONE_DEFAULT : 1;
'   unsigned Cit_V_fill_0 : 3;
'     } ;
'
' Voice vocab constants.
'
Global Const DecCit_K_IRECOG_ALLVOCAB = 0
' DIGITS for the continuous (connected word) recognizer
Global Const DecCit_K_CRECOG_DIGIT = 1
' YES/NO for the continuous (connected word) recognizer
Global Const DecCit_K_CRECOG_YESNO = 2

'
' Call State Mode Mask - used to describe the current state, or the state to
' be monitored. It is used either in the DecCit__state_mode item in the MONITOR
' composite itemlist in Cit_SET_DEVICE_ATTRIBUTES, or returned in the
' DecCit__state item by Cit_GET_EVENT
'
Global Const DecCit_M_ACTIVE_STATE = 2
Global Const DecCit_M_DELIVER_STATE = 4
Global Const DecCit_M_FAIL_STATE = 8
Global Const DecCit_M_HOLD_STATE = 16
Global Const DecCit_M_INITIATE_STATE = 32
Global Const DecCit_M_QUEUE_STATE = 64
Global Const DecCit_M_NULL_STATE = 128
Global Const DecCit_M_RECEIVE_STATE = 256
Global Const DecCit_M_UNAVAILABLE_STATE = 512
'struct STATE_FLAGS {
'     unsigned Cit_V_NIL_STATE : 1;
'     unsigned Cit_V_ACTIVE_STATE : 1;
'     unsigned Cit_V_DELIVER_STATE : 1;
'     unsigned Cit_V_FAIL_STATE : 1;
'     unsigned Cit_V_HOLD_STATE : 1;
'     unsigned Cit_V_INITIATE_STATE : 1;
'     unsigned Cit_V_QUEUE_STATE : 1;
'     unsigned Cit_V_NULL_STATE : 1;
'     unsigned Cit_V_RECEIVE_STATE : 1;
'     unsigned Cit_V_UNAVAILABLE_STATE : 1;
'     unsigned Cit_V_FILLER_STATE1 : 10;
'     unsigned Cit_V_FILLER_STATE2 : 12;
'     } ;
'
' DecCit_M_NONE implies no states are to be monitored - so monitor is switched off
'
Global Const DecCit_M_NONE = 0
'
```

```
DECCIT.BAS - 8

' DecCit_M_ALL implies that all states are to be monitored
'
Global Const DecCit_M_ALL = -1
'
' Call Event Literals - used to describe the generic event which has just
' occurred. The appropriate value is returned in the DecCit__EVENT item by
' Cit_GET_EVENT
'
Global Const DecCit_K_MONITOR_ENABLED = 0      ' state unchanged
'
' Basic Call Processing
'
Global Const DecCit_K_OFF_HOOK = 1             ' IDLE to INITIATE state
Global Const DecCit_K_DEST_SEIZED = 2          ' INITIATE to DELIVER state
Global Const DecCit_K_OP_ANSWERED = 3          ' DELIVER to ACTIVE state
Global Const DecCit_K_TP_DISCONNECTED = 4      ' ACTIVE to IDLE state
Global Const DecCit_K_OP_DISCONNECTED = 5      ' ACTIVE to IDLE/ACTIVE state
Global Const DecCit_K_INBOUND_CALL = 6         ' IDLE to RECEIVE state
Global Const DecCit_K_TP_ANSWERED = 7          ' RECEIVE to ACTIVE state ' Failed Calls
'
Global Const DecCit_K_DEST_BUSY = 8            '
Global Const DecCit_K_DEST_INVALID = 9         ' INITIATE to FAIL state
Global Const DecCit_K_DEST_NOT_OBTAINABLE = 10 '
Global Const DecCit_K_ERROR = 11               '
Global Const DecCit_K_UNAVAILABLE = 12         ' "any" to UNAVAILABLE state '
' Multiple Party Call processing
'
Global Const DecCit_K_TP_CONFERENCED = 13            ' ACTIVE to ACTIVE state
Global Const DecCit_K_OP_CONFERENCED = 14            ' ACTIVE/HOLD to ACTIVE state
Global Const DecCit_K_TP_RETRIEVED = 15              ' IDLE to ACTIVE state
Global Const DecCit_K_OP_RETRIEVED = 16              ' IDLE to ACTIVE state
Global Const DecCit_K_TP_SUSPENDED = 17              ' ACTIVE to IDLE state
Global Const DecCit_K_OP_HELD = 18                   ' ACTIVE to   HOLD state
Global Const DecCit_K_PASSIVE_DISCONNECTED = 19      ' state unchanged
Global Const DecCit_K_SWAPPED = 20                   ' ACTIVE to ACTIVE state
'
' Diverted Calls
'
Global Const DecCit_K_DIVERTED = 21            ' DELIVER to DELIVER state
Global Const DecCit_K_DEST_CHANGED = 22        ' INITIATE to DELIVER state
Global Const DecCit_K_TRANSFERRED = 23         ' HOLD to DELIVER/ACTIVE state
Global Const DecCit_K_OTHER = 24               ' "any" state
Global Const DecCit_K_OFFHOOK_PROMPT = 25      ' IDLE TO RECEIVE state(2500 se
ts only)
Global Const DecCit_K_OUTBOUND_CALL = 1
'
' Call Event Qualifier Literals - used to describe the actual HCI specific
' event which has just occurred. The appropriate value is returned in the
' DecCit__EVENT_QUALIFIER item by Cit_GET_EVENT
'
Global Const DecCit_K_HCI_MONITOR_ON = 0
Global Const DecCit_K_HCI_OP_ANSWERED = 1
Global Const DecCit_K_HCI_TP_ANSWERED = 2
Global Const DecCit_K_HCI_BACK_IN_SERVICE = 3
Global Const DecCit_K_HCI_TP_INVOKED_CALLBACK = 4
Global Const DecCit_K_HCI_OP_HELD_CALL = 5
Global Const DecCit_K_HCI_TP_HELD_CALL = 6
```

```
DECCIT.BAS - 9

Global Const DecCit_K_HCI_OP_RETRIEVED_HELD = 7
Global Const DecCit_K_HCI_TP_RETRIEVED_HELD = 8
Global Const DecCit_K_HCI_HELD_DISCONNECTED = 9
Global Const DecCit_K_HCI_OP_PICKED_UP_CALL = 10
Global Const DecCit_K_HCI_TP_PICKED_UP_CALL = 11
Global Const DecCit_K_HCI_TP_REDIRECTED_CALL = 12
Global Const DecCit_K_HCI_OP_SPLIT_CONFERENCE = 13
Global Const DecCit_K_HCI_TP_SPLIT_CONFERENCE = 14
Global Const DecCit_K_HCI_OP_QUEUED = 15
Global Const DecCit_K_HCI_TP_QUEUED = 16
Global Const DecCit_K_HCI_QUEUED_DISCONNECTED = 17
Global Const DecCit_K_HCI_TP_RETRIEVED_QUEUED = 18
Global Const DecCit_K_HCI_TP_NO_ANSWER_CF = 19
Global Const DecCit_K_HCI_OP_CONFERENCED = 20
Global Const DecCit_K_HCI_TP_CONFERENCED = 21
Global Const DecCit_K_HCI_PBX_CONGESTED = 22
Global Const DecCit_K_HCI_OP_CONSHELD_CALL = 23
Global Const DecCit_K_HCI_TP_CONSHELD_CALL = 24
Global Const DecCit_K_HCI_OP_RETRIEVED_CONSHELD = 25
Global Const DecCit_K_HCI_TP_RETRIEVED_CONSHELD = 26
Global Const DecCit_K_HCI_CONSHELD_DISCONNECTED = 27
Global Const DecCit_K_HCI_DEST_BUSY = 28
Global Const DecCit_K_HCI_DEST_CHANGED = 29
Global Const DecCit_K_HCI_DEST_DND = 30
Global Const DecCit_K_HCI_DEST_SEIZED = 31
Global Const DecCit_K_HCI_OP_DISCONNECTED = 32
Global Const DecCit_K_HCI_TP_DISCONNECTED = 33
Global Const DecCit_K_HCI_ERROR = 34
Global Const DecCit_K_HCI_EXCEPTION = 35
Global Const DecCit_K_HCI_FEATURES_CHANGED = 36
Global Const DecCit_K_HCI_SEIZED = 37
Global Const DecCit_K_HCI_DEST_INCOMPATIBLE = 38
Global Const DecCit_K_HCI_INVALID_ACCOUNT_CODE = 39
Global Const DecCit_K_HCI_OUT_OF_SERVICE = 40
Global Const DecCit_K_HCI_LOCKED_OUT = 41
Global Const DecCit_K_HCI_MODEM_TONE = 42
Global Const DecCit_K_HCI_NETWORK_BUSY = 43
Global Const DecCit_K_HCI_NETWORK_CONGESTED = 44
Global Const DecCit_K_HCI_NETWORK_UNOBTAINABLE = 45
Global Const DecCit_K_HCI_NETWORK_RINGBACK = 46
Global Const DecCit_K_HCI_NETWORK_VOICE = 47
Global Const DecCit_K_HCI_INBOUND_CALL = 48
Global Const DecCit_K_HCI_OUTBOUND_CALL = 49
Global Const DecCit_K_HCI_DEST_NO_ANSWER = 50
Global Const DecCit_K_HCI_NO_MODEM_TONE = 51
Global Const DecCit_K_HCI_OUTPULSING_COMPLETED = 52
Global Const DecCit_K_HCI_OP_BARGED_IN = 53
Global Const DecCit_K_HCI_TP_BARGED_IN = 54
Global Const DecCit_K_HCI_PUBLIC_NETWORK = 55
Global Const DecCit_K_HCI_OP_INVOKED_PRIVACY = 56
Global Const DecCit_K_HCI_TP_INVOKED_PRIVACY = 57
Global Const DecCit_K_HCI_OP_RELEASED_PRIVACY = 58
Global Const DecCit_K_HCI_TP_RELEASED_PRIVACY = 59
Global Const DecCit_K_HCI_PRIVATE_NETWORK = 60
Global Const DecCit_K_HCI_OP_RECALLED_TP = 61
Global Const DecCit_K_HCI_REROUTED_NO_ANSWER = 62
Global Const DecCit_K_HCI_TP_SENT_MESSAGE = 63
Global Const DecCit_K_HCI_TP_SWAPPED_QUEUED = 64
Global Const DecCit_K_HCI_TP_SWAPPED_CONSHELD = 65
Global Const DecCit_K_HCI_TP_ON_HOOK = 66
Global Const DecCit_K_HCI_TIMED_ANSWER = 67
```

DECCIT.BAS - 10

```
Global Const DecCit_K_HCI_TONED_ANSWER = 68
Global Const DecCit_K_HCI_OP_TRANSFERRED_CALL = 69
Global Const DecCit_K_HCI_TP_TRANSFERRED_CALL = 70
Global Const DecCit_K_HCI_RESOURCE_WAIT = 71
Global Const DecCit_K_HCI_THREE_WAY_CALL_FORMED = 72
Global Const DecCit_K_HCI_START_MONITOR_INVOKED = 73
Global Const DecCit_K_HCI_INT_MONITOR_INVOKED = 74
Global Const DecCit_K_HCI_ACD_OVERFLOW = 75
Global Const DecCit_K_HCI_ACD_CALL_ABANDONED = 76
Global Const DecCit_K_HCI_ACD_QUEUED = 77
Global Const DecCit_K_HCI_WORK_TIMER_FIRED = 78
Global Const DecCit_K_MIN_HCI_EVENT_QUAL = 0
Global Const DecCit_K_MAX_HCI_EVENT_QUAL = 78
Global Const DecCit_K_HICOM_UNKNOWN = 0
Global Const DecCit_K_HICOM_NETWORK_REACHED = 1
Global Const DecCit_K_HICOM_RECALL = 2
'
' Literals to define the IAP event qualifiers for crs messages.
' The appropriate value is returned in the
' DecCit__EVENT_QUALIFIER item by Cit_GET_EVENT
'
Global Const DecCit_K_IAP_UNKNOWN = 0              ' UNKNOWN EVENT
Global Const DecCit_K_IAP_OP_RINGING = 1           ' CALLED PARTY RINGING
Global Const DecCit_K_IAP_OP_ANSWERED = 2          ' CALLED PARTY ANSWERED
Global Const DecCit_K_IAP_REVERT_COMPLETE = 3      ' RETURN TO ORIGINAL CALL COMPL
ETE
Global Const DecCit_K_IAP_CONFERENCE_COMPLETE = 4' CONFERENCE JOINED
Global Const DecCit_K_IAP_TRANSFER_COMPLETE = 5    ' CALL SUCCESSFULLY TRANSFERRED
Global Const DecCit_K_IAP_MULTIPLE_APPRNCE_DN = 6' DN APPEARS ON MORE THAN ONE S
ET Global Const DecCit_K_IAP_ACD_QUEUED = 7           ' CALL IS QUEUED
Global Const DecCit_K_IAP_ATTEND_QUEUED = 8        ' CALL IS QUEUED
Global Const DecCit_K_IAP_PART_DIAL = 9            ' PARTIAL DIAL OR INTERDIGIT TI
MEOUT
Global Const DecCit_K_IAP_READY_STATE = 10         ' NOT SURE WHAT THIS MEANS
Global Const DecCit_K_IAP_CON_ACK = 11             ' con MESSAGE ACK'D
Global Const DecCit_K_IAP_QUEUED = 12              ' CALL IS QUEUED
Global Const DecCit_K_IAP_ACD_RINGING = 13         ' ACD QUE FOUND AND BEING RUNG
Global Const DecCit_K_IAP_TP_DISCONNECT = 14       ' CALLING PARTY DISCONNECTED
Global Const DecCit_K_IAP_BAD_TP_TN = 15           ' INVALID CALLING TN
Global Const DecCit_K_IAP_BAD_TP_DN = 16           ' INVALID CALLING DN
Global Const DecCit_K_IAP_BAD_OP_TN = 17           ' INVALID CALLED TN
Global Const DecCit_K_IAP_BAD_OP_DN = 18           ' INVALID CALLED DN
Global Const DecCit_K_IAP_BAD_TP_MANNER = 19       ' INVALID ORIGINATING MANNER
Global Const DecCit_K_IAP_BAD_OP_MANNER = 20       ' INVALID TERMINATING MANNER
Global Const DecCit_K_IAP_BAD_TP_IS_USER = 21      ' INVALID ORIGINATING is USER
Global Const DecCit_K_IAP_BAD_CUSTOMER_NUMBER = 22' INVALID CUSTOMER NUMBER
Global Const DecCit_K_IAP_TP_BUSY = 23             ' CALLING PARTY BUSY
Global Const DecCit_K_IAP_TP_BLOCKING = 24         ' CALLING PARTY BLOCKING
Global Const DecCit_K_IAP_TP_MAINTENANCE = 25      ' CALLING PARTY SET MNTNCE BUSY
Global Const DecCit_K_IAP_TP_ONHOOK = 26           ' CALLING PARTY ON-HOOK
Global Const DecCit_K_IAP_TP_INUSE = 27            ' CALLING PARTY DN IN USE
Global Const DecCit_K_IAP_TP_RINGING = 28          ' INCOMING CALL ON CALLING PART
Y SET
Global Const DecCit_K_IAP_TP_UNABLE_TO_DISCON = 29' CAN'T DISCONNECT CALLING PAR
TY
Global Const DecCit_K_IAP_TP_UNABLE_TO_ANS = 30    ' CAN'T ANSWER CALLED PARTY
Global Const DecCit_K_IAP_TP_ACCESS_RESTRICT = 31' ACCESS RESTRICTION
Global Const DecCit_K_IAP_TP_PERM_HOLD = 32        ' CALLING PARTY ON PERMANENT HO
LD
```

DECCIT.BAS - 11

```
Global Const DecCit_K_IAP_SYSTEM_ERROR = 33        ' SYSTEM ERROR
Global Const DecCit_K_IAP_OP_BUSY = 34             ' CALLED PARTY BUSY
Global Const DecCit_K_IAP_OP_BLOCKING = 35         ' CALLED PARTY BLOCKED
Global Const DecCit_K_IAP_OP_BAD_STATE = 36        ' CALLED PARTY IN BAD STATE
Global Const DecCit_K_IAP_UNABLE_COMP_CONF = 37    ' UNABLE TO COMPLETE CONFERENCE Global Const DecCit_K_IAP_UNABLE_INIT_TRANS = 38   ' UNABLE TO INITIATE TRANSFER
Global Const DecCit_K_IAP_UNABLE_COMP_TRANS = 39   ' UNABLE TO COMPLETE TRANSFER
Global Const DecCit_K_IAP_NO_TRANSFER_KEY = 40     ' SET NOT EQUIP'D WITH XFER KEY
Global Const DecCit_K_IAP_OP_TRANSFERRED_CALL = 41 ' CALLED PARTY TRANSFERRED THE
Global Const DecCit_K_IAP_OP_CONFERENCED = 42      ' CALLING PARTY COFERENCED
Global Const DecCit_K_IAP_REVERT_FAILED = 43       ' UNSUCCESSFUL REVERT TO ORIG C
ALL
Global Const DecCit_K_IAP_PCI_INCOMING_CALL = 44   ' INCOMING CALL NOTIFICATION
Global Const DecCit_K_IAP_TP_ANSWERED = 45         ' CALLED PARTY ANSWERED
Global Const DecCit_K_IAP_DISCONNECTED = 46        ' GENERIC DISCONNECT
Global Const DecCit_K_IAP_MONITOR_ENABLED = 47     ' MONITOR ON
Global Const DecCit_K_IAP_USM_OFF_HOOK = 48
Global Const DecCit_K_MIN_IAP_EVENT_QUAL = 0
Global Const DecCit_K_MAX_IAP_EVENT_QUAL = 48

Global Const DecCit_K_ASAI_unassigned_number = 1
Global Const DecCit_K_ASAI_normal_clearing = 16
Global Const DecCit_K_ASAI_user_busy = 17
Global Const DecCit_K_ASAI_no_user_responding = 18
Global Const DecCit_K_ASAI_call_rejected = 21
Global Const DecCit_K_ASAI_number_changed = 22
Global Const DecCit_K_ASAI_invalid_number = 28
Global Const DecCit_K_ASAI_norm_unspecified = 31
Global Const DecCit_K_ASAI_no_circuit = 34
Global Const DecCit_K_ASAI_temorary_failure = 41
Global Const DecCit_K_ASAI_switch_congestion = 42
Global Const DecCit_K_ASAI_facility_not_subs = 50
Global Const DecCit_K_ASAI_bearer_not_available = 58
Global Const DecCit_K_ASAI_invalid_crv = 81
Global Const DecCit_K_ASAI_incompatible_dest = 88
Global Const DecCit_K_ASAI_backward_compat = 111
Global Const DecCit_K_ASAI_mandatory_ie_missing = 96
Global Const DecCit_K_ASAI_not_implemented = 97
Global Const DecCit_K_ASAI_not_comp_with_state = 98
Global Const DecCit_K_ASAI_ie_nonexistent = 99
Global Const DecCit_K_ASAI_invalid_ie_contents = 100
Global Const DecCit_K_ASAI_recovery_on_timeout = 102
Global Const DecCit_K_ASAI_protocol_error = 111
Global Const DecCit_K_ASAI_unspecified = 127
Global Const DecCit_K_ASAI_agent_not_in_split = 139
Global Const DecCit_K_ASAI_agent_state_incon = 140
Global Const DecCit_K_ASAI_agent_in_other_spilt = 141
Global Const DecCit_K_ASAI_too_many_login_digs = 142
Global Const DecCit_K_ASAI_agent_not_logged_in = 143
Global Const DecCit_K_ASAI_in_same_state = 144
Global Const DecCit_K_ASAI_no_answer = 147
Global Const DecCit_K_ASAI_trunks_not_available = 148
Global Const DecCit_K_ASAI_classifiers_unavail = 149
Global Const DecCit_K_ASAI_queues_full = 150
Global Const DecCit_K_ASAI_out_of_service = 155
Global Const DecCit_K_ASAI_redirected = 158
Global Const DecCit_K_ASAI_network_out_of_order = 166
Global Const DecCit_K_ASAI_resources_not_avail = 168
Global Const DecCit_K_ASAI_hunt_group_incorrect = 169
Global Const DecCit_K_ASAI_denial = 170
```

A-117

```
DECCIT.BAS - 12

Global Const DecCit_K_ASAI_perm_denied = 171
Global Const DecCit_K_ASAI_admin_in_prog = 174
Global Const DecCit_K_ASAI_feat_req_rej = 181
Global Const DecCit_K_ASAI_option_not_available = 191
Global Const DecCit_K_ASAI_option_not_imp = 207
Global Const DecCit_K_ASAI_incompatible_options = 208
Global Const DecCit_K_ASAI_call_terminated = 214
Global Const DecCit_K_ASAI_internal_switch_aud = 215
Global Const DecCit_K_EQ_ACTIVE_MONITOR = 1
Global Const DecCit_K_EQ_ALTERNATE = 2
Global Const DecCit_K_EQ_BUSY = 3
Global Const DecCit_K_EQ_CALL_BACK = 4
Global Const DecCit_K_EQ_CALL_CANCELLED = 5
Global Const DecCit_K_EQ_CALL_FORWARD_ALWAYS = 6
Global Const DecCit_K_EQ_CALL_FORWARD_BUSY = 7
Global Const DecCit_K_EQ_CALL_FORWARD_NO_ANSWER = 8
Global Const DecCit_K_EQ_CALL_FORWARD = 9
Global Const DecCit_K_EQ_CALL_NOT_ANSWERED = 10
Global Const DecCit_K_EQ_CALL_PICKUP = 11
Global Const DecCit_K_EQ_CAMPON = 12
Global Const DecCit_K_EQ_DEST_NOT_OBTAINABLE = 13
Global Const DecCit_K_EQ_DIVERTED = 14
Global Const DecCit_K_EQ_DND = 15
Global Const DecCit_K_EQ_HARD_HOLD = 16
Global Const DecCit_K_EQ_HOLD_RECALL = 17
Global Const DecCit_K_EQ_INCOMPATIBLE_DEST = 18
Global Const DecCit_K_EQ_INVALID_ACCOUNT_CODE = 19
Global Const DecCit_K_EQ_KEY_CONFERENCE = 20
Global Const DecCit_K_EQ_KEY_HOLD = 21
Global Const DecCit_K_EQ_LOCKOUT = 22
Global Const DecCit_K_EQ_MAINTENANCE = 23
Global Const DecCit_K_EQ_NETWORK_CONGESTION = 24
Global Const DecCit_K_EQ_NETWORK_NOT_OBTAINABLE = 25
Global Const DecCit_K_EQ_NEW_CALL = 26
Global Const DecCit_K_EQ_NO_AVAILABLE_AGENTS = 27
Global Const DecCit_K_EQ_NORMAL = 28
Global Const DecCit_K_EQ_OVERRIDE = 29
Global Const DecCit_K_EQ_PARK = 30
Global Const DecCit_K_EQ_PARK_RECALL = 31
Global Const DecCit_K_EQ_OVERFLOW = 32
Global Const DecCit_K_EQ_RECALL = 33
Global Const DecCit_K_EQ_REDIRECTED = 34
Global Const DecCit_K_EQ_REORDER_TONE = 35
Global Const DecCit_K_EQ_RESOURCES_NOT_AVAIL = 36
Global Const DecCit_K_EQ_SILENT_MONITOR = 37
Global Const DecCit_K_EQ_SOFT_HOLD = 38
Global Const DecCit_K_EQ_TRANSFER = 39
Global Const DecCit_K_EQ_TRANSFER_RECALL = 40
Global Const DecCit_K_EQ_TRUNKS_BUSY = 41
Global Const DecCit_K_EQ_VOICE_UNIT_INITIATOR = 42
Global Const DecCit_K_MIN_EVENT_QUAL = 1
Global Const DecCit_K_MAX_EVENT_QUAL = 42

' Call Type Literals - used to describe the spcific HCI type of the call in
' progess. The Call Type is useful in that it helps to clarify the result of
' the Call Event and State. The appropriate value is returned in the
' DecCit__TYPE item by Cit_GET_EVENT.

Global Const DecCit_K_HCI_NULL = 0
Global Const DecCit_K_HCI_NO_ATTENDANT = 1
Global Const DecCit_K_HCI_BROKER = 2
```

DECCIT.BAS - 13

```
Global Const DecCit_K_HCI_BUSY_RECALL = 3
Global Const DecCit_K_HCI_CALLBACK = 4
Global Const DecCit_K_HCI_CALLBACK_CALL = 5
Global Const DecCit_K_HCI_HELD_RECALL = 6
Global Const DecCit_K_HCI_QUEUED_RECALL = 7
Global Const DecCit_K_HCI_ALWAYS_CF = 8
Global Const DecCit_K_HCI_BUSY_CF = 9
Global Const DecCit_K_HCI_NO_ANSWER_CF = 10
Global Const DecCit_K_HCI_CONSHELD_RECALL = 11
Global Const DecCit_K_HCI_CONFERENCE = 12
Global Const DecCit_K_HCI_DEST_UNOBTAINABLE = 13
Global Const DecCit_K_HCI_DEST_UNAVAILABLE = 14
Global Const DecCit_K_HCI_HOLDER_LOCKED_OUT = 15
Global Const DecCit_K_HCI_RIGHTS_VIOLATION = 16
Global Const DecCit_K_HCI_MODEM = 17
Global Const DecCit_K_HCI_NO_ANSWER_RECALL = 18
Global Const DecCit_K_HCI_PICK_UP = 19
Global Const DecCit_K_HCI_PRIVILEGE_VIOLATION = 20
Global Const DecCit_K_HCI_REDIRECT = 21
Global Const DecCit_K_HCI_REROUTE = 22
Global Const DecCit_K_HCI_TRANSFER = 23
Global Const DecCit_K_HCI_TWO_PARTY = 24
'
'   FUSUPDEF bit mask - used to describe the appliction interface calls
'   supported - returned on the Assign RPC,  and returned to the user in a
'   Get Channel Info.
'
Global Const DecCit_K_HCI_THREE_WAY_CALL = 25
Global Const DecCit_K_HCI_ALARM_CALL = 26
Global Const DecCit_K_HCI_EMERGENCY_CALL = 27
Global Const DecCit_K_HCI_ACD_CALL = 28
Global Const DecCit_K_IAP_DIRECT = 1
Global Const DecCit_K_IAP_CALL_FORWARD = 2
Global Const DecCit_K_IAP_CALL_FORWARD_BUSY = 3
Global Const DecCit_K_IAP_CALL_FORWARD_NOANSWER = 4
Global Const DecCit_K_ASAI_NULL = 1000
Global Const DecCit_K_ASAI_SECONDARY = 1001
Global Const DecCit_K_ASAI_QUEUED = 1002
Global Const DecCit_K_CONFCONTROLLER = 1
Global Const DecCit_K_RELEASINGDEVICE = 2
Global Const DecCit_K_ALERTINGDEVICE = 3
Global Const DecCit_K_CALLINGDEVICE = 4
Global Const DecCit_K_CALLEDNUMBER = 5
Global Const DecCit_K_LASTREDIRECTION = 6
Global Const DecCit_K_NEWDESTINATION = 7
Global Const DecCit_K_ANSWERINGDEVICE = 8
Global Const DecCit_K_HOLDINGDEVICE = 9
Global Const DecCit_K_QUEUENUMBER = 10
Global Const DecCit_K_RETRIEVINGDEVICE = 11
Global Const DecCit_K_TRANSFERRINGDEVICE = 12
Global Const DecCit_M_ANSWER_CALL = 2
Global Const DecCit_M_ASSIGN = 4
Global Const DecCit_M_CANCEL_CALL = 8
Global Const DecCit_M_CONFERENCE_JOIN = 16
Global Const DecCit_M_DEASSIGN = 32
Global Const DecCit_M_DEFLECT_CALL = 64
Global Const DecCit_M_GET_CHANNEL_INFORMATION = 128
Global Const DecCit_M_GET_EVENT = 256
Global Const DecCit_M_HANGUP_CALL = 512
Global Const DecCit_M_INITIATE_CONFERENCE_CALL = 1024
Global Const DecCit_M_INITIATE_TRANSFER_CALL = 2048
```

DECCIT.BAS - 14

```
Global Const DecCit_M_MAKE_CALL = 4096
Global Const DecCit_M_PICKUP_CALL = 8192
Global Const DecCit_M_RESPOND_TO_INACTIVE_CALL = 16384
Global Const DecCit_M_RESUME_CALL = 32768
Global Const DecCit_M_RETRIEVE_HELD = 65536
Global Const DecCit_M_SET_DEVICE_ATTRIBUTES = 131072
Global Const DecCit_M_SUSPEND_CALL = 262144
Global Const DecCit_M_SWAP_WITH_HELD = 524288
Global Const DecCit_M_TRANSFER_CALL = 1048576
Global Const DecCit_M_VOX_AUDIO = 2097152
Global Const DecCit_M_VOX_US_TTS = 4194304
Global Const DecCit_M_VOX_STORE = 8388608
Global Const DecCit_M_VOX_WRECOG = 16777216
Global Const DecCit_M_GET_DEVICE_ATTRIBUTES = 33554432
Global Const DecCit_M_VOX_RECOGNIZE = 67108864
Global Const DecCit_M_GET_ROUTE_QUERY = 134217728
Global Const DecCit_M_RESPOND_TO_ROUTE_QUERY = 268435456
Global Const DecCit_M_MAKE_PREDICTIVE_CALL = 536870912
Global Const DecCit_M_RECONNECT_HELD = 1073741824
'struct FUSUPDEF {
'    unsigned Cit_V_NIL : 1;
'    unsigned Cit_V_ANSWER_CALL : 1;
'    unsigned Cit_V_ASSIGN : 1;
'    unsigned Cit_V_CANCEL_CALL : 1;
'    unsigned Cit_V_CONFERENCE_JOIN : 1;
'    unsigned Cit_V_DEASSIGN : 1;
'    unsigned Cit_V_DEFLECT_CALL : 1;
'    unsigned Cit_V_GET_CHANNEL_INFORMATION : 1;
'    unsigned Cit_V_GET_EVENT : 1;
'    unsigned Cit_V_HANGUP_CALL : 1;
'    unsigned Cit_V_INITIATE_CONFERENCE_CALL : 1;
'    unsigned Cit_V_INITIATE_TRANSFER_CALL : 1;
'    unsigned Cit_V_MAKE_CALL : 1;
'    unsigned Cit_V_PICKUP_CALL : 1;
'    unsigned Cit_V_RESPOND_TO_INACTIVE_CALL : 1;
'    unsigned Cit_V_RESUME_CALL : 1;
'    unsigned Cit_V_RETRIEVE_HELD : 1;
'    unsigned Cit_V_SET_DEVICE_ATTRIBUTES : 1;
'    unsigned Cit_V_SUSPEND_CALL : 1;
'    unsigned Cit_V_SWAP_WITH_HELD : 1;
'    unsigned Cit_V_TRANSFER_CALL : 1;
'    unsigned Cit_V_VOX_AUDIO : 1;
'    unsigned Cit_V_VOX_US_TTS : 1;
'    unsigned Cit_V_VOX_STORE : 1;
'    unsigned Cit_V_VOX_WRECOG : 1;
'    unsigned Cit_V_GET_DEVICE_ATTRIBUTES : 1;
'    unsigned Cit_V_VOX_RECOGNIZE : 1;
'    unsigned Cit_V_GET_ROUTE_QUERY : 1;
'    unsigned Cit_V_RESPOND_TO_ROUTE_QUERY : 1;
'    unsigned Cit_V_MAKE_PREDICTIVE_CALL : 1;
'    unsigned Cit_V_RECONNECT_HELD : 1;
'    unsigned Cit_V_FILLER : 2;
'    } ;
'struct GCSCDEF {
'    unsigned Cit_V_NIL : 8;
'    unsigned Cit_V_GET_CHANNEL_STATE_CHANGE : 1;
'    unsigned Cit_V_FILLER1 : 10;
'    unsigned Cit_V_FILLER2 : 13;
'    } ;
```

A-120

```
DECCIT.BAS - 15

'* ASB -- used in async calls (GetEvent, GetRoute)

'struct lpvASB {
'        DWORD dwStatus;
'        LPVOID lpvUserPointer;
'        };

Global Const DecCit__INVPBX = 186876386
Global Const DecCit__SDAOPTNOTSUP = 186876578
'
' rpc codes returned by Cit_GET_NEXT_RESULT()
'
Global Const DecCit_K_ASSIGN = 1
Global Const DecCit_K_DEASSIGN = 2
Global Const DecCit_K_GET_CHANNEL_INFORMATION = 3
Global Const DecCit_K_GET_EVENT = 4
Global Const DecCit_K_SET_DEVICE_ATTRIBUTES = 5
Global Const DecCit_K_MAKE_CALL = 6
Global Const DecCit_K_ANSWER_CALL = 7
Global Const DecCit_K_HANGUP_CALL = 8
Global Const DecCit_K_TRANSFER_CALL = 9
Global Const DecCit_K_SUSPEND_CALL = 10
Global Const DecCit_K_SWAP_WITH_HELD = 11
Global Const DecCit_K_RESUME_CALL = 12
Global Const DecCit_K_CONFERENCE_JOIN = 13
Global Const DecCit_K_PICKUP_CALL = 14
Global Const DecCit_K_CANCEL_CALL = 15
Global Const DecCit_K_RESPOND_TO_INACTIVE_CALL = 16
Global Const DecCit_K_INITIATE_TRANSFER_CALL = 17
Global Const DecCit_K_INITIATE_CONFERENCE_CALL = 18
Global Const DecCit_K_RETRIEVE_HELD = 19
Global Const DecCit_K_GO_OFFHOOK = 20
Global Const DecCit_K_DEFLECT_CALL = 21
Global Const DecCit_K_GET_DEVICE_ATTRIBUTES = 22
Global Const DecCit_K_GET_ROUTE_QUERY = 23
Global Const DecCit_K_RESPOND_TO_ROUTE_QUERY = 24
Global Const DecCit_K_MAKE_PREDICTIVE_CALL = 25
Global Const DecCit_K_RECONNECT_HELD = 26
Global Const DecCit_K_HCI_EXTENSIONS = 27

Global Const DecCit_K_RECORD = 128
Global Const DecCit_K_RECORD_PAUSE = 129
Global Const DecCit_K_RECORD_RESUME = 130
Global Const DecCit_K_RECORD_END = 131
Global Const DecCit_K_PLAY = 132
Global Const DecCit_K_PLAY_PAUSE = 133
Global Const DecCit_K_PLAY_RESUME = 134
Global Const DecCit_K_PLAY_END = 135
Global Const DecCit_K_SPEAK_STRING = 136
Global Const DecCit_K_CREATE_TEXT_MSG = 137
Global Const DecCit_K_GET_DTMF = 138

Global Const DecCit_K_POSITION_MESSAGE = 140
Global Const DecCit_K_FREE_MESSAGE = 141
Global Const DecCit_K_LOAD_DATA = 142
Global Const DecCit_K_UNLOAD_DATA = 143
Global Const DecCit_K_MAKE_TONE = 144
Global Const DecCit_K_GET_MSG_INFO = 145
Global Const DecCit_K_CREATE_CONTEXT = 146
Global Const DecCit_K_GET_CONTEXT_INFO = 147
Global Const DecCit_K_FREE_CONTEXT = 148
```

```
DECCIT.BAS - 16

Global Const DecCit_K_MAP_MESSAGE = 149
Global Const DecCit_K_RECOGNIZE = 150
Global Const DecCit_K_MAKE_DTMF = 151
Global Const DecCit_K_LOAD_STD_TEMPLATES = 152
Global Const DecCit_K_CONVERT = 153
Global Const DecCit_K_CREATE_PCM_MESSAGE = 154

Global Const DecCit_K_EXCEPTION = 256

'
' Error Message Codes.
Global Const Cit_FACILITY = 2851
Global Const DecCit__CONNECFAIL = 186875908
Global Const DecCit__NOLICENSE = 186875916
Global Const DecCit__FATALDVERR = 186875924
Global Const DecCit__DVRTLERR = 186875932
Global Const DecCit__INVRTLVERS = 186875940
Global Const DecCit__NETLOST = 186875948
Global Const DecCit__INTERNERR = 186875956
Global Const DecCit__NOTSTARTED = 186875964
Global Const DecCit__NEEDPRIV = 186875972
Global Const DecCit__NORES = 186875980
Global Const DecCit__NILERRCODE = 186876066
Global Const DecCit__DEVNOTSEIZED = 186876074
Global Const DecCit__DUPAPPLICNAM = 186876082
Global Const DecCit__DUPACCESSCODE = 186876090
Global Const DecCit__INVFEATURE = 186876098
Global Const DecCit__ILLPOSITION = 186876106
Global Const DecCit__UNSUPTARGET = 186876114
Global Const DecCit__INVAPPLICNO = 186876122
Global Const DecCit__INVDISPLAY = 186876130
Global Const DecCit__INVKEYCODE = 186876138
Global Const DecCit__INVTRANSTYPE = 186876146
Global Const DecCit__INVTRANSVAL = 186876154
Global Const DecCit__UNABLMONDEV = 186876162
Global Const DecCit__UNABCOMPRETRY = 186876170
Global Const DecCit__UNABCOMPREQ = 186876178
Global Const DecCit__COSVIO = 186876186
Global Const DecCit__INVSERVERADDR = 186876194
Global Const DecCit__INVCALLREF = 186876202
Global Const DecCit__INVDEVOPT = 186876210
Global Const DecCit__UNSUPREQ = 186876218
Global Const DecCit__INVPARAM = 186876226
Global Const DecCit__UNKNWNRESTRANS = 186876234
Global Const DecCit__NULLINTERSECT = 186876242
Global Const DecCit__SHUT = 186876250
Global Const DecCit__MONALREADYON = 186876258
Global Const DecCit__XMITPROBLEM = 186876266
Global Const DecCit__NOTMON = 186876274
Global Const DecCit__MONMAXEXD = 186876282
Global Const DecCit__MAXTOOHIGH = 186876290
Global Const DecCit__CUSTTOOHIGH = 186876298
Global Const DecCit__RCVREQREJ = 186876306
Global Const DecCit__INSMEM = 186876314
Global Const DecCit__MONOFFNOTSENT = 186876322
Global Const DecCit__MONONNOTSENT = 186876330
Global Const DecCit__CFNOTSENT = 186876338
Global Const DecCit__BUSYNOTSENT = 186876346
Global Const DecCit__MSGWAITNOTSENT = 186876354
Global Const DecCit__AUTOANSNOTSENT = 186876362
Global Const DecCit__ABORT = 186876370
```

```
DECCIT.BAS - 17
Global Const DecCit__BADPARAM = 186876378
Global Const DecCit__INVLOGID = 186876386
Global Const DecCit__INVDEVNAM = 186876394
Global Const DecCit__INVCHAN = 186876402
Global Const DecCit__INVFTYPE = 186876410
Global Const DecCit__NETTERM = 186876418
Global Const DecCit__INSUFFPARAM = 186876426
Global Const DecCit__UNIMPLEMENTED = 186876434
Global Const DecCit__INCPROTOCOL = 186876442
Global Const DecCit__UNSUPMGMTCMD = 186876450
Global Const DecCit__UNSUPPROC = 186876458
Global Const DecCit__UNRECLINK = 186876466
Global Const DecCit__BADDESCRIP = 186876474
Global Const DecCit__TIMEOUT = 186876482
Global Const DecCit__STOPPED = 186876490
Global Const DecCit__RESPARSEERR = 186876498
Global Const DecCit__INQUEEXD = 186876506
Global Const DecCit__INVDEVICE = 186876514
Global Const DecCit__LINKINUSE = 186876522
Global Const DecCit__LINKNOTOFF = 186876530
Global Const DecCit__ASTINPROG = 186876538
Global Const DecCit__NOPROTINFO = 186876546
Global Const DecCit__WRONGPROT = 186876554
Global Const DecCit__NOTLOOPSTATE = 186876562
Global Const DecCit__PBXCONGESTED = 186876570
Global Const DecCit__OPTNOTSUP = 186876578
Global Const DecCit__DEVASSIGNED = 186876586
Global Const DecCit__DEVNOTASSIGN = 186876594
Global Const DecCit__UNABLSETDEV = 186876602
Global Const DecCit__NONETCHAN = 186876610
Global Const DecCit__NOLOGID = 186876618
Global Const DecCit__LOGIDTOOLONG = 186876626
Global Const DecCit__GRPNOTASS = 186876634
Global Const DecCit__NETWRITEERR = 186876642
Global Const DecCit__INSEF = 186876650
Global Const DecCit__OUTTOOHIGH = 186876658
Global Const DecCit__FORNOINIT = 186876666
Global Const DecCit__AGENTMSGNOTSENT = 186876674
Global Const DecCit__NOROUTEREQ = 186876682
Global Const DecCit__BADMSGRCV = 186876690
Global Const DecCit__CSTABADERR = 186876698
Global Const DecCit__UNSPECIFIED = 186876706
Global Const DecCit__OPGENERIC = 186876714
Global Const DecCit__REQINCOMWITHOBJ = 186876722
Global Const DecCit__VALUEOUTOFRANGE = 186876730
Global Const DecCit__OBJECTNOTKNOWN = 186876738
Global Const DecCit__INVCALLINGDEVICE = 186876746
Global Const DecCit__INVCALLEDDEVICE = 186876754
Global Const DecCit__PRIVVIOLCALLEDDEV = 186876762
Global Const DecCit__PRIVVIOLCALLINGDEV = 186876770
Global Const DecCit__INVCONNTYPE = 186876778
Global Const DecCit__CONNTYPEMISMATCH = 186876786
Global Const DecCit__INVCALLIDENTIFIER = 186876794
Global Const DecCit__INVDEVIDENTIFIER = 186876802
Global Const DecCit__INVCONNDENTIFIER = 186876810
Global Const DecCit__INVDESTINATION = 186876818
Global Const DecCit__INVALIDFEATURE = 186876826
Global Const DecCit__INVALLOCSTATE = 186876834
Global Const DecCit__INVCROSSREFID = 186876842
Global Const DecCit__INVOBJECTTYPE = 186876850
Global Const DecCit__SECURITYVIOL = 186876858
```

A-123

DECCIT.BAS - 18

```
Global Const DecCit__STGENERIC = 186876866
Global Const DecCit__BADOBJSTATE = 186876874
Global Const DecCit__INVCONNIDACTCALL = 186876882
Global Const DecCit__NOACTIVECALL = 186876890
Global Const DecCit__NOHELDCALL = 186876898
Global Const DecCit__NOCALLTOCLEAR = 186876906
Global Const DecCit__NOCONNTOCLEAR = 186876914
Global Const DecCit__NOCALLTOANSWER = 186876922
Global Const DecCit__NOCALLTOCOMPLETE = 186876930
Global Const DecCit__SYSGENERIC = 186876938
Global Const DecCit__SERVICEBUSY = 186876946
Global Const DecCit__RESOURCEBUSY = 186876954
Global Const DecCit__RESOUTOFSERV = 186876962
Global Const DecCit__NETBUSY = 186876970
Global Const DecCit__NETOUTOFSERV = 186876978
Global Const DecCit__OVERALLMONLIMEX = 186876986
Global Const DecCit__CONFMEMBERLIMEX = 186876994
Global Const DecCit__SUBSGENERIC = 186877002
Global Const DecCit__OBJMONLIMEX = 186877010
Global Const DecCit__EXTRUNKLIMEEXC = 186877018
Global Const DecCit__OUTSTANDREQLIMEX = 186877026
Global Const DecCit__PERFGENERIC = 186877034
Global Const DecCit__PERFLIMEX = 186877042
Global Const DecCit__INVCONTEXT = 186877106
Global Const DecCit__RECNOTACT = 186877114
Global Const DecCit__PLAYNOTACT = 186877122
Global Const DecCit__INVMSGHDL = 186877130
Global Const DecCit__INVALG = 186877138
Global Const DecCit__INVFORMAT = 186877146
Global Const DecCit__INVPOS = 186877154
Global Const DecCit__INVTEXT = 186877162
Global Const DecCit__INVDATA = 186877170
Global Const DecCit__BADTLI = 186877178
Global Const DecCit__ERRLOAMIC = 186877186
Global Const DecCit__INSMODMEM = 186877194
Global Const DecCit__MODHARDFA = 186877202
Global Const DecCit__UNDERFLOW = 186877210
Global Const DecCit__OVERFLOW = 186877218
Global Const DecCit__MSGNOTFOU = 186877226
Global Const DecCit__INVSERMAS = 186877234
Global Const DecCit__INSTEMPLTMEM = 186877242
Global Const DecCit__INVVOCID = 186877250
Global Const DecCit__INVGROUP = 186877258
Global Const DecCit__INVUTTER = 186877266
Global Const DecCit__SUBNOTLOA = 186877274
Global Const DecCit__LINKRESET = 186877506
Global Const DecCit__LINKDOWN = 186877514
Global Const DecCit__VOICERESET = 186877522
Global Const DecCit__LINKREJ = 186877530
Global Const DecCit__ONALREADY = 186877906
Global Const DecCit__NOTON = 186877914
Global Const DecCit__QLENGTH = 186877922
Global Const DecCit__INVFILE = 186877930
Global Const DecCit__NONAME = 186877938
Global Const DecCit__NOCUSTOMER = 186877946
Global Const DecCit__NOMAX = 186877954
Global Const DecCit__NOITERATIONS = 186877962
Global Const DecCit__NODEV = 186877970
Global Const DecCit__NOLOG = 186877978
Global Const DecCit__NOPROTOCOL = 186877986
Global Const DecCit__NOLINK = 186877994
```

```
DECCIT.BAS - 10

Global Const DecCit__NOSTATE = 186878002
Global Const DecCit__NOLEN = 186878010
Global Const DecCit__MISSVAL = 186878018
Global Const DecCit__STRTOOLONG = 186878026
Global Const DecCit__IVPFAIL = 186878034
Global Const DecCit__PLAYINPRO = 186878304
Global Const DecCit__RECINPROG = 186878312
Global Const DecCit__DIALINPRO = 186878320
Global Const DecCit__ONHOOK = 186878328
Global Const DecCit__NODIALTONE = 186878336
Global Const DecCit__RCGNTNINPROG = 186878344
Global Const DecCit__DATALOST = 186878707
Global Const DecCit__MONONPBXERR = 186878715
Global Const DecCit__MONOFFPBXERR = 186878723
Global Const DecCit__MONCLEARED = 186878731
Global Const DecCit__CSTAINIT = 186878739
Global Const DecCit__CSTAOVERIMM = 186878747
Global Const DecCit__CSTAOVERRCH = 186878755
Global Const DecCit__CSTAOVERREL = 186878763

Global Const DecCit__ENDOFMSG = 186878771

Global Const DecCit__SUCCESS = 186879105
Global Const DecCit__TRUNCATED = 186879113
Global Const DecCit__FOREIGN = 186879121
Global Const DecCit__TRACEHEADER = 186879129
Global Const DecCit__TRACEMESSAGE = 186879137
Global Const DecCit__TRACETRAILER = 186879145
Global Const DecCit__TRACEDATE = 186879153
Global Const DecCit__BLANK = 186879161
Global Const DecCit__END = 186879169

'Cit get event List Structure
Type tDecCitDeviceAttributeList
    Length As Integer
    Code As Integer     ' Call reference id
    '
    StateLength As Integer
    StateCode As Integer    ' Call state
    State As Long
    '
    Zeroword As Long
End Type
Global DecCitDeviceAttributeList As tDecCitDeviceAttributeList
'
Type DecCitEventList
    RefLength As Integer
    RefCode As Integer     ' Call reference id
    RefID As Long
    '
    StateLength As Integer
    StateCode As Integer    ' Call state
    State As Long
    '
    EventLength As Integer
    EventCode As Integer    ' Call event
    Event As Long
    '
    OtherPartyLength As Integer
    OtherPartyCode As Integer
    OtherPartyHolder As String * 36
```

```
DECCIT.BAS - 20

ThirdPartyLength As Integer
    ThirdPartyCode As Integer
    ThirdPartyHolder As String * 32

DialedNumberLength As Integer
    DialedNumberCode As Integer
    DialedNumberHolder As String * 32

Zeroword As Long

End Type
Global DecCitEventList As DecCitEventList

Type DecCitOtherParty
    OtherPartyLength As Integer
    OtherPartyCode As Integer
    OtherPartyHolder As String * 44
End Type Type DecCitLineID
    LineIDLength As Integer
    LineIDCode As Integer
    LineIDByteCnt As String * 1
    LineID As String * 19
End Type Type DecCitTrunk
    TrunkLength As Integer
    TrunkCode As Integer
    Trunk As Long
    Group As Long
End Type 'Northern Telecom doesn't handle party qualifier
Type DecCitParty
    PartyQualifierLength As Integer
    PartyQualifierCode As Integer
    PartyQualifier As Long
End Type ' ASB -- used in async calls (GetEvent, GetRoute)
Type DecCitASB
        Status As Long
        UserPointer As Long
End Type
Global DecCitASB As DecCitASB Type Devlist
    a_device As DecCitAssignItem
    term As Long
End Type
Global Devlist As Devlist 'Digital CIT DLL's as defined in VB from examples
'unsigned long __pascal __far CitAssign(unsigned int __far *lphChan,void __far *
lpvItemList,unsigned short cbPbxnLen,char __far *lpPbxName,unsigned short cbNode
Len,char __far *lpNode,unsigned int hAppWin);
Declare Function DecCitAssign Lib "Cit.DLL" Alias "CitAssign" (lphChan As Intege
r, lpvItemList As Any, ByVal cbPbxnLen As Integer, ByVal lpPbxName As String, By
```

DECCIT.BAS - 21

```
Val cbNodeLen As Integer, ByVal lpNode As String, ByVal hWnd As Integer) As Long 'unsigned long __pascal __far CitDeassign(unsigned int hC);
Declare Function DecCitDeassign Lib "Cit.DLL" Alias "CitDeassign" (ByVal lphChan
 As Integer) As Long 'unsigned long __pascal __far CitCancelCall(unsigned int hC,unsigned long dwCall
Id);
Declare Function DecCitCancelCall Lib "Cit.DLL" Alias "CitCancelCall" (ByVal lph
Chan As Integer, ByVal dwCallId As Long) As Long 'unsigned long __pascal __far CitInitiateConferenceCall(unsigned int hC,void __f
ar *lpvItmList);
Declare Function DecCitInitiateConferenceCall Lib "Cit.DLL" Alias "CitInitiateCo
nferenceCall" (ByVal lphChan As Integer, lpvItemList As Any) As Long 'unsigned long __pascal __far CitConferenceJoin(unsigned int hC,unsigned long dw
CallId,unsigned long dwActiveCallId);
Declare Function DecCitConferenceJoin Lib "Cit.DLL" Alias "CitConferenceJoin" (B
yVal lphChan As Integer, ByVal dwHeldCallId As Long, ByVal dwActiveCallId As Lon
g) As Long 'unsigned long __pascal __far CitSetDeviceAttributes(unsigned int hC,void __far
*lpvItemList);
Declare Function DecCitSetDeviceAttributes Lib "Cit.DLL" Alias "CitSetDeviceAttr
ibutes" (ByVal lphChan As Integer, lpvItemList As Any) As Long 'unsigned long __pascal __far CitGetEvent(unsigned int hC,void __far *lpvItemLis
t,unsigned inthWnd,void __far *lpvAsb);
Declare Function DecCitGetEvent Lib "Cit.DLL" Alias "CitGetEvent" (ByVal lphChan
 As Integer, lpvItemList As Any, ByVal hWnd As Integer, lpvASB As Any) As Long 'unsigned long __pascal __far CitMakeCall(unsigned int hC,void __far *lpvItmList
);
Declare Function DecCitMakeCall Lib "Cit.DLL" Alias "CitMakeCall" (ByVal lphChan
 As Integer, lpvItemList As Any) As Long 'unsigned long __pascal __far CitHangupCall(unsigned int hC,unsigned long dwCall
Id);
Declare Function DecCitHangupCall Lib "Cit.DLL" Alias "CitHangupCall" (ByVal lph
Chan As Integer, ByVal dwCallId As Long) As Long 'unsigned long __pascal __far CitInitiateTransferCall(unsigned int hC,void __far
 *lpvItmList);
Declare Function DecCitInitiateTransferCall Lib "Cit.DLL" Alias "CitTransferConf
erenceCall" (ByVal lphChan As Integer, lpvItemList As Any) As Long 'unsigned long __pascal __far CitTransferCall(unsigned int hC,unsigned long dwCa
llId,unsigned long dwActiveCallId);
Declare Function DecCitTransferCall Lib "Cit.DLL" Alias "CitTransferCall" (ByVal
 lphChan As Integer, ByVal dwHeldCallId As Long, ByVal dwActiveCallId As Long) A
s Long Sub CheckDecCitError (gsCitVerb As String)
    Dim temp As Long
    gfCitError = True If Sgn(gwCitError) = -1 Then
            ' Return of GetFreeSpace is an unsigned long
            ' so handle case when high bit is set (two's complement).
```

A-127

DECCIT.BAS - 22

```
            temp = CLng(gwCitError + 1&) Xor &HFFFFFFFF
            gwCitError = temp
    End If Select Case gwCitError
        Case DecCit__SUCCESS
            gsCitMsg = "DecCit__SUCCESS"
            gfCitError = False
        Case DecCit__ABORT
            gsCitMsg = "DecCit__ABORT"
        Case DecCit__BADPARAM
            gsCitMsg = "DecCit__BADPARAM"
        Case DecCit__CONNECFAIL
            gsCitMsg = "DecCit__CONNECFAIL"
        Case DecCit__COSVIO
            gsCitMsg = "DecCit__COSVIO"
        Case DecCit__DATALOST
            gsCitMsg = "DecCit__DATALOST"
        Case DecCit__DEVASSIGNED
            gsCitMsg = "DecCit__DEVASSIGNED"
        Case DecCit__GRPNOTASS
            gsCitMsg = "DecCit__GRPNOTASS"
        Case DecCit__INQUEEXD
            gsCitMsg = "DecCit__INQUEEXD"
        Case DecCit__INSMEM
            gsCitMsg = "DecCit__INSMEM"
        Case DecCit__INVCALLREF
            gsCitMsg = "DecCit__INVCALLREF"
        Case DecCit__INVCHAN
            gsCitMsg = "DecCit__INVCHAN"
        Case DecCit__INVDEVNAM
            gsCitMsg = "DecCit__INVDEVNAM"
        Case DecCit__INVDEVOPT
            gsCitMsg = "DecCit__INVDEVOPT"
        Case DecCit__INVFEATURE
            gsCitMsg = "DecCit__INVFEATURE"
        Case DecCit__INVPARAM
            gsCitMsg = "DecCit__INVPARAM"
        Case DecCit__INVTRANSVAL
            gsCitMsg = "DecCit__INVTRANSVAL"
        Case DecCit__INVTRANSTYPE
            gsCitMsg = "DecCit__INVTRANSTYPE"
        Case DecCit__LOGIDTOOLONG
            gsCitMsg = "DecCit__LOGIDTOOLONG"
        Case DecCit__MONCLEARED
            gsCitMsg = "DecCit__MONCLEARED"
        Case DecCit__NETWRITEERR
            gsCitMsg = "DecCit__NETWRITEERR"
        Case DecCit__NOLICENSE
            gsCitMsg = "DecCit__NOLICENSE"
        Case DecCit__NOLOGID
            gsCitMsg = "DecCit__NOLOGID"
        Case DecCit__NOTMON
            gsCitMsg = "DecCit__NOTMON"
        Case DecCit__NULLINTERSECT
            gsCitMsg = "DecCit__NULLINTERSECT"
        Case DecCit__PBXCONGESTED
            gsCitMsg = "DecCit__PBXCONGESTED"
        Case DecCit__RCVREQREJ
            gsCitMsg = "DecCit__RCVREQREJ"
        Case DecCit__RESPARSEERR
```

DECCIT.BAS - 23

```
                gsCitMsg = "DecCit__RESPARSEERR"
        Case DecCit__SHUT
                gsCitMsg = "DecCit__SHUT"
        Case DecCit__STOPPED
                gsCitMsg = "DecCit__STOPPED"
        Case DecCit__TIMEOUT
                gsCitMsg = "DecCit__TIMEOUT"
        Case DecCit__TRUNCATED
                gsCitMsg = "DecCit__TRUNCATED"
        Case DecCit__UNABCOMPREQ
                gsCitMsg = "DecCit__UNABCOMPREQ"
        Case DecCit__UNIMPLEMENTED
                gsCitMsg = "DecCit__UNIMPLEMENTED"
        Case DecCit__UNSUPPROC
                gsCitMsg = "DecCit__UNSUPPROC"
        Case DecCit__UNSUPREQ
                gsCitMsg = "DecCit__UNSUPREQ"
        Case DecCit__XMITPROBLEM
                gsCitMsg = "DecCit__XMITPROBLEM"
        Case Else
                gsCitMsg = "Unknown DecCit Error " & Chr(gwCitError)
        End Select
' debug only
    'gfCitError = False If gfCitError = True Then
        Call ShowCitError(gsCitVerb, gwCitError, gsCitMsg)
    End If End Sub Sub Cit_Examples ()
'
'* Routine prototypes for the Cit DLL
'
'extern void __pascal __far StartDLLTimer(unsigned int hWndHiddenApp);
'unsigned long __pascal __far CitAssign(unsigned int __far *lphChan,void __far *
lpvItemList,unsigned short cbPbxnLen,char __far *lpPbxName,unsigned short cbNode
Len,char __far *lpNode,unsigned int hAppWin);
'unsigned long __pascal __far CitDeassign(unsigned int hC);
'unsigned long __pascal __far CitGetEvent(unsigned int hC,void __far *lpvItemLis
t,unsigned inthWnd,void __far *lpvAsb);
'unsigned long __pascal __far CitGetDeviceAttributes(unsigned int hC,void __far
*lpvItemList);
'unsigned long __pascal __far CitGetChannelInformation(unsigned int hC,void __fa
r *lpvItemList);

'unsigned long __pascal __far CitMakeCall(unsigned int hC,void __far *lpvItmList
);
'unsigned long __pascal __far CitMakePredictiveCall(unsigned int hC,void __far *
lpvItmList);
'unsigned long __pascal __far CitHangupCall(unsigned int hC,unsigned long dwCall
Id);
'unsigned long __pascal __far CitAnswerCall(unsigned int hC,unsigned long dwCall
Id);
'unsigned long __pascal __far CitCancelCall(unsigned int hC,unsigned long dwCall
Id);

'unsigned long __pascal __far CitTransferCall(unsigned int hC,unsigned long dwCa
llId,unsigned long dwActiveCallId);
'unsigned long __pascal __far CitReconnectHeld(unsigned int hC,unsigned long dwC
```

A-129

DECCIT.BAS - 24

```
allId,unsigned long dwSecCallId);
'unsigned long __pascal __far CitInitiateTransferCall(unsigned int hC,void __far
*lpvItmList);
'unsigned long __pascal __far CitConferenceJoin(unsigned int hC,unsigned long dw
CallId,unsigned long dwActiveCallId);
'unsigned long __pascal __far CitInitiateConferenceCall(unsigned int hC,void __f
ar *lpvItmList);
'unsigned long __pascal __far CitPickupCall(unsigned int hC,unsigned long dwCall
Id,void __far *lpvItmList);
'unsigned long __pascal __far CitResumeCall(unsigned int hC,unsigned long dwCall
Id,void __far *lpvItmList);
'unsigned long __pascal __far CitDeflectCall(unsigned int hC,unsigned long dwCal
lId,void __far *lpvItmList);
'unsigned long __pascal __far CitRespondToInactiveCall(unsigned int hC,unsigned
long dwCallId,unsigned long dwFeature);
'unsigned long __pascal __far CitSuspendCall(unsigned int hC,unsigned long dwCal
lId);
'unsigned long __pascal __far CitRetrieveHeld(unsigned int hC,unsigned long dwCa
llId);
'unsigned long __pascal __far CitSwapWithHeld(unsigned int hC,unsigned long dwCa
llId,unsigned long dwActiveCallId);
'unsigned long __pascal __far CitGetRouteQuery(unsigned int hC,void __far *lpvIt
emList,unsignedint hWnd,void __far *lpvIosb);
'unsigned long __pascal __far CitRespondToRouteQuery(unsigned int hC,unsigned lo
ng dwCallId,void __far *lpvItmList);
'unsigned long __pascal __far CitHciExtensions(unsigned int hCccbHandle,unsigned
long dwInvokeFunction,unsigned long dwCallId,void __far *lpvItmList);

End Sub
```

```
E911.BAS - 1

'---------------------------------------------------------------
' E911Data.BAS
' support functions for the E911 application
'
' General Information: This app is intended to demonstrate
'   and exercise all of the functionality available in the
'   VT (Virtual Table) Object layer in VB 3.0 Pro.
'
'
' Naming Conventions:
'   "f..."    = Form
'   "b..."    = Button
'   "t..."    = Text
'   "c..."    = Form control
'   "F..."    = Form level variable
'   "gst..."  = Global String
'   "gf..."   = Global flag (true/false)
'   "gw..."   = Global 2 byte integer value
'
'---------------------------------------------------------------

Option Explicit
'Product Options
Global PagingProductInstalled As Integer
Global CitProductInstalled As Integer
Global ODBCProductInstalled As Integer
Global DecCitProductInstalled As Integer
Global TAPICitProductInstalled As Integer 'api declarations
Declare Function OSGetPrivateProfileString% Lib "Kernel" Alias "GetPrivateProfil
eString" (ByVal AppName$, ByVal KeyName$, ByVal keydefault$, ByVal ReturnString$
, ByVal NumBytes As Integer, ByVal FileName$)
Declare Function OSWritePrivateProfileString% Lib "Kernel" Alias "WritePrivatePr
ofileString" (ByVal AppName$, ByVal KeyName$, ByVal keydefault$, ByVal FileName$
)
Declare Function OSGetWindowsDirectory% Lib "Kernel" Alias "GetWindowsDirectory"
 (ByVal a$, ByVal b%)

'911 database global variables
Global AgencyDS As Dynaset
Global ALIDS As Dynaset
Global CDRDS As Dynaset
Global PhoneDS As Dynaset
Global PageDS As Dynaset
Global PoliceDS As Dynaset
Global FireDS As Dynaset
Global EMSDS As Dynaset
Global PSAPDS As Dynaset
Global ESNDS As Dynaset
Global CodesDS As Dynaset
Global CallHistoryDS As Dynaset 'global object variables
Global gCurrentDB As Database
Global gfDBOpenFlag As Integer
Global gCurrentDS As Dynaset
Global gCurrentTbl As Table
Global gCurrentQueryDef As QueryDef
```

E911.BAS - 2

```
Global gCurrentField As Field

'global database variables
Global gstDataType As String
Global gstDBName As String
Global gstUserName As String
Global gstPassword As String
Global gstDataBase As String
Global gstDynaString As String
Global gstTblName As String
Global gfUpdatable As Integer
Global glQueryTimeout As Long
Global glLoginTimeout As Long
Global gstTableDynaFilter As String
Global gsAgent As String '911 element global variables
Global gsPoliceName As Variant
Global gsESN As Variant
Global gsPhone As String
Global gsPoisonPhone As String
Global gsLanguagePhone As String
Global gsPoliceAgencyNo As Variant
Global gsPoliceVoice As Variant
Global gsPolicePager As Variant
Global gsFireName As Variant
Global gsFireAgencyNo As Variant
Global gsFireVoice As Variant
Global gsFirePager As Variant
Global gsEMSName As Variant
Global gsEMSAgencyNo As Variant
Global gsEMSVoice As Variant
Global gsEMSPager As Variant
Global gsPoisonVoice As Variant
Global gsLanguageVoice As Variant
Global gsCurrentVoice As Variant
Global crlf As String
Global gfNoali As Variant
Global Interval As Integer 'other global vars
Global gstZoomData As String
Global gwMaxGridRows As Long 'new field properties
Global gwFldType As Integer
Global gwFldSize As Integer 'global find values
Global gfFindFailed As Integer
Global gstFindExpr As String
Global gstFindOp As String
Global gstFindField As String
Global gfFindMatch As Integer
Global gfFromTableView As Integer 'global seek values
Global gstSeekOperator As String
Global gstSeekValue As String
```

```
E911.BAS - 3
'global flags
Global gfDBChanged As Integer
Global gfFromSQL As Integer
Global gfTransPending As Integer
Global gfAddTableFlag As Integer 'global constants
Global Const DEFAULTDRIVER = "SQL Server"
Global Const MODAL = 1
Global Const HOURGLASS = 11
Global Const DEFAULT_MOUSE = 0
Global Const YES = 6
Global Const MSGBOX_TYPE = 4 + 48 + 256
Global Const TRUE_ST = "True"
Global Const FALSE_ST = "False"
Global Const EOF_ERR = 626
Global Const FTBLS = 0
Global Const FFLDS = 1
Global Const FINDX = 2
Global Const MAX_GRID_ROWS = 31999
Global Const MAX_MEMO_SIZE = 20000
Global Const GETCHUNK_CUTOFF = 50

'field type constants
Global Const FT_TRUEFALSE = 1
Global Const FT_BYTE = 2
Global Const FT_INTEGER = 3
Global Const FT_LONG = 4
Global Const FT_CURRENCY = 5
Global Const FT_SINGLE = 6
Global Const FT_DOUBLE = 7
Global Const FT_DATETIME = 8
Global Const FT_STRING = 10
Global Const FT_BINARY = 11
Global Const FT_MEMO = 12

'table type constants
Global Const DB_TABLE = 1
Global Const DB_ATTACHEDTABLE = 6
Global Const DB_ATTACHEDODBC = 4
Global Const DB_QUERYDEF = 5
Global Const DB_SYSTEMOBJECT = &H80000002

'dynaset option parameter constants
Global Const VBDA_DENYWRITE = &H1
Global Const VBDA_DENYREAD = &H2
Global Const VBDA_READONLY = &H4
Global Const VBDA_APPENDONLY = &H8
Global Const VBDA_INCONSISTENT = &H10
Global Const VBDA_CONSISTENT = &H20
Global Const VBDA_SQLPASSTHROUGH = &H40

'db create/compact constants
Global Const DB_CREATE_GENERAL = ";langid=0x0809;cp=1252;country=0"
Global Const DB_VERSION10 = 1

' Microsoft Access QueryDef types
Global Const DB_QACTION = &HF0
Global Const DB_QCROSSTAB = &H10
Global Const DB_QDELETE = &H20
Global Const DB_QUPDATE = &H30
```

```
E911.BAS - 4

Global Const DB_QAPPEND = &H40
Global Const DB_QMAKETABLE = &H50

' Index Attributes
Global Const DB_UNIQUE = 1
Global Const DB_PRIMARY = 2
Global Const DB_PROHIBITNULL = 4
Global Const DB_IGNORENULL = 8
Global Const DB_DESCENDING = 1   'For each field in Index Function CheckTransPending (Msg As String) As Integer If gfTransPending = True Then
    MsgBox Msg + Chr(13) + Chr(10) + "Execute Commit or Rollback First.", 48
    CheckTransPending = True
  Else
    CheckTransPending = False
  End If End Function Sub CloseAllDynasets ()
  Dim i As Integer MsgBar "Closing Dynasets", True
  While i < forms.Count
    If forms(i).Tag = "Dynaset" Then
      Unload forms(i)
    Else
      i = i + 1
    End If
  Wend
  MsgBar "", False End Sub Sub CreateCallHistory ()

On Error GoTo CreateCallHistory_SQLerror
    'Prepare call for adding data
    Set CallHistoryDS = gCurrentDB.CreateDynaset("CallHistory")
    If gCurrentDB.Transactions = True Then
        BeginTrans
    End If CallHistoryDS.AddNew
    'Agency Data
    'CallHistoryDS("ESN") = gsESN
    'ALI Data
    CallHistoryDS("Phone") = Trim$(gsPhone)
    CallHistoryDS("ConnectDt") = Now
    'CallHistoryDS("AnswerDt") = Now
    'CallHistoryDS("Block") = ALIDS("Block")
    'CallHistoryDS("Direction") = ALIDS("Direction")
    'CallHistoryDS("Suffix") = ALIDS("Suffix")
    'CallHistoryDS("Street") = ALIDS("Street")
    'CallHistoryDS("City") = ALIDS("City")
    'CallHistoryDS("State") = ALIDS("State")
    'CallHistoryDS("Location") = ALIDS("Location")
    'CallHistoryDS("Customer") = ALIDS("Customer")
```

E911.BAS - 5
```
    'CallHistoryDS("Pilot") = ALIDS("Pilot")
    'CallHistoryDS("Service") = ALIDS("Service")
    'Update Info
    CallHistoryDS("UpdEmpno") = gsAgent
    CallHistoryDS.Update
    If gCurrentDB.Transactions = True Then
        CommitTrans
    End If
    Exit Sub CreateCallHistory_SQLerror:
    ShowError
    Exit Sub End Sub Function GetFieldType (ft As String) As Integer
  'return field length
  If ft = "String" Then
    GetFieldType = FT_STRING
  Else
    Select Case ft
      Case "Counter"
        GetFieldType = FT_LONG
      Case "True/False"
        GetFieldType = FT_TRUEFALSE
      Case "Byte"
        GetFieldType = FT_BYTE
      Case "Integer"
        GetFieldType = FT_INTEGER
      Case "Long"
        GetFieldType = FT_LONG
      Case "Currency"
        GetFieldType = FT_CURRENCY
      Case "Single"
        GetFieldType = FT_SINGLE
      Case "Double"
        GetFieldType = FT_DOUBLE
      Case "Date/Time"
        GetFieldType = FT_DATETIME
      Case "Binary"
        GetFieldType = FT_BINARY
      Case "Memo"
        GetFieldType = FT_MEMO
    End Select
  End If End Function Function GetFieldWidth (t As Integer)
    'determines the form control width
    'based on the field type
    Select Case t
      Case FT_TRUEFALSE
        GetFieldWidth = 850
      Case FT_BYTE
        GetFieldWidth = 650
      Case FT_INTEGER
        GetFieldWidth = 900
      Case FT_LONG
        GetFieldWidth = 1100
```

E911.BAS - 6

```basic
    Case FT_CURRENCY
       GetFieldWidth = 1800
    Case FT_SINGLE
       GetFieldWidth = 1800
    Case FT_DOUBLE
       GetFieldWidth = 2200
    Case FT_DATETIME
       GetFieldWidth = 2000
    Case FT_STRING
       GetFieldWidth = 3250
    Case FT_BINARY
       GetFieldWidth = 3250
    Case FT_MEMO
       GetFieldWidth = 3250
    Case Else
       GetFieldWidth = 3250
  End Select End Function Function GetINIString$ (ByVal szItem$, ByVal szDefault$)
  Dim tmp As String
  Dim x As Integer tmp = String$(2048, 32)
  x = OSGetPrivateProfileString("E911", szItem$, szDefault$, tmp, Len(tmp), "E91
1.INI")

GetINIString = Mid$(tmp, 1, x)
End Function

Function GetNumbRecs (FDS As Dynaset) As Long
  Dim ds As Dynaset

On Error GoTo GNRErr

Set ds = FDS.Clone()
  If Not ds.EOF Then ds.MoveLast
  GetNumbRecs = ds.RecordCount
  ds.Close
  If FDS.Updatable = True Then
    gfUpdatable = True
  End If GoTo GNREnd GNRErr:
    'just return because row count is non critical
    GetNumbRecs = -1
    Resume GNREnd GNREnd:

End Function

Function GetNumbRecsSS (FDS As Snapshot) As Long
  Dim ds As Snapshot

On Error GoTo GNRSSErr

Set ds = FDS.Clone()
```

```
E911.BAS - 7
  If Not ds.EOF Then ds.MoveLast
  GetNumbRecsSS = ds.RecordCount
  ds.Close
  If FDS.Updatable = True Then
    gfUpdatable = True
  End If GoTo GNRSSEnd GNRSSErr:
  'just return because row count is non critical
  GetNumbRecsSS = -1
  Resume GNRSSEnd GNRSSEnd:

End Function

Function GetNumbRecsTbl (tbl As Table) As Long
  Dim tbl2 As Table

On Error GoTo GNRTErr

Set tbl2 = tbl.Clone()
  If Not tbl2.EOF Then tbl2.MoveLast
  GetNumbRecsTbl = tbl2.RecordCount
  tbl2.Close
  gfUpdatable = True GoTo GNRTEnd GNRTErr:
  'just return because row count is non critical
  GetNumbRecsTbl = -1
  Resume GNRTEnd GNRTEnd:

End Function

Sub MsgBar (Msg As String, pw As Integer)
  If Msg = "" Then
    frmMDI.cMsg = "Ready"
  Else
    If pw = True Then
      frmMDI.cMsg = Msg + ", please wait..."
    Else
      frmMDI.cMsg = Msg
    End If
  End If
  frmMDI.cMsg.Refresh
End Sub Sub ResetMouse (f As Form)
  frmMDI.MousePointer = DEFAULT_MOUSE
  f.MousePointer = DEFAULT_MOUSE
End Sub Function SetFldProperties (ft As String) As String
  'return field length
  If ft = "String" Then
```

A-137

E911.BAS - 8
```
      gwFldType = FT_STRING
    Else
      Select Case ft
        Case "Counter"
           SetFldProperties = "4"
           gwFldType = FT_LONG
           gwFldSize = 4
        Case "True/False"
           SetFldProperties = "1"
           gwFldType = FT_TRUEFALSE
           gwFldSize = 1
        Case "Byte"
           SetFldProperties = "1"
           gwFldType = FT_BYTE
           gwFldSize = 1
        Case "Integer"
           SetFldProperties = "2"
           gwFldType = FT_INTEGER
           gwFldSize = 2
        Case "Long"
           SetFldProperties = "4"
           gwFldType = FT_LONG
           gwFldSize = 4
        Case "Currency"
           SetFldProperties = "8"
           gwFldType = FT_CURRENCY
           gwFldSize = 8
        Case "Single"
           SetFldProperties = "4"
           gwFldType = FT_SINGLE
           gwFldSize = 4
        Case "Double"
           SetFldProperties = "8"
           gwFldType = FT_DOUBLE
           gwFldSize = 8
        Case "Date/Time"
           SetFldProperties = "8"
           gwFldType = FT_DATETIME
           gwFldSize = 8
        Case "Binary"
           SetFldProperties = "0"
           gwFldType = FT_BINARY
           gwFldSize = 0
        Case "Memo"
           SetFldProperties = "0"
           gwFldType = FT_MEMO
           gwFldSize = 0
      End Select
    End If
End Function Sub SetHourglass (f As Form)
    DoEvents  'cause forms to repaint before going on
    frmMDI.MousePointer = HOURGLASS
    f.MousePointer = HOURGLASS
End Sub Sub ShowError ()
    Dim s As String
    s = "The following Error occurred:" + crlf + crlf
    'add the error string
```

E911.BAS - 9

```
  s = s + Error$ + crlf
  'add the error number
  s = s + "Number: " + CStr(Err)
  'beep and show the error
  Beep MsgBox (s)

End Sub

Function ShowMCIError ()
' Force all runtime errors to be handled here.
   Dim Msg As String
   Select Case Err
       Case MCIERR_CANNOT_LOAD_DRIVER
           Msg$ = "Error load media device driver."
       Case MCIERR_DEVICE_OPEN
           Msg$ = "The device is not open or is not known."
       Case MCIERR_INVALID_DEVICE_ID
           Msg$ = "Invalid device id."
       Case MCIERR_INVALID_FILE
           Msg$ = "Invalid filename."
       Case MCIERR_UNSUPPORTED_FUNCTION
           Msg$ = "Action not available for this device."
       Case Else
           Msg$ = "Unknown error (" + Str$(Err) + ")."
   End Select MsgBox Msg$, 48, MCI_APP_TITLE End Function Function StripFileName (fname As String) As String
  On Error Resume Next
  Dim i As Integer For i = Len(fname) To 1 Step -1
    If Mid(fname, i, 1) = "\" Then
      Exit For
    End If
  Next StripFileName = Mid(fname, 1, i - 1)

End Function

Function StripNonAscii (vs As Variant) As String
  Dim i As Integer
  Dim ts As String For i = 1 To Len(vs)
    If Asc(Mid(vs, i, 1)) < 32 Or Asc(Mid(vs, i, 1)) > 126 Then
      ts = ts + " "
    Else
      ts = ts + Mid(vs, i, 1)
    End If
  Next StripNonAscii = ts
```

```
E911.BAS - 10

End Function

Function stTrueFalse (tf As Variant) As String
  If tf = True Then
    stTrueFalse = "True"
  Else
    stTrueFalse = "False"
  End If
End Function Sub TrimPhone (phone As Variant)
    Dim tempPhone As String
    Dim i As Integer
    tempPhone = Trim(phone)
    i = Len(phone)
   'Do Until i = 0
        'f isnull mid(phone,i,1)

End Sub

Function vFieldVal (fval As Variant) As Variant
  If IsNull(fval) Then
    vFieldVal = ""
  Else
    vFieldVal = CStr(fval)
  End If
End Function
```

MAP.BAS - 1

Option Explicit

Global Const gLive = True

Declare Function setwindowpos Lib "USER" (ByVal hWnd As Integer, ByVal hWndAfter
 As Integer, ByVal x As Integer, ByVal y As Integer, ByVal cx As Integer, ByVal
cy As Integer, ByVal fuflags As Integer) As Integer
Global gBaseDir As String
Global gDDEWait As Integer
Global gDDETime As Integer
Global gWavDone As Integer
Global gImageDone As Integer
Global gUserDoneReading As Integer
Global gSiteRecNum As Long
Global gDefFile As String
Global gVideoDonePLaying As Integer
Global gShowSite As Integer
Global gVideoCapable As Integer
Global gIamBusy As Integer
Global gToldToQuit As Integer
Global gNextDefFile Global Const ddeNoWait = 0
Global Const ddeCallBack = 1
Global Const ddeWait = 2
' These constants are defined in mmsystem.h.

Global Const MCI_FORMAT_FRAMES = 3

Declare Function GetFocus Lib "User" () As Integer

Global mciString As String
Global mciReturn As String
Global curDev As String
Global curTC As Long Declare Function mciSendCommand Lib "mmsystem" (ByVal hDevID%, ByVal wMessage%,
ByVal dwParam1%, ByVal dwParam2%) As Integer
Declare Function mciSendString Lib "MMSystem" (ByVal lpstrCommand As String, ByV
al lpstrReturn As String, ByVal nSize As Integer, ByVal hCallback As Integer) As
 Long
Declare Function mciGetErrorString Lib "MMSystem" (ByVal dwError As Long, ByVal
lpstrBuffer As String, ByVal wLength As Integer) As Integer Type PanelType
    NextDefFile(8) As String * 60
    PrevDefFile As String * 60
End Type Global gPanel As PanelType Sub DDEMapInfo ()

Dim chan_num, tab_marker As Integer
Dim topiclist, topicname, cell As String
    'chan_num = DDEInitiate("Mapinfo", "System")
    If chan_num = 0 Then
        MsgBar "MapInfo is not responding. Sorry!", False
        Exit Sub

A-141

MAP.BAS - 2

```
    End If

' Get a list of Excel's valid topics
'    topiclist = DDERequest$(chan_num, "topics")

' At this point, topiclist might look like this:
'    "Sheet1   System"
' (if spreadsheet is still "unnamed"),or like this:
'    "C:Orders.XLS   System"
' Next,extract just the first topic (e.g."Sheet1")
' by extracting the text before the 1st TAB
tab_marker = InStr(1, topiclist, Chr$(9))
    If tab_marker = 0 Then
        MsgBar "No MapInfo documents in use! Stopping.", False
        Exit Sub
    End If
    topicname = Mid$(topiclist, 1, tab_marker - 1)

' open a channel to the specific document
' (e.g. "Sheet1")
    'DDETerminate chan_num
'   chan_num = DDEInitiate("MapInfo", topicname)
    If chan_num = 0 Then
        MsgBar "Problem communicating with " + topicname, False
        Exit Sub
    End If ' Let's examine the 1st cell in Excel.
' If cell is blank, put a message in the cell.
' If cell isn't blank, don't alter it -
' just display cell contents in a MapBasic NOTE.
' Note that a "Blank cell" gets returned as a
' carriage-return line-feed sequence:
'   Chr$(13) + Chr$(10).
'   cell = DDERequest$(chan_num, "R1C1")
    If cell <> Chr$(13) + Chr$(10) Then
        MsgBar "Message not sent; cell already contains:" + cell, False Else
        'DDEPoke chan_num, "R1C1", "Hello from MapInfo!"
        MsgBar "Message sent to Excel," + topicname + ",R1C1.", False
    End If 'DDETerminateAll End Sub Sub ddeToMapInfo (ByVal Topic As String, ByVal Msg As String, ByVal HandShake As Integer)

Dim Flag As String
    Dim x

'Handshake cases:   0 = None, send message with and don't wait for response
    '                   1 = Callback, expect MBX to send a message when it's done
    '                   2 = Wait, use "LinkTimeOut" to wait for mbx to finish On Error GoTo ddeToMapInfoError
```

MAP.BAS - 3

```
    x = DoEvents()
    Util.SendBox.LinkMode = 0

Select Case HandShake
        Case 0
            gDDEWait = False
            gDDETime = 0
            Util.Timer1.Interval = 0
            Util.SendBox.LinkTimeout = 0
            Flag = "NCB"
        Case 1
            gDDEWait = True
            gDDETime = 120
            Util.Timer1.Interval = 1000
            Util.SendBox.LinkTimeout = 0
            Flag = "SCB"
        Case 2
            gDDEWait = False
            gDDETime = 0
            Util.Timer1.Interval = 0
            Util.SendBox.LinkTimeout = 1200
            Flag = "NCB"
    End Select If UCase$(Topic) = "SYSTEM" Then
        Flag = ""
    End If Util.SendBox.LinkTopic = "mapinfo|" + Topic
    Util.SendBox.LinkMode = 2
    Util.SendBox.LinkExecute Flag + Msg On Error Resume Next
    AppActivate "MapInfo 2.1"
'    AppActivate "MapInfo 3.0"
    On Error GoTo 0

If HandShake = 1 Then
        While gDDEWait And gDDETime > 0
            x = DoEvents()
        Wend If gDDEWait Then
            MsgBox "Time out while waiting for Mapinfo", 16, "Fatal Error 010"
            End
        End If Util.Timer1.Interval = 0

End If x = DoEvents()

Exit Sub ddeToMapInfoError:

If Err = 286 Then
        If HandShake = 0 Or HandShake = 1 Then
            Resume Next
        End If
```

A-143

```
MAP.BAS - 4
    Else
        MsgBox Error$, 16, "Fatal Error 002"
        End
    End If End Sub Sub Main ()

Dim Res, i
    Dim c As String

'Load Util c = UCase$(Command$)

i = InStr(c, "NOVIDEO")

If i > 0 Then
        gBaseDir = Trim(Mid$(c, 1, i - 1))
        gVideoCapable = False
    Else
        gVideoCapable = True
        gBaseDir = Command$
    End If '    Call ShowVideo(1)
'    Exit Sub '    If Not FileExists(gBaseDir + "\code\maint_db.mbx") Then
'        MsgBox "Cannot find " + gBaseDir + "\code\maint_db.mbx", 16, "Fatal Err
or 005"
'        End
'    End If Call StartMapInfo '    If Not FileExists(gBaseDir + "\code\maint_db.mbx") Then
'        MsgBox "Cannot find " + gBaseDir + "\code\maint_db.mbx", 16, "Fatal Err
or 006"
'        End
'    End If On Error Resume Next
    AppActivate "MapInfo 2.1"
    AppActivate "MapInfo 3.0"
    On Error GoTo 0

Call ddeToMapInfo("System", "run application """ + gBaseDir + "\resource\de
ault.wor""", ddeWait)
    Call ddeToMapInfo("System", "run application """ + gBaseDir + "\code\st_kio
k.mbx""", ddeWait)
    'Call ddeToMapInfo("Showings.Mbx", "gBaseDir|" + gBaseDir, ddeCallBack)
    'Call ddeToMapInfo("Showings.Mbx", "CreateNewWSTable", ddeCallBack)
    'Call ddeToMapInfo("Showings.Mbx", "OpenTables", ddeCallBack)
    'Call ddeToMapInfo("Showings.Mbx", "CallMainDialog", ddeNoWait)

'Load Util
    'Load ShowSite
```

MAP.BAS - 5

```basic
    'ShowSite.Hide
End Sub

Sub Map ()

Call ddeToMapInfo("Maint_DB.Mbx", "gbaseDir|" & gBaseDir, ddeCallBack)

End Sub

Sub ShowMap (MapNum As String, SelCat As Variant, SelType As String)

Dim wSelCat As String
    Dim wSelType As String

Call ddeToMapInfo("c:\windows\mapinfo\St_Kiosk.Mbx", "ShowMap|" + MapNum, dd
eCallBack)

If SelCat > 0 Then
        wSelCat = SelCat
    Else
        wSelCat = "ALL"
    End If If SelType <> "" Then
        wSelType = SelType
    Else
        wSelType = "ALL"
    End If Call ddeToMapInfo("St_Kiosk.Mbx", "SELECT|" + wSelCat + "|" + wSelType, ddeC
allBack)

End Sub

Sub StartMapInfo ()

Dim p$, i, Res, x p$ = "mapinfow c:\windows\mapinfo\houston\hou2.wor"
    i = 1
StartMapInfoRetry:

On Error GoTo StartMapInfoError

Res = Shell(p$, 1)

x = DoEvents()

Exit Sub

StartMapInfoError:

Select Case Err
        Case 5  'Already running'
            Resume Next
        Case 53, 76 'Cannot find
            Select Case i
                Case 1
                    i = 2
                    p$ = "c:\windows\mapinfo\mapinfow.exe c:\windows\mapinfo\hou
```

A-145

```
MAP.BAS - 6
ston\hou2.wor"
                    Resume StartMapInfoRetry
                Case 2
                    i = 3
                    p$ = "c:\windows\mapinfo\mapinfow.exe"
                    Resume StartMapInfoRetry
                Case 3
                    i = 4
                    p$ = "c:\windows\mapinfo\mapinfow.exe"
                    Resume StartMapInfoRetry
                Case 4
                    i = 5
                    p$ = "c:\windows\mapinfo\mapinfow.exe"
                    Resume StartMapInfoRetry
                Case Else
                    MsgBox "Cannot find Mapinfow.exe", 16, "Fatal Error 008"
                    End
            End Select
        Case Else
            MsgBox Error$, 16, "Fatal Error 009"
            End
    End Select End Sub
```

```
MCI.BAS - 1

'*** Global Constants ***
Global Const OFN_FILEMUSTEXIST = &H1000&
Global Const OFN_READONLY = &H4&

Global Const MCI_APP_TITLE = "MCI Control Application"

' These constants are defined in mmsystem.h.
Global Const MCIERR_INVALID_DEVICE_ID = 30257
Global Const MCIERR_DEVICE_OPEN = 30263
Global Const MCIERR_CANNOT_LOAD_DRIVER = 30266
Global Const MCIERR_UNSUPPORTED_FUNCTION = 30274
Global Const MCIERR_INVALID_FILE = 30304

Global Const MCI_MODE_NOT_OPEN = 524
Global Const MCI_MODE_PLAY = 526

Global Const MCI_FORMAT_MILLISECONDS = 0
Global Const MCI_FORMAT_TMSF = 10

Declare Function GetFocus Lib "User" () As Integer

'*** Global Variables ***
Global DialogCaption As String

' Force all runtime errors to be handled here.
Sub DisplayErrorMessageBox ()
    Select Case Err
        Case MCIERR_CANNOT_LOAD_DRIVER
            Msg$ = "Error load media device driver."
        Case MCIERR_DEVICE_OPEN
            Msg$ = "The device is not open or is not known."
        Case MCIERR_INVALID_DEVICE_ID
            Msg$ = "Invalid device id."
        Case MCIERR_INVALID_FILE
            Msg$ = "Invalid filename."
        Case MCIERR_UNSUPPORTED_FUNCTION
            Msg$ = "Action not available for this device."
        Case Else
            Msg$ = "Unknown error (" + Str$(Err) + ")."
    End Select MsgBox Msg$, 48, MCI_APP_TITLE
End Sub ' This subroutine allows any Windows events to be processed.
' This may be necessary to solve any synchronization
' problems with Windows events.
'
' This subroutine can also be used to force a delay in
' processing.
Sub WaitForEventsToFinish (NbrTimes As Integer)
    Dim i As Integer For i = 1 To NbrTimes
        dummy% = DoEvents()
    Next i
End Sub
```

```
PAGING.BAS - 1

Option Explicit

Sub SendPage (AgencyDS As Dynaset, AliDS As Dynaset)
    'If the Agency doesn't accept paging, then exit
    'If gfNoali = true and Then Exit Sub
    If PagingProductInstalled = False Then Exit Sub
    If AgencyDS("Paging") = False Then Exit Sub ' If no ALI, no use sending a page On Error GoTo SendPage_SQLerror
    'Prepare Page for adding data
    Set PageDS = gCurrentDB.CreateDynaset("Pages")
    If gCurrentDB.Transactions = True Then
        BeginTrans
    End If PageDS.AddNew
    'Agency Data
    PageDS("ESN") = gsESN
    PageDS("AgencyNo") = AgencyDS("AgencyNo")
    PageDS("Pager") = AgencyDS("Pager")
    PageDS("AgencyName") = AgencyDS("Name")
    'ALI Data
    PageDS("ANIPhone") = DecANI
    PageDS("CallDt") = Now
    PageDS("SendDt") = Now
    PageDS("Block") = AliDS("Block")
    PageDS("Direction") = AliDS("Direction")
    PageDS("Suffix") = AliDS("Suffix")
    PageDS("Street") = AliDS("Street")
    PageDS("City") = AliDS("City")
    PageDS("State") = AliDS("State")
    PageDS("Location") = AliDS("Location")
    PageDS("Customer") = AliDS("Customer")
    PageDS("Pilot") = AliDS("Pilot")
    PageDS("Service") = AliDS("Service")
    'Update Info
    PageDS("UpdEmpNo") = "SendPage"
    PageDS.Update
    If gCurrentDB.Transactions = True Then
        CommitTrans
    End If
    MsgBar "Paging Successful", False
    Exit Sub SendPage_SQLerror:
    ShowError
    Exit Sub End Sub
```

```
QELINK.BAS - 1

'===========================================================================
'
'                          QeLink.txt
'
'                    Q+E Multilink/VB Version 2.0
'                         Global Constants File
'
'===========================================================================

'===========================================================================
'          Copyright: 1992-93 Q+E Software, Inc.
'
'          This software contains confidential and proprietary
'          information of Q+E Software Systems, Inc.
'===========================================================================

'=================='
' Error Codes      '
'=================='

Global Const QE_ERROR_CODES = 31000
Global Const QE_FUNCTION_ABORTED = 31001
Global Const QE_RECORD_NOT_FOUND = 31002
Global Const QE_DB_ERROR = 31003
Global Const QE_RECORD_LOCKED = 31004
Global Const QE_RECORD_CHANGED = 31005
Global Const QE_LOGON_CANCELLED = 31008

'========================'
' Record State Codes     '
'========================'

Global Const RECSTATE_NO_RECORD = 0
Global Const RECSTATE_FETCHING = 1
Global Const RECSTATE_UNCHANGED = 2
Global Const RECSTATE_CHANGED = 3
Global Const RECSTATE_NEW_UNCHANGED = 4
Global Const RECSTATE_NEW_CHANGED = 5
Global Const RECSTATE_QBE_UNCHANGED = 6
Global Const RECSTATE_QBE_CHANGED = 7
Global Const RECSTATE_COPYING = 8
Global Const RECSTATE_ENTERING_QBE = 9
Global Const RECSTATE_CLEARING_QBE = 10
Global Const RECSTATE_CLEARING_NEW = 11
Global Const RECSTATE_FIND_UNCHANGED = 12
Global Const RECSTATE_FIND_CHANGED = 13
Global Const RECSTATE_ENTERING_FIND = 14
Global Const RECSTATE_CLEARING_FIND = 15

'=============================='
' pOneHstmtOptions Flags       '
'=============================='

Global Const QE_READAHEAD_AT_EXEC = &H1          ' Read entire solution set into
                                                 ' log at execute time
Global Const QE_READAHEAD_AT_UPDATE = &H2        ' Read remainder of solution
                                                 ' set into log at update,
                                                 ' delete, or lock
Global Const QE_READAHEAD_COMMIT_UPDATES = &H4   ' All updates must be
                                                 ' committed before any
                                                 ' additional fetching
```

```
QELINK.BAS - 2

Global Const QE_ROUTING_READ = &H8           ' Sends the statement to a
                                             ' read connection.
Global Const QE_ROUTING_UPDATE = &H10        ' Sends the statement to the
                                             ' transaction connection
Global Const QE_ROUTING_DEFAULT = &H18       ' Lets Multilink decide which
                                             ' connection to send the
                                             ' statement Global Const QE_HSTMT_LOCAL = &H20           ' States that this hstmt
                                             ' cannot affect any other
                                             ' active hstmts in the same
                                             ' app
Global Const QE_HSTMT_NONLOCAL = &H40        ' States that this hstmt may
                                             ' affect other hstmts in the
                                             ' same app Global Const QE_NO_LOCK_ON_KEY_PRESS = &H1000  ' Do not lock records whenever
                                               ' a field changes Global Const QE_NO_COMPARE_AFTER_LOCK = &H2000 ' Do not compare fields before
                                               ' placing locks '========================='
' pFieldType constants    '
'========================='

Global Const QE_CHAR = 1
Global Const QE_VARCHAR = 2
Global Const QE_DECIMAL = 3
Global Const QE_INTEGER = 4
Global Const QE_SMALLINT = 5
Global Const QE_FLOAT = 6
Global Const QE_DOUBLEPRECISION = 7
Global Const QE_DATETIME = 8
Global Const QE_LONGVARCHAR = 100
Global Const QE_BINARY = 101
Global Const QE_VARBINARY = 102
Global Const QE_LONGVARBINARY = 103
Global Const QE_BIGINT = 108
Global Const QE_TINYINT = 109
Global Const QE_BIT = 110
Global Const QE_DATE = 111
Global Const QE_TIME = 112

'================='
' Find Options    '
'================='

Global Const QE_FIND_FIRST = 1
Global Const QE_FIND_LAST = 2
Global Const QE_FIND_NEXT = 3
Global Const QE_FIND_NEXT_SKIP = 4
Global Const QE_FIND_PREV = 5
Global Const QE_FIND_PREV_SKIP = 6

'=================='
' Function Codes   '
'=================='
```

```
QELINK.BAS - 3

Global Const F_DOQUERY = 1
Global Const F_ENDQUERY = 2
Global Const F_NEXT = 3
Global Const F_PREVIOUS = 4
Global Const F_RANDOM = 5
Global Const F_NEW = 6
Global Const F_ENTERQBE = 7
Global Const F_CLEARQBE = 8
Global Const F_INSERT = 9
Global Const F_UPDATE = 10
Global Const F_DELETE = 11
Global Const F_LOCK = 12
Global Const F_TRANBEGIN = 13
Global Const F_TRANCOMMIT = 14
Global Const F_TRANROLLBACK = 15
Global Const F_EXECSQL = 16
Global Const F_LOGON = 17
Global Const F_LOGOFF = 18
Global Const F_DISCARD = 19
Global Const F_ENTERFIND = 20
Global Const F_FIND = 21
Global Const F_CLEARFIND = 22

'==================================================='
' The following keywords can be used as the controltype '
' in Visual Basic's "If...TypeOf" statement to identify '
' the exact type of a Multilink control.                '
'                                                       '
'         ConnectClass                                  '
'         QueryClass                                    '
'         QGrid                                         '
'         DB_CommandClass                               '
'         DB_HScrollClass                               '
'         DB_VScrollClass                               '
'         DB_TextClass                                  '
'         DB_ComboClass                                 '
'         DB_ListClass                                  '
'         DB_CheckClass                                 '
'         DB_RadioGroupClass                            '
'         DB_PictureClass                               '
'                                                       '
' ==================================================== '

'======================='
'  Declare Functions    '
'======================='

Declare Function fDoQuery Lib "qelink.vbx" (queryCtl As Control) As Integer
Declare Function fEndQuery Lib "qelink.vbx" (queryCtl As Control) As Integer
Declare Function fNext Lib "qelink.vbx" (queryCtl As Control) As Integer
Declare Function fPrevious Lib "qelink.vbx" (queryCtl As Control) As Integer
Declare Function fRandom Lib "qelink.vbx" (queryCtl As Control, ByVal RecNumber.
) As Integer
Declare Function fNew Lib "qelink.vbx" (queryCtl As Control, ByVal rowIndex%, B:
Val before%) As Integer
Declare Function fEnterQBE Lib "qelink.vbx" (queryCtl As Control) As Integer
Declare Function fClearQBE Lib "qelink.vbx" (queryCtl As Control) As Integer
Declare Function fInsert Lib "qelink.vbx" (queryCtl As Control, ByVal rowIndex%
 As Integer
Declare Function fUpdate Lib "qelink.vbx" (queryCtl As Control, ByVal rowIndex%
```

A-151

QELINK.BAS - 4

```
                   As Integer
Declare Function fDelete Lib "qelink.vbx" (queryCtl As Control, ByVal rowIndex%)
 As Integer
Declare Function fDiscard Lib "qelink.vbx" (queryCtl As Control, ByVal rowIndex%
) As Integer
Declare Function fLock Lib "qelink.vbx" (queryCtl As Control, ByVal rowIndex%) A
s Integer
Declare Function fTranBegin Lib "qelink.vbx" (queryCtl As Control) As Integer
Declare Function fTranCommit Lib "qelink.vbx" (queryCtl As Control) As Integer
Declare Function fTranRollback Lib "qelink.vbx" (queryCtl As Control) As Integer
Declare Function fExecSQL Lib "qelink.vbx" (queryCtl As Control, ByVal SQLStmt$)
 As Integer
Declare Function fLogon Lib "qelink.vbx" (connectionCtl As Control) As Integer
Declare Function fLogoff Lib "qelink.vbx" (connectionCtl As Control) As Integer
Declare Function fEnterFind Lib "qelink.vbx" (queryCtl As Control) As Integer
Declare Function fFind Lib "qelink.vbx" (queryCtl As Control, ByVal options%) As
 Integer
Declare Function fClearFind Lib "qelink.vbx" (queryCtl As Control) As Integer
```

A-152

TAPICIT.BAS - 1

Option Explicit

```
Sub CheckTAPICitError (gsCitVerb As String)
    Select Case gsCitVerb
        Case "CitAssign"
        Select Case gwCitError
        End Select
        Case "CitCancelCall"
        Select Case gwCitError
            Case DecCit__SUCCESS
                gsCitMsg = "DecCit__SUCCESS"
            Case Else
                gsCitMsg = "Unknown"
        End Select
        '===================
        Case "CitDeassign"
        Select Case gwCitError
            Case DecCit__SUCCESS
                gsCitMsg = "DecCit__SUCCESS"
            Case Else
                gsCitMsg = "Unknown"
        End Select
        '===================
        Case "CitConferenceJoin"
        Select Case gwCitError
            Case DecCit__SUCCESS
                gsCitMsg = "DecCit__SUCCESS"
            Case Else
                gsCitMsg = "Unknown"
        End Select
        '===================
        Case "CitGetEvent"
        Select Case gwCitError
            Case DecCit__SUCCESS
                gsCitMsg = "DecCit__SUCCESS"
            Case Else
                gsCitMsg = "Unknown"
        End Select
        '===================
        Case "CitInitiateConferenceCall"
        Select Case gwCitError
            Case DecCit__SUCCESS
                gsCitMsg = "DecCit__SUCCESS"
            Case Else
                gsCitMsg = "Unknown"
        End Select
        '===================
        Case "CitInitiateTransferCall"
        Select Case gwCitError
            Case DecCit__SUCCESS
                gsCitMsg = "DecCit__SUCCESS"
            Case Else
                gsCitMsg = "Unknown"
        End Select
        '===================
        Case "CitMakeCall"
        Select Case gwCitError
            Case DecCit__SUCCESS
                gsCitMsg = "DecCit__SUCCESS"
            Case Else
```

A-153

```
TAPICIT.BAS - 2
                gsCitMsg = "Unknown"
        End Select
        '===================
        Case "CitTransferCall"
        Select Case gwCitError
            Case DecCit__SUCCESS
                gsCitMsg = "DecCit__SUCCESS"
            Case Else
                gsCitMsg = "Unknown"
        End Select
    Case Else
        Exit Sub
    End Select
    Call ShowCitError(gsCitVerb, gwCitError, gsCitMsg)

End Sub
```

```
VOICE.BAS - 1

Global Const VV_STOP = 0
Global Const VV_PLAY_FILE = 1
Global Const VV_PLAY_NUMBER = 2
Global Const VV_PLAY_MONEY = 3
Global Const VV_PLAY_DATE = 4
Global Const VV_PLAY_ORDINAL = 5
Global Const VV_PLAY_CHARACTERS = 6
Global Const VV_PLAY_STRING = 7
Global Const VV_PLAY_STRING_Q = 8
Global Const VV_RECORD_FILE = 9
Global Const VV_GET_DIGITS = 10
Global Const VV_FLUSH_DIGIT_BUFFER = 11
Global Const VV_ALLOCATE_LINE = 12
Global Const VV_DEALLOCATE_LINE = 13
Global Const VV_PICK_UP = 14
Global Const VV_HANG_UP = 15
Global Const VV_CALL = 16
Global Const VV_DIAL = 17
Global Const VV_WINK = 18
Global Const VV_LOAD_LINE_PARAMETERS = 19

Global Const VV_PICKUP = 14  'to handle common typos
Global Const VV_HANGUP = 15  'to handle common typos Global Const VV_E_LINE_NOT_ALLOCATED = 26300
Global Const VV_E_HARDWARE_FAILURE = 26301
Global Const VV_E_LINE_DROPPED = 26302
Global Const VV_E_DISK_FULL = 26303
Global Const VV_E_DRIVER_ERROR = 26304
Global Const VV_E_OS_ERROR = 26305
Global Const VV_E_INERNAL_ERROR = 26306
Global Const VV_E_LINE_ALLOCATED = 26307
Global Const VV_E_MEMORY = 2638
Global Const VV_E_QUEUE_OVERFLOW = 26309
Global Const VV_E_LINE_NOT_AVAILABLE = 26310
Global Const VV_E_INVALID_VOICE_STRING = 26311
Global Const VV_E_INVALID_DATE_FORMAT = 26312
Global Const VV_E_VALUE_OUT_OF_RANGE = 26313
Global Const VV_E_SYSTEM_FILE_OPEN_ERROR = 26314
Global Const VV_E_FILE_CREATION_ERROR = 26315
Global Const VV_E_FILE_OPEN_ERROR = 26316

Global Const VV_R_RUNTIME_ERROR = -1
Global Const VV_R_OK = 0
Global Const VV_R_STOPPED = 1
Global Const VV_R_TERM_DIGIT = 2
Global Const VV_R_MAX_SILENCE = 3
Global Const VV_R_MAX_NON_SILENCE = 4
Global Const VV_R_MAX_DIGITS = 5
Global Const VV_R_TIME_OUT = 6
Global Const VV_R_TIME_OUT_INTER_DIGIT = 7
Global Const VV_R_CONNECTED = 8
Global Const VV_R_BUSY = 9
Global Const VV_R_NO_RING = 10
Global Const VV_R_NO_ANSWER = 11
Global Const VV_R_OPERATOR_INTERCEPT = 12
Global Const VV_R_CALL_ERROR = 13

Global Const VV_R_CONNECT_CADENCE_DETECT = 1
Global Const VV_R_CONNECT_LOOP_DETECT = 2
```

```
VOICE.BAS - 2

Global Const VV_R_CONNECT_PVD_DETECT = 3

Global Const VV_S_NOT_ALLOCATED = 0
Global Const VV_S_IDLE = 1
Global Const VV_S_PLAYING = 2
Global Const VV_S_RECORDING = 3
Global Const VV_S_GETTING_DIGITS = 4
Global Const VV_S_FLUSHING_DIGIT_BUFFER = 5
Global Const VV_S_PICKING_UP = 6
Global Const VV_S_HANGING_UP = 7
Global Const VV_S_CALLING = 8
Global Const VV_S_DIALING = 9
Global Const VV_S_WINKING = 10

Function vvActionResultStr$ (ByVal ActionResult%)
    Select Case ActionResult%
    Case VV_R_RUNTIME_ERROR
        vvActionResultStr$ = "RUNTIME ERROR"
    Case V_R_OK
        vvActionResultStr$ = "OK"
    Case VV_R_STOPPED
        vvActionResultStr$ = "STOPPED"
    Case VV_R_TERM_DIGIT
        vvActionResultStr$ = "TERM DIGIT"
    Case VV_R_MAX_SILENCE
        vvActionResultStr$ = "MAX SILENCE"
    Case VV_R_MAX_NON_SILENCE
        vvActionResultStr$ = "MAX NON SILENCE"
    Case VV_R_MAX_DIGITS
        vvActionResultStr$ = "MAX DIGITS"
    Case VV_R_TIME_OUT
        vvActionResultStr$ = "TIME OUT"
    Case VV_R_TIME_OUT_INTER_DIGIT
        vvActionResultStr$ = "TIME OUT INTER DIGIT"
    Case VV_R_CONNECTED
        vvActionResultStr$ = "CONNECTED"
    Case VV_R_BUSY
        vvActionResultStr$ = "BUSY"
    Case VV_R_NO_RING
        vvActionResultStr$ = "NO RING"
    Case VV_R_NO_ANSWER
        vvActionResultStr$ = "NO ANSWER"
    Case VV_R_OPERATOR_INTERCEPT
        vvActionResultStr$ = "OPERATOR INTERCEPT"
    Case VV_R_CALL_ERROR
        vvActionResultStr$ = "CALL ERROR"
    Case Else
        vvActionResultStr$ = "ActionResult = " & ActionResult%
    End Select End Function Function vvActionStr$ (ByVal Action%)

Select Case Action%
        Case VV_STOP
            vvActionStr$ = "Stop"
        Case VV_PLAY_FILE
            vvActionStr$ = "Play File"
        Case VV_PLAY_NUMBER
```

A-156

```
VOICE.BAS - 3
            vvActionStr$ = "Play Number"
        Case VV_PLAY_MONEY
            vvActionStr$ = "Play Money"
        Case VV_PLAY_DATE
            vvActionStr$ = "Play Date"
        Case VV_PLAY_ORDINAL
            vvActionStr$ = "Play Ordinal"
        Case VV_PLAY_CHARACTERS
            vvActionStr$ = "Play Characters"
        Case VV_PLAY_STRING
            vvActionStr$ = "Play String"
        Case VV_PLAY_STRING_Q
            vvActionStr$ = "Play String Q"
        Case VV_RECORD_FILE
            vvActionStr$ = "Record File"
        Case VV_GET_DIGITS
            vvActionStr$ = "Get Digits"
        Case VV_FLUSH_DIGIT_BUFFER
            vvActionStr$ = "Flush Digit Buffer"
        Case VV_ALLOCATE_LINE
            vvActionStr$ = "Allocate Line"
        Case VV_DEALLOCATE_LINE
            vvActionStr$ = "Deallocate Line"
        Case VV_PICK_UP
            vvActionStr$ = "Pick Up"
        Case VV_HANG_UP
            vvActionStr$ = "Hang Up"
        Case VV_CALL
            vvActionStr$ = "Call"
        Case VV_DIAL
            vvActionStr$ = "Dial"
        Case VV_WINK
            vvActionStr$ = "Wink"
        Case VV_LOAD_LINE_PARAMETERS
            vvActionStr$ = "Load Line Parameters"
    End Select
End Function Sub vvAllocateLine (VoiceControl As VOICE, ByVal PhoneLine%, ByVal Rings%)
    On Error GoTo vvAllocateLineError
    VoiceControl.Rings = Rings%
    VoiceControl.PhoneLine = PhoneLine%
    VoiceControl.Action = VV_ALLOCATE_LINE
    Exit Sub vvAllocateLineError:
    Call vvProcessLineErrors(VoiceControl)
End Sub Function vvCall (VoiceControl As VOICE, ByVal Number$) As Integer
    On Error GoTo vvCallError
    VoiceControl.Value = Number$
    VoiceControl.Action = VV_CALL
    vvCall = VoiceControl.ActionResult
    Exit Function vvCallError:
    Call vvProcessLineErrors(VoiceControl)
End Function Sub vvDeAllocateLine (VoiceControl As VOICE)
```

```
VOICE.BAS - 4
    On Error GoTo vvDeallocateLineError
    VoiceControl.Action = VV_DEALLOCATE_LINE
    Exit Sub vvDeallocateLineError:
    Call vvProcessLineErrors(VoiceControl)
End Sub Sub vvDial (VoiceControl As VOICE, ByVal Number$)
    On Error GoTo vvDialError
    VoiceControl.Value = Number$
    VoiceControl.Action = VV_DIAL
    Exit Sub vvDialError:
    Call vvProcessLineErrors(VoiceControl)
End Sub Function vvFlushDigitBuffer (VoiceControl As VOICE) As String
    On Error GoTo vvFlushDigitBufferError
    VoiceControl.Action = VV_FLUSH_DIGIT_BUFFER
    vvFlushDigitBuffer = VoiceControl.Digits
    Exit Function vvFlushDigitBufferError:
    Call vvProcessLineErrors(VoiceControl)
End Function Function vvGetDigits (VoiceControl As VOICE, ByVal MaxDigits%, ByVal DTermDigits
$) As String
    On Error GoTo vvGetDigitsError
    VoiceControl.MaxDigits = MaxDigits%
    VoiceControl.DTermDigits = DTermDigits$
    VoiceControl.Action = VV_GET_DIGITS
    vvGetDigits = VoiceControl.Digits
    Exit Function vvGetDigitsError:
    Call vvProcessLineErrors(VoiceControl)
End Function Sub vvHangup (VoiceControl As VOICE)
    On Error GoTo vvHangUpError
    VoiceControl.Action = VV_HANG_UP
    Exit Sub vvHangUpError:
    Call vvProcessLineErrors(VoiceControl)
End Sub Sub vvLoadLineParameters (VoiceControl As VOICE)
    On Error GoTo vvLoadLineParametersError
    VoiceControl.Action = VV_LOAD_LINE_PARAMETERS
    Exit Sub vvLoadLineParametersError:
    Call vvProcessLineErrors(VoiceControl)
End Sub Sub vvPickUp (VoiceControl As VOICE)
    On Error GoTo vvPickUpError
```

```
VOICE.BAS - 5
    VoiceControl.Action = VV_PICK_UP
    Exit Sub vvPickUpError:
    Call vvProcessLineErrors(VoiceControl)
    Exit Sub
End Sub Sub vvPlayCharacters (VoiceControl As VOICE, ByVal Characters$)
    On Error GoTo vvPlayCharactersError
    VoiceControl.Value = Characters$
    VoiceControl.Action = VV_PLAY_CHARACTERS
    Exit Sub vvPlayCharactersError:
    Call vvProcessLineErrors(VoiceControl)
End Sub Sub vvPlayDate (VoiceControl As VOICE, ByVal DateVal, ByVal DateFormat$)
    On Error GoTo vvPlayDateError
    VoiceControl.Value = DateVal
    VoiceControl.DateFormat = DateFormat$
    VoiceControl.Action = VV_PLAY_DATE
    Exit Sub vvPlayDateError:
    Call vvProcessLineErrors(VoiceControl)
End Sub Sub vvPlayFile (VoiceControl As VOICE, ByVal FileName$)
    On Error GoTo vvPlayFileError
    VoiceControl.Value = FileName$
    VoiceControl.Action = VV_PLAY_FILE
    Exit Sub vvPlayFileError:
    Call vvProcessLineErrors(VoiceControl)
End Sub Sub vvPlayMoney (VoiceControl As VOICE, ByVal Money)
    On Error GoTo vvPlayMoneyError
    VoiceControl.Value = Money
    VoiceControl.Action = VV_PLAY_MONEY
    Exit Sub vvPlayMoneyError:
    Call vvProcessLineErrors(VoiceControl)
End Sub Sub vvPlayNumber (VoiceControl As VOICE, ByVal Number, ByVal Precision%)
    On Error GoTo vvPlayNumberError
    VoiceControl.Value = Number
    VoiceControl.Precision = Precision%
    VoiceControl.Action = VV_PLAY_NUMBER
    Exit Sub vvPlayNumberError:
    Call vvProcessLineErrors(VoiceControl)
    Exit Sub
End Sub
```

A-159

VOICE.BAS - 6

```
Sub vvPlayOrdinal (VoiceControl As VOICE, ByVal Ordinal%)
    On Error GoTo vvPlayOrdinalError
    VoiceControl.Value = Ordinal%
    VoiceControl.Action = VV_PLAY_ORDINAL
    Exit Sub vvPlayOrdinalError:
    Call vvProcessLineErrors(VoiceControl)
    Exit Sub
End Sub Sub vvPlayString (VoiceControl As VOICE, ByVal VString$)
    On Error GoTo vvPlayStringError
    VoiceControl.Value = VString$
    VoiceControl.Action = VV_PLAY_STRING
    Exit Sub vvPlayStringError:
    Call vvProcessLineErrors(VoiceControl)
End Sub Sub vvPlayStringQ (VoiceControl As VOICE, ByVal VoiceString$)
    On Error GoTo vvQueuePlayStringError
    VoiceControl.Value = VoiceString$
    VoiceControl.Action = VV_QUEUE_PLAY_STRING
    Exit Sub vvQueuePlayStringError:
    Call vvProcessLineErrors(VoiceControl)
End Sub Sub vvProcessLineErrors (VoiceControl As VOICE)

'This subroutine is meant to be a template that you modify
'and incorporate into your projects.  Normally this routine
'should be called whenever an error is detected to handle
'error processing in one centralized place.

Select Case Err
    Case VV_E_LINE_NOT_ALLOCATED, VV_E_LINE_ALLOCATED, VV_E_LINE_NOT_AVAILABLE
        MsgBox Error$   'line couln't be allocated so
                        'future voice actions probably
                        'will not work.
                        'leave error active so all nested calling subroutines wi
ll exit gracefully
    Case VV_E_LINE_DROPPED
        VoiceControl.Action = VV_STOP       'stop any pending activity
        VoiceControl.Action = VV_HANG_UP
        'leave error active so all nested calling subroutines will exit graceful
ly Case VV_E_QUEUE_OVERFLOW, VV_E_INVALID_VOICE_STRING, VV_E_INVALID_DATE_FORMA
T, VV_E_VALUE_OUT_OF_RANGE, VV_E_SYSTEM_FILE_OPEN_ERROR, VV_E_FILE_CREATION_ERRO
R, VV_E_FILE_OPEN_ERROR
        'These non critical errors are usually caused by a bad parameter.
        MsgBox Error$ 'remove this line in production if desired.
        ' try resuming execution at next statement Case VV_E_OS_ERROR, VV_E_DRIVER_ERROR, VV_E_INTERNAL_ERROR
        MsgBox Error$ + "  Please call Stylus Innovation at (617) 621-9545 and r
eport a SystemError of " & VoiceControl.SystemError
```

```
VOICE.BAS - 7

Case VV_E_DISK_FULL, VV_E_MEMORY, VV_E_HARDWARE_FAILURE
    MsgBox Error$ 'remove this line in production if desired.

End Select
End Sub

Sub vvRecordFile (VoiceControl As VOICE, ByVal FileName$)
    On Error GoTo vvRecordFileError
    VoiceControl.Value = FileName$
    VoiceControl.Action = VV_RECORD_FILE
    Exit Sub vvRecordFileError:
    Call vvProcessLineErrors(VoiceControl)
End Sub Function vvStatusStr$ (ByVal Status%)
    Select Case Status%
    Case VV_S_NOT_ALLOCATED
        vvStatusStr$ = "NOT ALLOCATED"
    Case VV_S_IDLE
        vvStatusStr$ = "IDLE"
    Case VV_S_PLAYING
        vvStatusStr$ = "PLAYING"
    Case VV_S_RECORDING
        vvStatusStr$ = "RECORDING"
    Case VV_S_GETTING_DIGITS
        vvStatusStr$ = "GETTING DIGITS"
    Case VV_S_FLUSHING_DIGIT_BUFFER
        vvStatusStr$ = "FLUSHING DIGIT BUFFER"
    Case VV_S_PICKING_UP
        vvStatusStr$ = "PICKING UP"
    Case VV_S_HANGING_UP
        vvStatusStr$ = "HANGING UP"
    Case VV_S_CALLING
        vvStatusStr$ = "CALLING"
    Case VV_S_DIALING
        vvStatusStr$ = "DIALING"
    Case VV_S_WINKING
        vvStatusStr$ = "WINKING"
    Case Else
        vvStatusStr$ = "Status = " & Status%

End Select

End Function

Sub vvStop (VoiceControl As VOICE)
    On Error GoTo vvStopError
    VoiceControl.Action = VV_STOP
    Exit Sub vvStopError:
    Call vvProcessLineErrors(VoiceControl)
End Sub Sub vvUpdateLog (Action%, Begin%, Listbox As Control)

Dim ActionName$
```

VOICE.BAS - 8

```
    Select Case Action%
        Case VV_STOP
            ActionName$ = "Stopped"
        Case VV_PLAY_FILE
            ActionName$ = "Played File"
        Case VV_PLAY_NUMBER
            ActionName$ = "Played Number"
        Case VV_PLAY_MONEY
            ActionName$ = "Played Money"
        Case VV_PLAY_DATE
            ActionName$ = "Played Date"
        Case VV_PLAY_ORDINAL
            ActionName$ = "Played Ordinal"
        Case VV_PLAY_CHARACTERS
            ActionName$ = "Played Characters"
        Case VV_PLAY_STRING
            ActionName$ = "Played String"
        Case VV_QUEUE_PLAY_STRING
            ActionName$ = "Queue Played String"
        Case VV_RECORD_FILE
            ActionName$ = "Recorded File"
        Case VV_GET_DIGITS
            ActionName$ = "Received Digits"
        Case VV_FLUSH_DIGIT_BUFFER
            ActionName$ = "Flushed Digit Buffer"
        Case VV_ALLOCATE_LINE
            ActionName$ = "Allocated Line"
        Case VV_DEALLOCATE_LINE
            ActionName$ = "Deallocated Line"
        Case VV_PICK_UP
            ActionName$ = "Picked Up"
        Case VV_HANG_UP
            ActionName$ = "Hung Up"
        Case VV_CALL
            ActionName$ = "Called Number"
        Case VV_DIAL
            ActionName$ = "Dialed Number"
        Case VV_WINK
            ActionName$ = "Winked Line"
        Case VV_LOAD_LINE_PARAMETERS
            ActionName$ = "Loaded Line Parameters"
    End Select
    If Not Begin% Then
        Listbox.AddItem ActionName$
    End If End Sub Function vvVerifyPrompt (ControlName As VOICE, MainVox$, InvalidVox$, MaxRetryVo
x$, TimeOutVox$, MaxDigits%, DTermDigits$, MaxRetries%, AbortKey$) As String 'ControlName As VOICE   Visual voice control name in your project
'MainVox$               Voice file name to play to prompt your caller
'InvalidVox$            Voice file name to play when your caller enters an inval
id selection
'MaxRetryVox$           Voice filename to play when after your caller enters an
invalid response for the last time
'TimeOutVox$            Voice filename to play when your caller waits too long t
o response to the prompt
'MaxDigits%             Maximum # of digits to prompt for
'DTermDigits$           Digit or digits that can terminate the prompt
```

```
VOICE.BAS - 9

'MaxRetries%           Maximum # of times to allow the caller another try
'AbortKey$             The Key that can abort the prompt early Dim Result$, RetryNum%, AlreadyTimedOut%, Verified%

On Error GoTo VerifyPromptErr
    Verified% = True      ' Treat the prompt as verified until proven otherwise Do        'until we recieve valid input
        AlreadyTimedOut% = False
        Do    'until we receive input within time specified by ControlName.Digit
sTimeOut ControlName.Value = MainVox$
            'Please enter your 10 digit phone number, or * to quit
            ControlName.Action = VV_PLAY_FILE
            'generic get digits routine
            ControlName.MaxDigits = MaxDigits%
            ControlName.DTermDigits = DTermDigits$ + AbortKey$
            ControlName.Action = VV_GET_DIGITS If ControlName.ActionResult <> VV_R_TIME_OUT Then Exit Do   'if ok, e
xit loop
            If AlreadyTimedOut% Then
                ControlName.Action = VV_HANG_UP
                Error 35000         'generate error to check when function retur
ns
            Else
                AlreadyTimedOut% = True
                ControlName.Value = TimeOutVox$
                'If no response is received for the next 30 seconds.  I will han
g up.
                ControlName.Action = VV_PLAY_FILE
            End If
        Loop While True Result$ = ControlName.Digits
        If InStr(Result$, AbortKey$) = 0 Then
            vvVerifyPrompt = AbortKey$
            Exit Function
        End If If MaxDigits% = 0 Then ' Variable length
            Result$ = Left$(Result$, Len(Result$) - 1) 'remove terminating digit
 (e.g. #)
        End If 'Example template for database verification.
        'Orders.Index - "PrimaryKey"
        'Orders.Seek "=", Result$
        'Verified% = Not Orders.NoMatch 'Example template for range and value check verification
        'If Verified% Then Verified% = Result$ >= MinVal And Result$ <= MaxVal A
nd Result$ <> NotVal 'Example template for list verification
        'If Verified% Then
        '    Select Case Result$
        '        Case "1", "100", "2", "200", "123", "321", "555", "0": Verified
% = True
```

VOICE.BAS - 10

```
'          Case Else: Verified% = False
'      End Select
        'End If

If Not Verified% Then    'If one of the verifications failed
            MaxRetries% = MaxRetries% + 1
            If RetryNum% < MaxRetries% Then
                ControlName.Value = InvalidVox$
                'The value you entered was invalid.  Please try again
                ControlName.Action = VV_PLAY_FILE
            Else
                ControlName.Value = MaxRetryVox$
                'I'm sorry, that was your last chance at a valid response.
                ControlName.Action = VV_PLAY_FILE
                Error 35001 'generate error indicating no valid response recieved
            End If
        End If
    Loop Until Verified%
    vvVerifyPrompt = Result$
    Exit Function VerifyPromptErr:
    Call vvProcessLineErrors(ControlName)

End Function

Sub vvWink (VoiceControl As VOICE)
    On Error GoTo vvWinkError
    VoiceControl.Action = VV_WINK
    Exit Sub vvWinkError:
    Call vvProcessLineErrors(VoiceControl)
End Sub
```

A-164

What is claimed is:

1. A machine-executed method, executed at a call-taker location, of processing a 9-1-1 call, said 9-1-1 call being (1) initiated at a telephone by a caller from a caller location, (2) transmitted from said telephone to a relay site and (3) relayed to said call-taker location via a public switched telephone network (PSTN), said method comprising the steps of:

(a) receiving over said PSTN an electronic signal identifying said relay site;

(b) interrogating one or more computer databases to extract a map associated with said relay site;

(c) graphically displaying said map on a video display at said call-taker location;

(d) receiving from a call-taker operator an indication of said caller location relative to said map as communicated to the call-taker operator by the caller (e) computing location information for said caller location based on said received indication of said caller location relative to said map; and (f) transmitting to one or more public safety service providers said location information.

2. The method of claim 3 wherein the 9-1-1 call includes a voice component, the method further comprising the step of storing in a storage device a data record for said call that includes a digitized representation of at least a portion of said voice component.

3. The method of claim 2, wherein said storage device is an optical write-once storage device.

4. The method of claim 3, wherein said one or more public safety service providers includes at least one provider from the group consisting of a fire department, a police department, and an emergency medical service.

5. The method of claim 1, wherein said telephone is a cellular mobile telephone.

6. The method of claim 3, wherein (1) said video display includes a touch-screen input device and (2) said call-taker indication of said caller location relative to said map comprises touching said touch-screen input device.

7. A machine having a memory which contains data representing a system for processing a 9-1-1 call for service initiated at a telephone according to the method of any of claims 1 through 6.

8. The method of claim 1, wherein said location information is transmitted to said one or more public safety service providers in a digital format.

9. A method executed by a digital computer at a call-taker location of processing a 9-1-1 call for service initiated at a telephone by a caller from a caller location, said method comprising the steps of:

(a) receiving over a public switched telephone network (PSTN) said 9-1-1 call for service, said 9-1-1 call for service having an electronic signal encoding a calling party number representing said 9-1-1 call for service;

(b) interrogating one or more computer databases to extract information related to said calling party number, said extracted information including location information, if said extracted information identifies said 9-1-1 call for service as originating from a mobile telephone then modifying said location information by (i) graphically displaying on a video display at said call-taker location a map associated with a relay site which relayed said 9-1-1 call from the telephone to the PSTN, (ii) receiving from a call-taker operator an indication of said caller location relative to said map as communicated by the caller, and (iii) computing modified location information based on the indication of said caller location relative to said map;

(c) controlling an instrument of said public switched telephone network to transfer said 9-1-1 call for service to one or more public safety service providers; and (d) transmitting to said one or more public safety service providers said location information.

10. The method of claim 9, when said extracted information identifies the 9-1-1 call for service as originating from a mobile telephone, further comprising the step of:

a (b)(1) modifying said extracted information to identify a unique call back number associated with said 9-1-1 call for service.

11. The method of claim 9 wherein said video display includes a touch-screen input device and said step of modifying said location information further comprises receiving from a call-taker operator an indication of said caller location relative to said map by the call-taker operator touching said touch-screen input device.

12. The method of claim 9 wherein said digital computer is a network server digital computer.

13. The method of claim 9 wherein said digital computer is a personal computer.

14. The method of claim 9 wherein said instrument of said public switched telephone network is a PBX switch.

15. The method of claim 9 wherein said instrument of said public switched telephone network is a digital telephone instrument.

16. The method of claim 9 wherein said one or more public safety service providers includes at least one provider from the group consisting of a fire department, a police department, and an emergency medical service.

17. The method of claim 9 further comprising the step of storing, in a digital storage device, a data record for said 9-1-1 call for service that includes a digitized representation of at least a portion of said voice component.

18. The method of claim 17, wherein said digital storage device includes at least one device from the group consisting of an optical write-once storage device, a magnetic hard disk, and a magnetic tape.

19. The method of claim 9, wherein said location information is transmitted to said one or more public safety service providers in a digital format.

20. A machine having a memory which contains data representing a system for processing a 9-1-1 call for service initiated at a telephone by a caller from a caller location, the machine adapted to execute the method comprising the steps of:

receiving over a public switched telephone network (PSTN) said 9-1-1 call for service, said 9-1-1 call for service having an electronic signal encoding a calling party number representing said 9-1-1 call for service;

interrogating one or more computer databases to extract information related to said calling party number, said extracted information including location information, if said extracted information identifies said 9-1-1 call for service as originating from a mobile telephone then modifying said location information by (i) graphically displaying on a video dispaly at a call-taker location a map associated with a relay site which relayed said 9-1-1 call from the telephone to the PSTN, (ii) receiving from a call-taker operator an indication of said caller location relative to said map as communicated by the caller, and (iii) computing modified location information based on the indication of said caller location relative to said map;

controlling an instrument of said public swithched telephone network to transfer said 9-1-1 call for service to one or more public safety service providers; and transmitting to said one or more public safety service proveders said location information.

21. A program storage device that is readable by a digital computer of a specified one said program storage device having encoded therein a program of instructions that includes instructions for executing the method comprising the steps of:

receiving over a public switched telephone network (PSTN) a 9-1-1 call for service initiated by a caller from a caller location, said 9-1-1 call for service having an electronic signal encoding a calling party number representing said 9-1-1 call for service;

interrogating one or more computer databases to extract information related to said calling party number, said extracted information including location information, if said extracted information identifies said 9-1-1 call for service as originating from a mobile telephone then modifying said location information by (i) graphically displaying on a video display at a call-taker location a map associated with a relay site which relayed said 9-1-1 call from the telephone to the PTSN, (ii) receiving from a call-taker operator an indication of said caller location relative to said map as communicated by the caller, and (iii) computing modified location information based on the indication of said caller location relative to said map;

controlling an instrument of said public switched telephone network to transfer said 9-1-1 call for service to one or more public safety service providers; and transmitting to said one or more public safety service providers said location information.

* * * * *

UNITED STATES PATENT AND TRADEMARK OFFICE
CERTIFICATE OF CORRECTION

PATENT NO.   :   5,799,061

DATED        :   August 25, 1998

INVENTOR(S)  :   John R. Melcher, Richard A. Maw, and David L. Pickett

It is certified that error appears in the above-identified patent and that said Letters Patent is hereby corrected as shown below:

In Col. 337, line 23, after the word "claim", please delete "3" and insert therefor --1--.

In Col. 338, line 12, before "(b)(1)", please delete "a".

In Col. 339, line 7, please delete the phrase "of a specified one" and insert therefor a comma.

Signed and Sealed this

Twenty-ninth Day of December, 1998

Attest:

BRUCE LEHMAN

*Attesting Officer*    *Commissioner of Patents and Trademarks*